(12) United States Patent
Kivel et al.

(10) Patent No.: US 9,562,996 B2
(45) Date of Patent: Feb. 7, 2017

(54) MULTILAYER STACK COMBINATIONS WITH INTERLEAVED OVERLAPPING HARMONICS FOR WIDE VISIBLE INFRARED COVERAGE

(71) Applicant: 3M Innovative Properties Company, St. Paul, MN (US)

(72) Inventors: Edward J. Kivel, Stillwater, MN (US); Timothy J. Nevitt, Red Wing, MN (US); Michael F. Weber, Shoreview, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 617 days.

(21) Appl. No.: 13/844,664

(22) Filed: Mar. 15, 2013

(65) Prior Publication Data

US 2013/0250405 A1    Sep. 26, 2013

Related U.S. Application Data

(63) Continuation-in-part of application No. PCT/US2012/060485, filed on Oct. 17, 2012.
(Continued)

(51) Int. Cl.
*G02B 5/08* (2006.01)
*G02B 5/28* (2006.01)
(Continued)

(52) U.S. Cl.
CPC .......... *G02B 5/0841* (2013.01); *G02B 5/281* (2013.01); *G02B 5/285* (2013.01); *G02B 5/287* (2013.01);
(Continued)

(58) Field of Classification Search
CPC ....... G02B 5/0816–5/0891; G02B 5/28–5/283; G02B 5/285; G02B 5/287–5/289; G02B 5/30; G02B 5/3025–5/3058; G02B 5/3075–5/3091; G02B 27/10–27/1006; G02B 27/14–27/142; G02B 27/28; G02B 27/283
(Continued)

(56) References Cited

U.S. PATENT DOCUMENTS 3,247,392 A    4/1966  Thelen
3,610,729 A    10/1971 Rogers
(Continued)

FOREIGN PATENT DOCUMENTS

WO    WO 99/36258     7/1999
WO    WO 2008/144656  11/2008
(Continued)

OTHER PUBLICATIONS

Schrenk et al., Nanolayer polymeric optical films, Tappi Journal, pp. 169-174, Jun. 1992.
(Continued)

*Primary Examiner* — Stephone B Allen
*Assistant Examiner* — James McGee

(57) ABSTRACT

A broadband mirror, polarizer, or other reflector includes separate stacks of microlayers. Microlayers in each stack are arranged into optical repeat units, and the stacks are arranged in series. At a design angle of incidence such as normal incidence, the second stack provides a second $1^{st}$ order reflection band and a distinct second $2^{nd}$ order reflection band with a second spectral pass band therebetween. The first stack provides a first $1^{st}$ order reflection band that fills the second spectral pass band such that a single wide reflection band is formed that includes the first $1^{st}$ order reflection band, the second $1^{st}$ order reflection band, and the second $2^{nd}$ order reflection band. In some cases, the single wide reflection band can include a first $2^{nd}$ order reflection
(Continued)

band of the first stack. In some cases, the first and second stacks may have apodized portions which monotonically deviate from respective baseline portions.

21 Claims, 30 Drawing Sheets

Related U.S. Application Data

(60) Provisional application No. 61/549,614, filed on Oct. 20, 2011.

(51) Int. Cl.
*G02B 5/30* (2006.01)
*G02B 27/14* (2006.01)

(52) U.S. Cl.
CPC ............ *G02B 5/305* (2013.01); *G02B 5/3041* (2013.01); *G02B 27/142* (2013.01)

(58) Field of Classification Search
USPC ............... 359/350, 352, 359–360, 485.01, 359/485.03–485.04, 485.07, 489.01, 359/489.08, 489.11–489.13, 577, 580, 359/583–586, 588–590, 629, 634
See application file for complete search history.

(56) References Cited

U.S. PATENT DOCUMENTS

| | | |
|---|---|---|
| 4,446,305 A | 5/1984 | Rogers |
| 5,103,337 A | 4/1992 | Schrenk |
| 5,126,880 A | 6/1992 | Wheatley |
| 5,360,659 A | 11/1994 | Arends |
| 5,486,949 A | 1/1996 | Schrenk |
| 5,882,774 A | 3/1999 | Jonza |
| 6,179,948 B1 | 1/2001 | Merrill |
| 6,352,761 B1 | 3/2002 | Hebrink |
| 6,531,230 B1 | 3/2003 | Weber |
| 6,667,095 B2 | 12/2003 | Wheatley |
| 6,783,349 B2 | 8/2004 | Neavin |
| 6,788,463 B2 | 9/2004 | Merrill |
| 6,927,900 B2 | 8/2005 | Liu |
| 7,019,905 B2 | 3/2006 | Weber |
| 7,138,173 B2 | 11/2006 | Wheatley |
| 7,265,905 B2 | 9/2007 | Wada et al. |
| 7,385,763 B2 | 6/2008 | Nevitt |
| 7,636,193 B2 | 12/2009 | Bellanca |
| 7,652,736 B2 | 1/2010 | Padiyath |
| 7,791,687 B2 | 9/2010 | Weber |
| 7,851,054 B2 | 12/2010 | Weber |
| 8,523,419 B2 | 9/2013 | Nevitt |
| 9,395,475 B2 * | 7/2016 | Krogman ................ B32B 15/08 |
| 2005/0243425 A1 | 11/2005 | Wheatley et al. |
| 2011/0272849 A1 | 11/2011 | Neavin |
| 2012/0206806 A1 | 8/2012 | Weber |
| 2012/0275023 A1 | 11/2012 | Weber |
| 2013/0042964 A1 | 2/2013 | Neavin |
| 2013/0063818 A1 | 3/2013 | Weber |
| 2013/0250405 A1 | 9/2013 | Kivel |

FOREIGN PATENT DOCUMENTS

| | | |
|---|---|---|
| WO | WO 2011/146288 | 11/2011 |
| WO | WO 2013/059226 | 4/2013 |
| WO | WO 2013/059231 | 4/2013 |

OTHER PUBLICATIONS

PCT International Search Report for PCT/US2012/060485, mailed Apr. 11, 2013.

* cited by examiner

MULTILAYER STACK COMBINATIONS WITH INTERLEAVED OVERLAPPING HARMONICS FOR WIDE VISIBLE INFRARED COVERAGE

CROSS REFERENCE TO RELATED APPLICATIONS

This is a continuation-in-part application for patent under 35 U.S.C. §120 of international application PCT/US12/060,485, "Apodized Broadband Partial Reflectors Having Differing Optical Packets", filed Oct. 17, 2012, which international application claims the benefit under 35 U.S.C. §119(e) of U.S. provisional application 61/549,614, filed Oct. 20, 2011. The international application and the provisional application are each incorporated herein by reference in their entireties.

FIELD

The present disclosure relates to, among other things, multilayer optical film constructions, with particular application to constructions in which distinct harmonic reflection bands from different optical stacks, including at least one $2^{nd}$ order reflection band that is distinct from a $1^{st}$ order reflection band, interleave and overlap (or substantially overlap) to provide a single wide reflection band that covers at least a portion of visible and infrared wavelengths. The disclosure also relates to articles and systems incorporating such film constructions, and methods of making and using such film constructions.

BACKGROUND

Multilayer optical films are known. Such films can incorporate a large number of thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e., the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example. Over the years, designers and manufacturers of the latter type of films, i.e., broadband multilayer optical films, have had to deal with the issue of color. The color issue often arises when the film is intended for use in a visual display system, e.g., where the film is a broadband reflective polarizer or a broadband mirror, and the display system is a liquid crystal display, luminaire, or backlight. A broadband reflector generally includes a multilayer polymeric optical film having a total number of optical repeating units that monotonically increases in thickness value from a first side to a second side of the multilayer polymeric optical film. This arrangement of layer thicknesses is referred to as a graded layer thickness profile. In such systems, it is typically undesirable for the film to impart a significant colored (non-white) appearance to the display, whether at normal incidence or for obliquely incident light. The colored appearance occurs when the film has transmission or reflection characteristics that are not uniform over the visible portion of the spectrum. In the case of coextruded polymeric multilayer optical films, such non-uniformities are typically the result of imperfect control of the layer thickness profile of the film relative to a target profile. To avoid the color issue, polymeric multilayer optical films are often designed to provide along their principal axes either extremely low reflectivity and high transmission (e.g., for a pass axis of a reflective polarizer that is viewed in transmission) or extremely high reflectivity and low transmission (e.g., for a block axis of a reflective polarizer, or for any in-plane axis of a reflective mirror film that is viewed in reflection).

Recently, broadband polymeric multilayer optical films have been proposed that have intermediate amounts of reflectivity and transmission for light polarized parallel to at least one principal optic axis so that some significant amount of incident light is reflected, and another significant amount of the incident light (typically, the remainder of the incident light that is not reflected) is transmitted. Such films are referred to herein as partially reflecting multilayer optical films, or partially transmitting multilayer optical films. One approach to addressing color issues in such films is to provide them with only a single packet or stack of microlayers with a carefully tailored layer thickness profile, and to manufacture them without the use of any layer multiplier devices, to provide maximum control of the layer thickness profile and a corresponding minimum spectral variability in transmission or reflection over the visible wavelength range.

BRIEF SUMMARY

The present disclosure describes, among other things, multilayer optical films and film combinations in which different microlayer stacks provide distinct harmonic reflection bands at a design angle of incidence, including at least one $2^{nd}$ order reflection band distinct from a $1^{st}$ order reflection band, at least some of these distinct bands from the different stacks being interleaved and overlapped to provide a single wide reflection band that covers at least a portion of visible and infrared wavelengths. The single wide reflection band may be associated with orthogonal polarization states, as in the case of a mirror, or with only one polarization state, as in the case of a polarizer. For clarity and precision with regard to concepts such as whether a given reflection band "overlaps" or "substantially overlaps" another reflection band, whether a given reflection band is "distinct from" (i.e., not substantially overlapping, or spectrally separated from) another reflection band, or even whether a given reflection band even exists, we provide a detailed discussion below of what is meant by a single "reflection band" for purposes of this application. The detailed discussion also defines, for purposes of this application, relevant spectral characteristics of a (single) reflection band, such as its short wavelength band edge, its long wavelength band edge, and its reflective power.

For purposes of this application, the visible wavelength range is assumed to range from 380 to 720 nm, and the infrared wavelength range is assumed to range from 720 to at least 2000 nm.

The present disclosure also describes apodized broadband reflectors with differing optical packets that exhibit reduced in-band spectral ringing.

Also disclosed are articles that include separate first and second stacks of microlayers, the first and second stacks being arranged in series such that light transmitted by the first stack impinges on the second stack, and/or light transmitted by the second stack impinges on the first stack. The microlayers in each stack are arranged into optical repeat units. At a design angle of incidence, the first stack provides a first $1^{st}$ order reflection band, and the second stack provides a second $1^{st}$ order reflection band and a second $2^{nd}$ order reflection band. (Although "$1^{st}$ order", "$2^{nd}$ order", and the like have clear technical meanings as discussed below, the terms "first" and "second" when used to refer to a given microlayer stack or a given reflection band (which may be a $1^{st}$ order band, $2^{nd}$ order band, etc.) may be arbitrarily assigned, but, once assigned, used in a consistent fashion. Thus, in the sentence above, by saying the second stack provides a "second $2^{nd}$ order reflection band", this does not imply or require the existence of a first $2^{nd}$ order reflection band—such a reflection band may or may not exist.) The second $2^{nd}$ order reflection band is spectrally separated from the second $1^{st}$ order reflection band to define a second spectral pass band. (Here again, reference to a "second spectral pass band" does not imply or require the existence of a first spectral pass band.) The first $1^{st}$ order reflection band substantially overlaps both the second $1^{st}$ order reflection band and the second $2^{nd}$ order reflection band (thus also substantially filling the second spectral pass band), such that a single wide reflection band is formed that includes the first $1^{st}$ order reflection band, the second $1^{st}$ order reflection band, and the second $2^{nd}$ order reflection band.

The first $1^{st}$ order reflection band may overlap both the second $1^{st}$ order reflection band and the second $2^{nd}$ order reflection band, such that the first $1^{st}$ order reflection band has a long wavelength band edge that falls within the second $1^{st}$ order reflection band, and a short wavelength band edge that falls within the second $2^{nd}$ order reflection band.

If the first $1^{st}$ order reflection band does not actually overlap but is sufficiently close to substantially overlap the second $1^{st}$ order reflection band, then the first $1^{st}$ order reflection band may have a long wavelength band edge whose wavelength $\lambda_{L11st}$ differs from a wavelength $\lambda_{S21st}$ of a short wavelength band edge of the second $1^{st}$ order reflection band by no more than 5% of $\lambda_{S21st}$. Similarly, if the first $1^{st}$ order reflection band does not actually overlap but is sufficiently close to substantially overlap the second $2^{nd}$ order reflection band, then the first $1^{st}$ order reflection band may have a short wavelength band edge whose wavelength $\lambda_{S11st}$ differs from a wavelength $\lambda_{L22nd}$ of a long wavelength band edge of the second $2^{nd}$ order reflection band by no more than 5% of $\lambda_{S11st}$.

The second $2^{nd}$ order reflection band may cover at least 100 nm within a range from 380 to 720 nm.

The second stack of microlayers may include a baseline portion and an apodized portion, the baseline portion having a second baseline optical repeat unit thickness profile and the apodized portion having a second apodized optical repeat unit thickness profile that monotonically deviates from the second baseline optical repeat unit thickness profile. Similarly, the first stack of microlayers may also include a baseline portion and an apodized portion, the baseline portion of the first stack having a first baseline optical repeat unit thickness profile and the apodized portion of the first stack having a first apodized optical repeat unit thickness profile that monotonically deviates from the first baseline optical repeat unit thickness profile, and the apodized portion of the second stack and the apodized portion of the first stack may each be disposed between the baseline portion of the second stack and the baseline portion of the first stack.

At the design angle of incidence, the first stack may further provide a first $2^{nd}$ order reflection band, the first $2^{nd}$ order reflection band being spectrally separated from the first $1^{st}$ order reflection band to define a first spectral pass band. The second $2^{nd}$ order reflection band may substantially overlap the first $1^{st}$ order reflection band and the first $2^{nd}$ order reflection band such that the single wide reflection band also includes the first $2^{nd}$ order reflection band. Substantially overlapping encompasses (but is not limited to) actually overlapping; hence, the second $2^{nd}$ order reflection band may overlap both the first $1^{st}$ order reflection band and the first $2^{nd}$ order reflection band, such that the second $2^{nd}$ order reflection band has a long wavelength band edge that falls within the first $1^{st}$ order reflection band, and a short wavelength band edge that falls within the first $2^{nd}$ order reflection band.

The first $2^{nd}$ order reflection band may cover at least 100 nm within a range from 380 to 720 nm.

The design angle of incidence may be normal incidence. The first and second stacks of microlayers may be part of a single coextruded polymeric film and separated by at least a protective boundary layer (PBL). Alternatively, the first stack may be part of a first coextruded polymeric film, and the second stack may be part of a different second coextruded polymeric film. The first coextruded polymeric film may have a major surface bonded to the second coextruded polymeric film, e.g., with a layer of adhesive material.

The article may be or comprise a polarizer, and the first $1^{st}$ order reflection band, the second $1^{st}$ order reflection band, and the second $2^{nd}$ order reflection band may all be associated with only one of two orthogonal polarization states. Alternatively, the article may be or comprise a mirror, and the first $1^{st}$ order reflection band, the second $1^{st}$ order reflection band, and the second $2^{nd}$ order reflection band may all be associated with two orthogonal polarization states. Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The disclosure may be more completely understood in consideration of the following detailed description of various embodiments of the disclosure in connection with the accompanying drawings, in which.

The schematic drawings presented herein are not necessarily to scale; however, graphs are assumed to have accurate scales unless otherwise indicated. Like numbers used in the figures refer to like elements.

DETAILED DESCRIPTION

Figure 1:
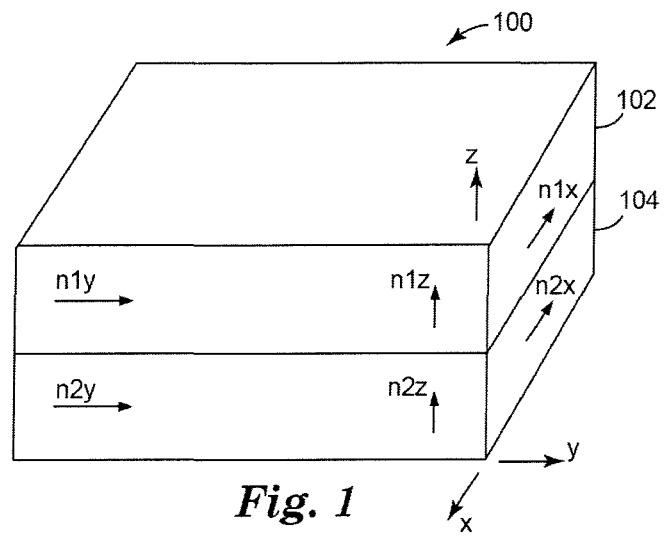
FIG. 1 is a schematic perspective view of an exemplary optical repeat unit (ORU) of a multilayer optical film.

In the following detailed description, reference is made to the accompanying drawings that form a part hereof, and in which are shown by way of illustration several specific embodiments of devices, systems, and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the context clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

As mentioned above, we disclose here inter alia optical articles such as multilayer optical films and film combinations in which different microlayer stacks or packets provide distinct harmonic reflection bands at a design angle of incidence, including at least one $2^{nd}$ order reflection band distinct from a $1^{st}$ order reflection band, and at least some of these distinct bands from the different stacks are interleaved and overlapped to provide a single wide reflection band that covers at least a portion of visible and infrared wavelengths. The relationships provided in this disclosure between reflection bands of a given stack, and between reflection bands of different stacks, rely upon a clear and precise definition for what a reflection band is and what some of its characteristic features are, particularly, the spectral location of the opposed boundaries or edges of the reflection band. Such definitions are provided further below for purposes of this disclosure, following a discussion of optical repeat units (ORUs), multilayer stacks, and harmonic reflections.

In some cases, the disclosed optical film constructions may provide a smooth spectrum for the in-band transmitted and reflected light of broadband partial reflectors. Such broadband partial reflectors may substantially eliminate in-band ringing, and provide a smooth spectrum for the in-band transmitted and reflected light. It has been found that broadband partial reflector optical film that has an apodized graded thickness profile reduces or substantially eliminates in-band spectrum ringing and consequentially reduces or substantially eliminates undesired color. The term "apodization," sometimes referred to as "tapering," is derived from a class of mathematical techniques that generally are applied in the fields of signal processing, electromagnetics, and optics. When physical structures interact with electromagnetic fields, such as a polymeric multilayer optical film interacting with infrared, visible, and/or ultraviolet light, spectral features will generally occur that are the result of the discontinuities associated with the terminations of a graded, resonant layer profile. For the present disclosure, we use the term apodization to describe a technique to terminate a graded layer thickness profile so as to minimize spectral features such as spectral ringing, which may be undesirable in some applications.

The reflective multilayer articles described herein, including but not limited to broadband partial reflectors, may be used for any suitable purpose, including but not limited to optical displays, optical graphics, or the like. While the present disclosure is not so limited, an appreciation of various aspects of the disclosure will be gained through a discussion of the examples provided below.

As mentioned above, one challenge faced by designers and manufacturers of polymeric multilayer optical films that are intended to be both (1) partially reflecting along a principal axis at normal and oblique angles and (2) broadband (i.e., intended to provide partial reflectivity over a broad wavelength range) is unintended and undesired color. Such undesired color can be manifested as relatively high frequency variability in the optical transmission and reflection spectra. For purposes of the figures illustrated and described herein, for simplicity, the multilayer optical film bodies are assumed to have no spatial variability in the plane of the film body. Thus, the spectral reflection and transmission characteristics of a given film body are assumed to be independent of the position or location on the film (e.g., the (x,y) coordinate) at which they are measured.

Referring now to FIG. 1, a schematic perspective view of an exemplary optical repeat unit (ORU) of a multilayer optical film is illustrated. FIG. 1 depicts only two layers of a multilayer optical film 100, which can include tens or hundreds of such layers arranged in one or more contiguous packets or stacks. The film 100 includes individual microlayers 102, 104, where "microlayers" refer to layers that are sufficiently thin so that light reflected at a plurality of interfaces between such layers undergoes constructive or destructive interference to give the multilayer optical film the desired reflective or transmissive properties. The microlayers 102, 104 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 micrometer. Thicker layers can, however, also be included, such as skin layers at the outer surfaces of the film, or protective boundary layers (PBL) disposed within the film that separate packets of microlayers, as desired.

Refractive indices of one of the microlayers (e.g. layer 102 of FIG. 1, or the "A" layers of FIG. 2 below) for light polarized along principal x-, y-, and z-axes are n1x, n1y, and n1z, respectively. The mutually orthogonal x-, y-, and z-axes can, for example, correspond to the principal directions of the dielectric tensor of the material. In many embodiments, and for discussion purposes, the principle directions of the different materials are coincident, but this need not be the case in general. The refractive indices of the adjacent microlayer (e.g. layer 104 in FIG. 1, or the "B" layers in FIG. 2) along the same axes are n2x, n2y, n2z, respectively. The differences in refractive index between these layers are $\Delta nx$ (=n1x−n2x) along the x-direction, $\Delta ny$ (=n1y−n2y) along the y-direction, and $\Delta nz$ (=n1z−n2z) along the z-direction. The nature of these refractive index differences, in combination with the number of microlayers in the film (or in a given stack of the film) and their thickness distribution, control the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. A reflective polarizer may be considered to be an optical body that strongly reflects normally incident light that is polarized along one in-plane axis, referred to as the "block axis," if the wavelength is within the reflection band of the packet, and strongly transmits such light that is polarized along an orthogonal in-plane axis, referred to as the "pass axis."

If desired, the refractive index difference ($\Delta nz$) between adjacent microlayers for light polarized along the z-axis can also be tailored to achieve desirable reflectivity properties for the p-polarization component of obliquely incident light. To maintain near on-axis reflectivity of p-polarized light at oblique angles of incidence, the z-index mismatch $\Delta nz$ between microlayers can be controlled to be substantially less than the maximum in-plane refractive index difference $\Delta nx$, such that $\Delta nz \leq 0.5 * \Delta nx$. Alternatively, $\Delta nz \leq 0.25 * \Delta nx$. A zero or near zero magnitude z-index mismatch yields interfaces between microlayers whose reflectivity for p-polarized light is constant or near constant as a function of incidence angle. Furthermore, the z-index mismatch $\Delta nz$ can be controlled to have the opposite polarity compared to the in-plane index difference $\Delta nx$, i.e., $\Delta nz < 0$. This condition yields interfaces whose reflectivity for p-polarized light increases with increasing angles of incidence, as is the case for s-polarized light. If $\Delta nz > 0$, then the reflectivity for p-polarized light decreases with angle of incidence. The foregoing relationships also of course apply to relationships involving $\Delta nz$ and $\Delta ny$, e.g., in cases where significant reflectivity and transmission are desired along two principal in-plane axes (such as a balanced or symmetric partially reflecting mirror film, or a partial polarizing film whose pass axis has significant reflectivity at normal incidence).

Figure 2:
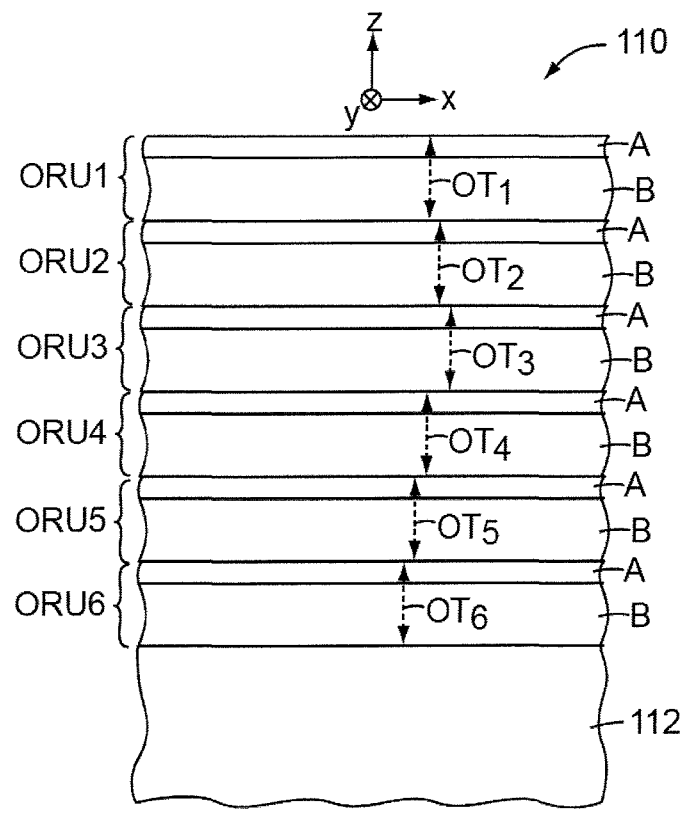
FIG. 2 is a schematic perspective view of a portion of a multilayer optical film, this view showing a packet of microlayers and a plurality of ORUs.

In the schematic side view of FIG. 2, more interior layers of a multilayer film 110 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 2, the microlayers are labeled "A" or "B," the "A" layers being composed of one material and the "B" layers being composed of a different material, these layers being stacked in an alternating arrangement to form optical repeat units or unit cells ORU 1, ORU 2, . . . ORU 6 as shown. In many embodiments, a multilayer optical film composed entirely of polymeric materials would include many more than 6 optical repeat units if high reflectivities are desired. The multilayer optical film 110 is shown as having a substantially thicker layer 112, which may represent an outer skin layer, or a protective boundary layer ("PBL," see U.S. Pat. No. 6,783,349 (Neavin et al.)) that separates the stack of microlayers shown in the figure from another stack or packet of microlayers (not shown). If desired, two or more separate multilayer optical films can be laminated together, e.g., with one or more thick adhesive layers, or using pressure, heat, or other methods to form a laminate or composite film.

In some cases, the microlayers can have thicknesses and refractive index values corresponding to a ¼-wave stack, i.e., arranged in ORUs each having two adjacent microlayers of equal optical thickness (f-ratio=50%, the f-ratio being the ratio of the optical thickness of a constituent layer "A" to the optical thickness of the complete optical repeat unit, where the constituent layer "A" is assumed to have a higher refractive index than the constituent layer "B"—if the layer "B" has the higher refractive index, then the f-ratio is the ratio of the optical thickness of the constituent layer "B" to the optical thickness of the complete optical repeat unit), such ORU being effective to reflect by constructive interference light whose wavelength $\lambda$ is twice the overall optical thickness of the optical repeat unit, where the "optical thickness" of a body refers to its physical thickness multiplied by its refractive index. The use of a 50% f-ratio is often desirable because it maximizes the reflective power of the $1^{st}$ order reflection band of a stack of microlayers, as explained below. However, also as explained below, a 50% f-ratio eliminates the $2^{nd}$ order reflection band. This too is often considered desirable in many applications; however, for purposes of the abovementioned interleaving and overlapping of distinct bands from different stacks of an optical article, including at least one $2^{nd}$ order reflection band distinct from a $1^{st}$ order reflection band, it is not desirable. Therefore, in other cases, the optical thickness of the microlayers in an optical repeat unit may be different from each other, whereby the f-ratio is greater than or less than 50%. For purposes of the present application, we contemplate multilayer optical films whose f-ratio may be any suitable value in accordance with the teachings herein, with particular attention given to films whose f-ratio is other than 50%. Accordingly, in the embodiment of FIG. 2, the "A" layers are depicted for generality as being thinner than the "B" layers. Each depicted optical repeat unit (ORU 1, ORU 2, etc.) has an optical thickness (OT1, OT2, etc.) equal to the sum of the optical thicknesses of its constituent "A" and "B" layer, and each optical repeat unit provides $1^{st}$ order reflection of light whose wavelength $\lambda$ is twice the overall optical thickness of the ORU.

In exemplary embodiments, the optical thicknesses of the ORUs differ according to a thickness gradient along the z-axis or thickness direction of the film, whereby the optical thickness of the optical repeat units increases, decreases, or follows some other functional relationship as one progresses from one side of the stack (e.g., the top) to the other side of the stack (e.g., the bottom). Such thickness gradients can be used to provide a widened reflection band to provide substantially spectrally flat transmission and reflection of light over the extended wavelength band of interest, and also over all angles of interest. Alternatively, the layer thickness gradient of the disclosed packets of microlayers may be deliberately tailored to provide reflection and transmission spectra that change significantly over the wavelength range of interest. For example, it may be desirable for the multilayer optical film body to transmit (or reflect) more blue light than red light, or vice versa, or to transmit (or reflect) more green light than blue light and red light. Although such desired spectral non-uniformities may cause the multilayer optical film body to exhibit a colored (non-clear or non-neutral) appearance, this desired color is often distinguishable from the color that may be considered undesired as discussed elsewhere herein in that the desired color is associated with relatively slow changes in the spectral reflection or transmission, whereas the undesired color is associated with faster changes in those parameters as a function of wavelength. For example, spectral non-uniformities in reflection or transmission associated with desired color may vary as a function of wavelength with characteristic periods of about 100 nm or greater, whereas spectral non-uniformities in reflection or transmission associated with undesired color may vary as a function of wavelength with characteristic periods of less than about 50 nm, although this number depends somewhat on the magnitude of localized disruptions in the layer thickness profile.

To achieve reflectivity with a reasonable number of layers, adjacent microlayers may exhibit a difference in refractive index ($\Delta nx$) for light polarized along the x-axis of at least 0.03, for example. If high reflectivity is desired for two orthogonal polarizations, then the adjacent microlayers also may exhibit a difference in refractive index ($\Delta ny$) for light polarized along the y-axis of at least 0.03, for example. In some cases, adjacent microlayers may have refractive index mismatches along the two principal in-plane axes ($\Delta nx$ and $\Delta ny$) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index ($\Delta nx$) for light polarized along the x-axis and a smaller but still substantial difference in refractive index ($\Delta ny$) for light polarized along the y-axis. In variations of such embodiments, the adjacent microlayers may exhibit a refractive index match or mismatch along the z-axis ($\Delta nz=0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle.

Both reflectors whose reflectivity increases with angle of incidence, and reflectors whose reflectivity along a given principal axis decreases with angle of incidence, can be made with reduced color if desired using the apodizing techniques described herein. This may be important for films whose reflectivity is large at normal incidence and are viewed in transmitted light at various angles, including normal incidence.

At least some of the microlayers in at least one packet of the disclosed multilayer optical films may if desired be birefringent, e.g., uniaxially birefringent or biaxially birefringent, although in some embodiments, microlayers that are all isotropic may also be used. In some cases, each ORU may include one birefringent microlayer, and a second microlayer that is either isotropic or that has a small amount of birefringence relative to the other microlayer. In alternative cases, each ORU may include two birefringent microlayers.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method can include: (a) providing at least a first and a second stream of resin corresponding to the first and second polymers to be used in the finished film; (b) dividing the first and the second streams into a plurality of layers using a suitable feedblock, such as one that includes: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g., U.S. Pat. No. 6,783,349 (Neavin et al.).

In some cases, the fabrication equipment may employ one or more layer multipliers to multiply the number of layers in the finished film. In other embodiments, the films can be manufactured without the use of any layer multipliers. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multi-packet films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

If the optical thicknesses of all of the microlayers in a given multilayer film were designed to be the same, the film would provide high reflectivity over only a narrow band of wavelengths. Such a film would appear highly colored if the band was located somewhere in the visible spectrum, and the color would change as a function of angle. In the context of display and lighting applications, films that exhibit noticeable colors are generally avoided, although in some cases it may be beneficial for a given optical film to introduce a small amount of color to correct for color imbalances elsewhere in the system. Exemplary multilayer optical film bodies are provided with broadband reflectivity and transmission, e.g., over the entire visible spectrum, or over at least a portion of visible and infrared (IR) wavelengths, by tailoring the microlayers—or more precisely, the optical repeat units (ORUs), which in many (but not all) embodiments correspond to pairs of adjacent microlayers—to have a range of optical thicknesses. Typically, the microlayers are arranged along the z-axis or thickness direction of the film from a thinnest ORU on one side of the film or packet to a thickest ORU on the other side, with the thinnest ORU reflecting the shortest wavelengths in the reflection band and the thickest ORU reflecting the longest wavelengths.

After the multilayer web is cooled on the chill roll, it can be drawn or stretched to produce a finished or near-finished multilayer optical film. The drawing or stretching accomplishes two goals: it thins the layers to their desired final thicknesses, and it may orient the layers such that at least some of the layers become birefringent. The orientation or stretching can be accomplished along the cross-web direction (e.g., via a tenter), along the down-web direction (e.g., via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

In reference to traditional polarizing films, light can be considered to be polarized in two orthogonal planes, where the electric vector of the light, which is transverse to the propagation of the light, lies within a particular plane of polarization. In turn, the polarization state of a given light ray can be resolved into two different polarization states: p-polarized and s-polarized light. P-pol light is polarized in the plane of incidence of the light ray and a given surface, where the plane of incidence is a plane containing both the local surface normal vector and the light ray propagation direction or vector.

Figure 3:
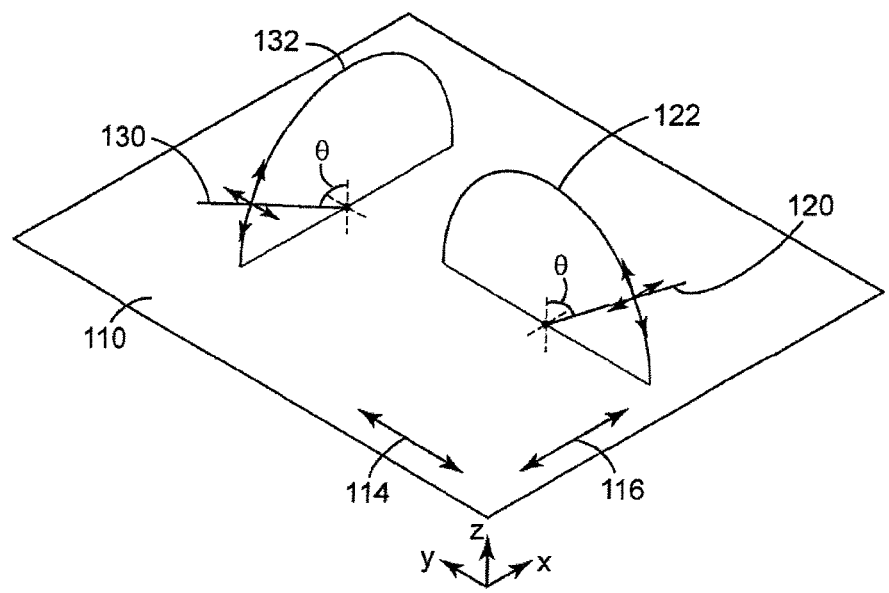
FIG. 3 is a schematic perspective view of a reflective polarizing film.

FIG. 3 is a schematic perspective view of a reflective polarizing film. FIG. 3 illustrates a light ray 130 that is incident on a polarizer 110 at an angle of incidence θ, thereby forming a plane of incidence 132. The polarizer 110 includes a pass axis 114 that is parallel to the y-axis, and a block axis 116 that is parallel to the x-axis. The plane of incidence 132 of ray 130 is parallel to the block axis 116. Ray 130 has a p-polarized component that is in the plane of incidence 132, and an s-polarized component that is orthogonal to the plane of incidence 132. The p-pol light of ray 130 will be substantially reflected by the polarizer, while the s-pol light of ray 130 is, at least in part, transmitted.

Further, FIG. 3 illustrates ray 120 that is incident on polarizer 100 in a plane of incidence 122 that is parallel to the pass axis 114 of the polarizer 110. As a result, assuming that the polarizer 110 is a perfect polarizer that has a reflectance of 100% at all angles of incident light for light polarized in the block axis and 0% at all angles of incident light for light polarized in the pass axis, the polarizer transmits s-pol light of ray 130 and the p-pol light of ray 120, while reflecting the p-pol light of ray 130 and the s-pol light of ray 120. In other words, the polarizer 110 will transmit a combination of p- and s-pol light. The amount of transmission and reflection of p- and s-pol light will depend on the characteristics of the polarizer as is further described herein.

Figure 4:
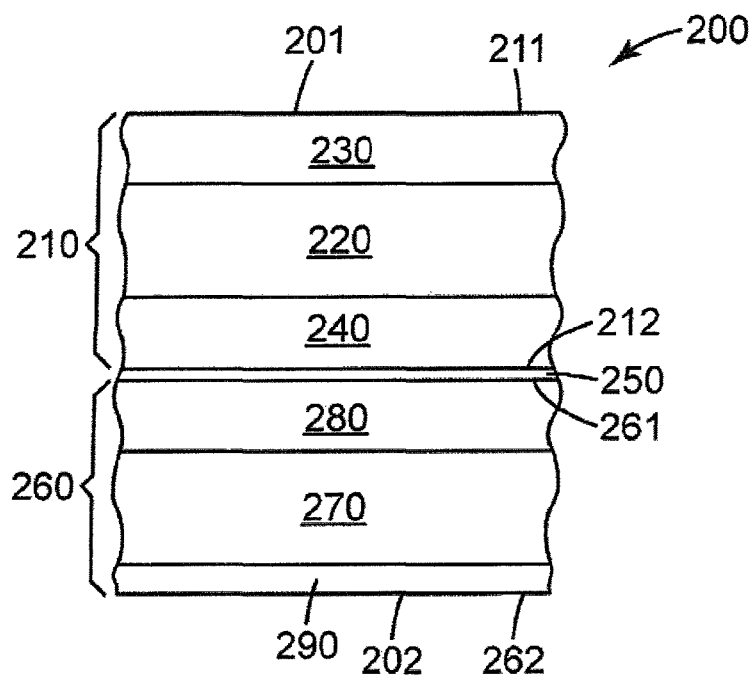
FIG. 4 is a schematic cross-sectional view of a broadband partial reflector having differing optical packets.

FIG. 4 is a schematic cross-sectional view of a broadband partial reflector 200. A broadband partial reflector 200 includes a first multilayer polymeric optical film 210 and a second multilayer polymeric optical film 260 separated by an intermediate layer 250.

The first multilayer polymeric optical film 210 has a total number of optical repeating units that increase in thickness value from a first side 211 to a second side 212 of the multilayer polymeric optical film 210. In many embodiments, the first multilayer polymeric optical film 210 has a total number of optical repeating units that monotonically increase in thickness value from the first side 211 to the second side 212 of the multilayer polymeric optical film 210. In many embodiments, the total number of optical repeating units is in a range from 50 to 1000 or from 100 to 300. In many embodiments, the first multilayer polymeric optical film 210 reflects 10-90% of visible or IR light over a band of at least 100 nm width or a band of over at least 200 nm width or a band of at least 300 nm width.

The first multilayer polymeric optical film 210 has a baseline optical repeating unit thickness profile 220 and a first apodized optical repeating unit thickness profile 240. The first apodized optical repeating unit thickness profile 240 defines the second side 212 of the first multilayer polymeric optical film 210. The second side 212 of the first multilayer polymeric optical film 210 is disposed on or in contact with the intermediate layer 250. The first apodized optical repeating unit thickness profile 240 monotonically deviates from the baseline optical repeating unit thickness profile 220. In some embodiments, the first apodized optical repeating unit thickness profile 240 monotonically and exponentially deviates from the baseline optical repeating unit thickness profile 220.

The baseline optical repeating unit thickness profile 220 is defined by a plurality of optical repeating units and having a first average slope. The first apodized thickness profile 240 has a second average slope being at least 5 times greater than the first average slope. In many embodiments, the second average slope is at least 10 times greater than the first average slope. The first apodized thickness profile 240 is in a range from 3 to 15% or in a range from 5-10% of the total number of optical repeating units, or can contain from 4-20 of the total number of optical repeating units forming the first multilayer polymeric optical film 210.

In some embodiments, another apodized optical repeating unit thickness profile 230 defines the first side 211 of the first multilayer polymeric optical film 210 and joins the baseline optical repeating unit thickness profile 220. This additional apodized optical repeating unit thickness profile 230 can have from 3-15% or from 5-10% of the total number of optical repeating units, or may contain from 4 to 20 of the total number of optical repeating units that form the first multilayer polymeric optical film 210. The other apodized optical repeating unit thickness profile 230 monotonically deviates from the baseline optical repeating unit thickness profile 220. In some embodiments, the other apodized optical repeating unit thickness profile 230 monotonically and exponentially deviates from the baseline optical repeating unit thickness profile 220.

The second multilayer polymeric optical film 260 has a total number of optical repeating units that increase in thickness value from a first side 261 to a second side 262 of the second multilayer polymeric optical film 260. In many embodiments, the second multilayer polymeric optical film 260 has a total number of optical repeating units that monotonically increase in thickness value from the first side 261 to the second side 262 of the multilayer polymeric optical film 260. In many embodiments, the total number of optical repeating units is in a range from 50 to 1000 or from 100 to 300. In many embodiments, the second multilayer polymeric optical film 260 reflects 10-90% of visible or IR light over a band of at least 100 nm width or a band of over at least 200 nm width or a band of at least 300 nm width.

The second multilayer polymeric optical film 260 has a baseline optical repeating unit thickness profile 270 and a second apodized optical repeating unit thickness profile 280. The second apodized optical repeating unit thickness profile 280 defines the first side 261 of the second multilayer polymeric optical film 260. The first side 261 of the second multilayer polymeric optical film 260 is disposed on or in contact with the intermediate layer 250. The second apodized optical repeating unit thickness profile 280 monotonically deviates from the baseline optical repeating unit thickness profile 270. In some embodiments, the second apodized optical repeating unit thickness profile 280 monotonically and exponentially deviates from the baseline optical repeating unit thickness profile 270.

The baseline optical repeating unit thickness profile 270 is defined by a first plurality of optical repeating units having a first average slope. The second apodized thickness profile 280 of the multilayer polymeric optical film 260 is defined by a second plurality of optical repeating units that have a second average slope (defining at least a portion of the second plurality of optical repeating units) being at least 5 times greater than the first average slope. In many embodiments, the second average slope is at least 10 times greater than the first average slope. The second plurality of optical repeating units 280 are in a range from 3-15% or form 5-10% of the total number of optical repeating units, or may contain from 4 to 20 of the total number of optical repeating units forming the first multilayer polymeric optical film 260.

In some embodiments, another apodized optical repeating unit thickness profile 290 defines the second side 262 of the second multilayer polymeric optical film 260 and joins the baseline optical repeating unit thickness profile 270. This additional apodized optical repeating unit thickness profile 290 has from 3-15% or from 5-10% of the total number of optical repeating units, or may contain from 4 to 20 of the total number of optical repeating units that form the second multilayer polymeric optical film 260. The other apodized optical repeating unit thickness profile 290 monotonically deviates from the baseline optical repeating unit thickness profile 270. In some embodiments, the other apodized optical repeating unit thickness profile 290 monotonically and exponentially deviates from the baseline optical repeating unit thickness profile 270.

In many embodiments, the first apodized optical repeating unit thickness profile 240 overlaps the second baseline optical repeating unit thickness profile 270. Likewise, the second apodized optical repeating unit thickness profile 280 can overlap the first baseline optical repeating unit thickness profile 220. In many embodiments, the first baseline optical repeating unit thickness profile 220 does not overlap the second baseline optical repeating unit thickness profile 270.

In many embodiments, the first baseline optical repeating unit thickness profile 220 thickest optical repeating unit has a thickness value that is within 15% or within 10% or within 5% of a thinnest optical repeating unit of the second baseline optical repeating unit thickness profile 270. In many embodiments, the thickest optical repeating unit of the first baseline optical repeating unit thickness profile 220 is adjacent to the second side 212 of the first multilayer polymeric optical film 210 and the thinnest optical repeating unit of the second baseline optical repeating unit thickness profile 270 is adjacent to the first side 261 of the second multilayer polymeric optical film 260. The first multilayer polymeric optical film 210 and a second multilayer polymeric optical film 260 can be formed of the same material sets or different material sets, as described below.

At least one difference between vacuum deposited stack designs and coextruded polymeric multilayer stack designs is the shape of the layer profile distribution. With vacuum deposited films, the desired spectrum is achieved by individually adjusting the thickness of every layer in the stack so it conforms to a computer optimized stack design. In this manner, issues such as spectral ripple are routinely minimized. Adjacent layers sometimes differ in thickness by a factor of 10, with thickness values often ranging from about $0.05\lambda$ to $1.0\lambda$. With coextruded polymeric film stacks, on-line monitoring and control of individual layers in this manner is not yet a viable option with this technology. As a result, spectral shape is controlled mainly by the shape of a continuous and smoothly varying layer thickness profile, such as profile 5a in FIG. 5. Such profiles are not restricted to polymeric film stacks, and the apodizing profiles disclosed herein can be applied to any stack that utilizes layer thickness profiles that are graded from thin to thick layers in a substantially monotonic fashion.

One should also note that the classic examples of apodized stacks are not broadband reflectors but are stacks that are centered, i.e., tuned, for one (i.e., a single) wavelength. For those stacks, there is no "in-band" ripple, only side-band ripple. In such a stack, all ORUs have substantially the same thickness value. Furthermore, the apodization profile for those stacks generally extends through much or sometimes all of the layers of the stack and typically use profiles of index change, not profiles of thickness change. Common examples can be found in the fiber optic industry where the "stack" is a modulated index profile along the length of the fiber. Some apodization profiles are Cosine, Guassian, Quintic, Septic or Sinc function index profiles, for example.

When the term "broadband reflector" is used herein, it refers to a reflector for which the longest and shortest wavelength in the reflection band have a wavelength ratio of about 2:1 or more, although generally they can be as low as 1.5:1 and up to as large as 5:1 for polymeric reflectors.

Some product constructions may require 500 or more ¼ wave thick optical layers. Extrusion hardware is generally not available to fabricate such stacks with no intermediate thick optical layers, and lamination of two or more stacks in a manner so as to provide a continuous a/b/a/b ¼ wave thick layer profile is difficult. In general, the combination of two sets of Optical Repeating Units (ORUs) results in the unavoidable inclusion of a thick intermediate layer, as illustrated in FIG. 5.

Figure 5:
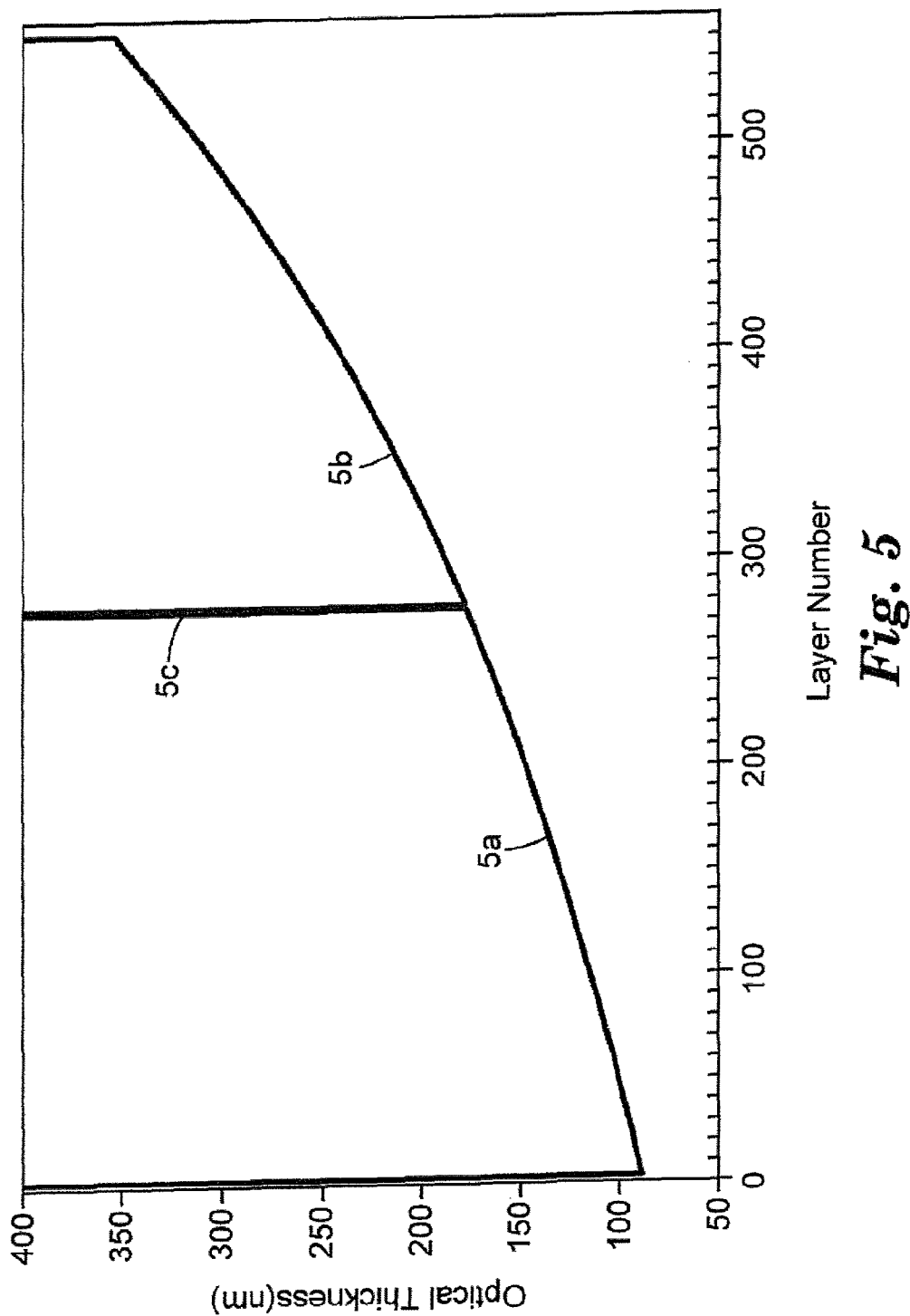
FIG. 5 is a layer profile thickness graph of an optical film having two optical packets.

FIG. 5 presents two sets of similar layer thickness profiles of 275 layers each that are joined with an intermediate optically thick layer such as an adhesive or other polymeric layer. Layer thickness profiles 5a and 5b consist of 275 layers each and are optically coupled with an intermediate optically thick layer 5c such as a clear adhesive or other layer, including an air gap. The profiles for each set are based on a simple power law profile for each layer n, from n=1 to N, where the thickness t of each layer is given by $t=T_0*(1.005)^n$ where $T_0$ is a constant scaling factor and n is the layer number. Since the layer thickness values for the high and low index materials are not the same, the profiles of the optical thickness values are plotted here. The layer profile shown here is modified with a small adjustment that slightly increases the curvature to help adjust for index dispersion. These layer thickness profiles will yield the spectra 6a and 6b in FIG. 6 for the pass and block axis of the film respectively. The optical thickness values of the layers are shown in FIG. 5 instead of the physical thickness. The modeling was performed using ¼ wave optical thickness for each layer, meaning the physical thickness values are adjusted for the differing index values of the high and low index materials.

Figure 6:
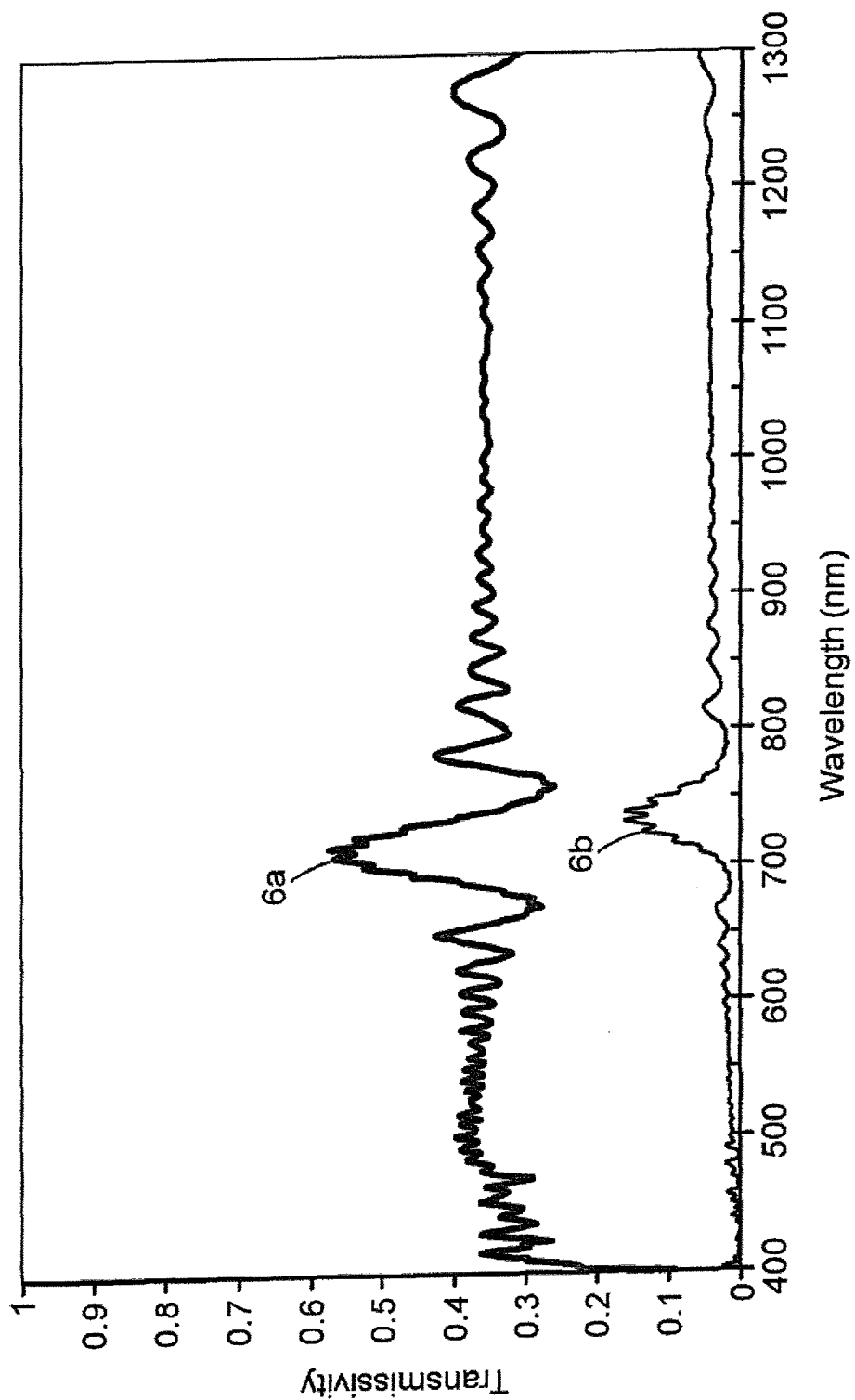
FIG. 6 is a graph of the spectra resulting from the layer thickness profile of FIG. 5.

The modeled spectra of FIG. 6 are based on the indices of a birefringent film stack that has the following indices of refraction: high index layers were nx1=1.791, ny=1.675, nz=1.490, and low index layers where nx2=ny2=nz2=1.564. This stack also includes 20 micrometer thick skin layers of the low index material. The birefringent layer index set can be achieved with an asymmetrical orientation of a coPEN copolymer (90% naphthalate units, 10% terephthalate units). The low index is that of PETg GN071, which is available from Eastman Chemicals, Kingsport, Tenn. All indices are those measured at 633 nm using a Metricon Instrument, Princeton N.J.

As can be seen in FIG. 6, the optically thick layer causes a significant spectral disruption that is apparent near 700 nm. If the stack were continuous, the spectra would be smooth and undisturbed at the juncture of the two "stacks". The ratio of the thicknesses of the two stacks that provide the spectra in FIG. 6 is 1.98:1. This ratio, sometimes referred to as the multiplication ratio, can be adjusted to provide more or less overlap of the spectra. However, with a little modeling, it is readily shown that a substantial disruption is always present in the spectrum. A solution to this problem is to combine apodized versions of the two individual stacks, as shown in Example 1 below.

Interleaved and Overlapping Harmonic Reflection Bands from Different Optical Stacks We have found that particularly efficient use of multilayer optical film stacks, especially in applications that call for high or at least substantial reflectivity over a wide spectral range that spans both visible and infrared wavelengths, can be made by interleaving and overlapping distinct harmonic reflection bands from different multilayer stacks of an optical article, including at least one $2^{nd}$ order reflection band distinct from a $1^{st}$ order reflection band. Efficiency is enhanced by making use of not only $1^{st}$ order reflections but also $2^{nd}$ order reflections in the functional operation of the article.

Furthermore, in order to produce significant $2^{nd}$ order reflections, the relative thicknesses of the "A" and "B" microlayers in a given stack are tailored so that the f-ratio of the optical repeat units is significantly different from 0.5 (50%), and this design feature can also provide significant benefits to the film manufacturer. In particular, to the extent material "A" of the "A" microlayers is more expensive than material "B" of the "B" microlayers (or vice versa), one can select an f-ratio that reduces the amount of material "A", and increases the amount of material "B", in the stack (or vice versa), relative to a stack design whose f-ratio is 0.5. By selecting the "thinner" microlayer in the ORU to be the more expensive material and the "thicker" microlayer in the ORU to be the less expensive material, the overall raw material cost of the finished film can be significantly reduced. For example, optical quality polyethylene naphthalate (PEN) is currently more expensive than optical quality polyethylene terephthalate (PET); therefore, to achieve a target f-ratio other than 50% that produces a significant $2^{nd}$ order reflection, the thickness of a PEN microlayer in each optical repeat unit can be reduced while the thickness of a PET microlayer in each optical repeat unit can be increased, thereby reducing the overall material cost of the film.

Figure 7:
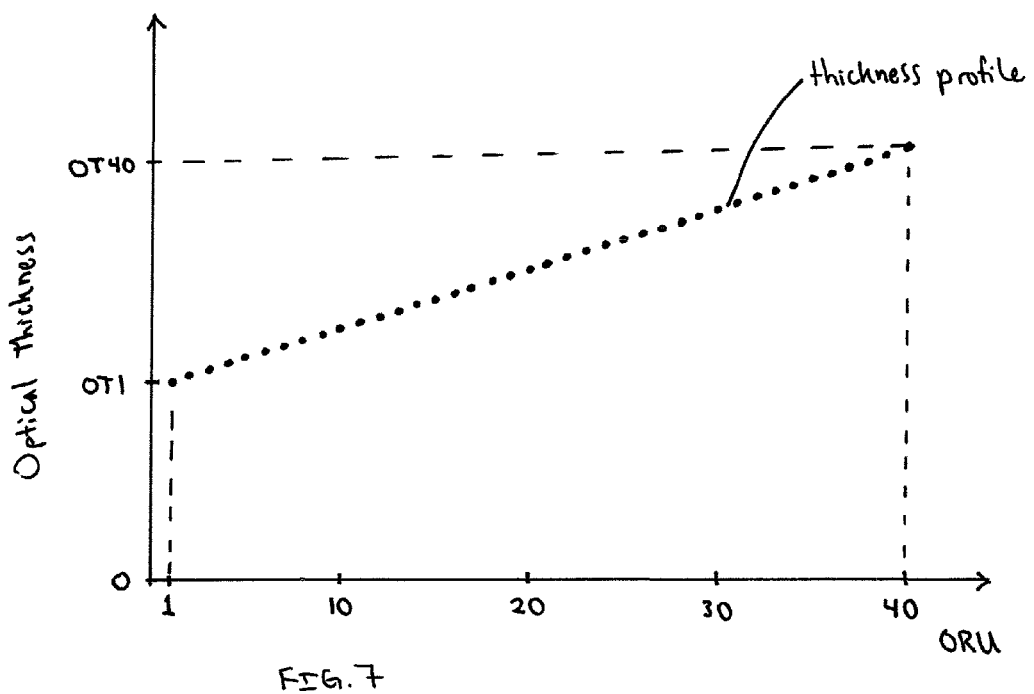
FIG. 7 is an idealized representation of a layer thickness profile of a stack of microlayers forming a group of ORUs, this particular stack having no apodized portions.

Turning now to FIG. 7, we see there an idealized representation of a thickness profile of a stack of microlayers forming a group of ORUs, this particular stack having no apodized portions. Each discrete point of the thickness profile represents the optical thickness of one ORU. The graph assumes 40 ORUs, arranged in order from one end of the stack to the other, but more or fewer than 40 ORUs can be used in alternative embodiments. The thickness profile exhibits a gradient in thickness, from a minimum of OT1 at ORU 1 to a maximum of OT40 at ORU 40. The gradient has the effect of broadening the spectral width of the reflection band produced by the stack, relative to a similar stack that has no gradient in thickness. A simple linear thickness profile is shown for simplicity, but more complex profiles, e.g. employing curves, bends, and/or apodized portions, can also be employed.

Note that the thickness profile of the ORUs does not reveal any information about the f-ratio used in the stack, since individual layer thicknesses are not shown. Stated differently, a given ORU thickness profile, including that of FIG. 7, can be implemented in a multitude of different ways by tailoring the f-ratio differently, while keeping the optical thicknesses of the ORUs unchanged. For example, in some cases the "A" microlayer may be substantially thinner than the "B" microlayer in each ORU, while in other cases the "A" microlayer may be substantially thicker than the "B" microlayer in each ORU, while in still other cases the "A" and "B" microlayers may be about the same thickness in each ORU.

Figure 8:
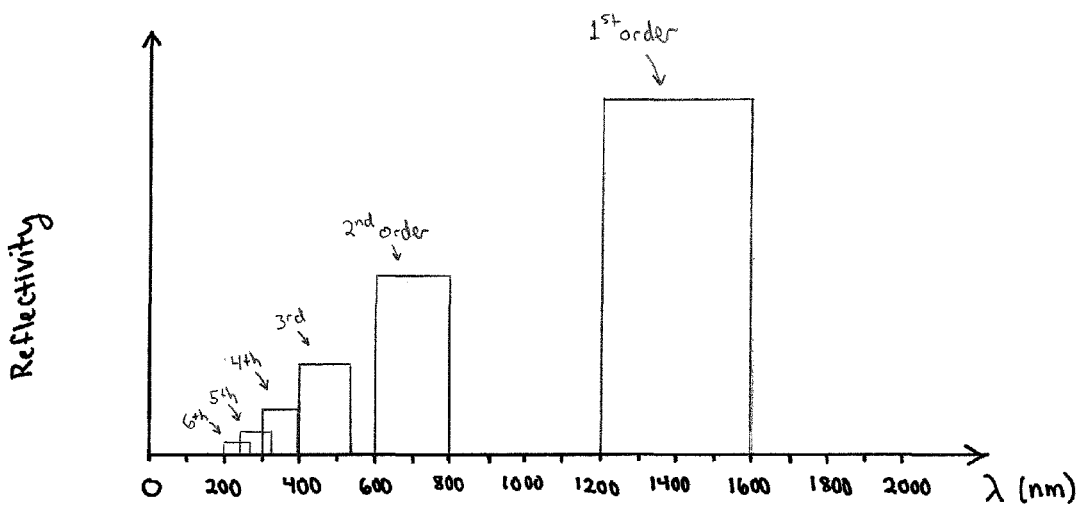
FIG. 8 is an idealized schematic representation of various harmonic reflection bands that a microlayer stack such as that of FIG. 7 may produce, depending on design details of the stack.

In FIG. 8, an idealized schematic representation shows various harmonic reflection bands that a microlayer stack such as that of FIG. 7 may produce, depending on design details of the stack. A reflection band in this regard, for purposes of this application, refers to a single confined region of increased reflectivity on a plot of reflectivity versus wavelength, where the reflectivity achieves a value of at least 30% within the region. The reflection band of each harmonic order is shown in simplified or idealized fashion to have two opposed, straight, vertical band edges, a flat or uniform reflectivity within the band, and no ripple or ringing. Although reflection bands of this rectangular shape cannot be found in real films, the idealized rectangular reflection bands can be useful for approximating or representing an actual reflection band having a more complicated shape. For illustrative purposes, a $1^{st}$, $2^{nd}$, $3^{rd}$, $4^{th}$, $5^{th}$, and $6^{th}$ order reflection band are all shown on the same graph, but in practice some would typically be absent or substantially absent from the reflectivity spectrum, depending on the f-ratio used for the stack. Also, the reflectivities of the harmonics are shown as monotonically decreasing as the order number increases, but this is not always the case. In some cases, a reflection band that has greater reflectivity than another reflection band may also have a higher order number.

Figure 9:
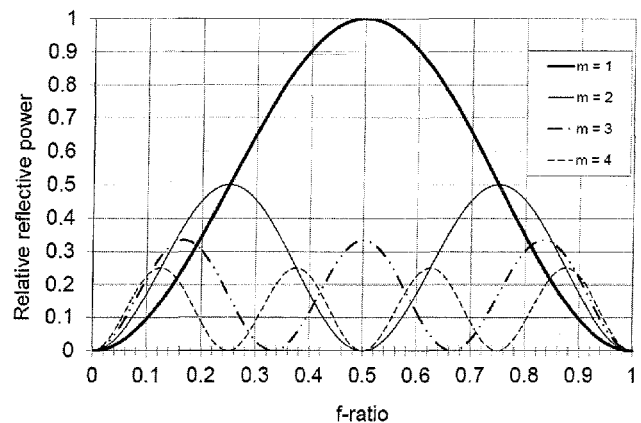
FIG. 9 is a graph of relative reflective power as a function of the f-ratio of a microlayer stack.

In this regard, reference is made to FIG. 9. This figure is a graph of relative reflective power as a function of the f-ratio of a microlayer stack. In this regard, the "reflective power" of a microlayer stack refers to the area under the negative of the Log(1−R) spectrum (optical density), normalized by dividing by the wavelength. (The parameter "R" here refers to the reflectivity of the stack, which is a function of wavelength. A value of R=1 corresponds to a reflectivity of 1.0 or 100%, a value of R=0.5 corresponds to a reflectivity of 0.5 or 50%, and so forth.) The reflective power of individual harmonic bands generated by the stack can be determined in this way, provided they do not overlap with one another. By optical modeling or experimentation it can be shown that the reflective power of a stack of alternating high and low refractive index layers with small refractive index differentials, such as those found in polymeric multilayer optical stacks, is proportional to the square of the refractive index differential. The effect of the f-ratio on this reflective power can be expressed using an effective index differential for a given mth harmonic order band as follows:

$$\Delta n_{effective} = c_m \frac{\pi}{4} \Delta n$$

where $\Delta n$ is the actual refractive index difference, and $c_m$ is the Fourier coefficient of the Fourier representation of the asymmetric square wave refractive index waveform of the stack for the mth order term in the series. The reflective power (RP) in a given harmonic reflection band can be shown to be proportional to the square of this effective index differential:

$$RP \propto m(\Delta n_{effective})^2,$$

where m is again the order number of the harmonic band. The Fourier coefficient for each order m of an asymmetric square wave is given by:

$$c_m = \frac{4}{m\pi} \text{Sin}(m\pi f),$$

where f is the f-ratio. From these equations one can see that the reflective power RP is proportional to the following simple formula:

$$RP \propto \frac{1}{m} \text{Sin}^2[m\pi f].$$

This function, after normalizing by setting the maximum reflective power of the $1^{st}$ order reflection band (which occurs when the f-ratio equals 0.5) to 1.0, is plotted in FIG. 9 for several harmonic orders. Curves are provided for each of the first 4 harmonic orders, i.e., for $1^{st}$ order reflection (m=1), $2^{nd}$ order reflection (m=2), $3^{rd}$ order reflection (m=3), and $4^{th}$ order reflection (m=4). Inspection of the graph reveals that at an f-ratio of 0.5 (or 50%), $1^{st}$ and $3^{rd}$ order reflections are maximized, while $2^{nd}$ and $4^{th}$ order reflections are zero. In contrast, at an f-ratio of 1/3 or 2/3 (about 33% or 67% respectively), $1^{st}$ order reflection is substantial but diminished somewhat from its maximum, $2^{nd}$ and $4^{th}$ order reflections are substantial but less than the $1^{st}$ order reflection, and the $3^{rd}$ order reflection is zero. A wide variety of relative reflective magnitudes of the different harmonic orders can be obtained by selecting a desired f-ratio. We can refer to relative reflective power, for a given mth order harmonic, as $\alpha_m$.

Figure 10A:
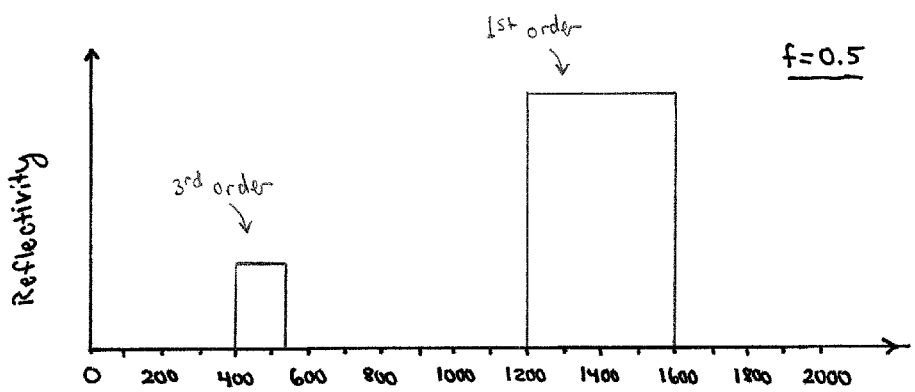
FIG. 10A is an idealized schematic representation showing which harmonic reflection bands (up to the $4^{th}$ order) are produced by a microlayer stack having an f-ratio of 0.5.
Figure 10B:
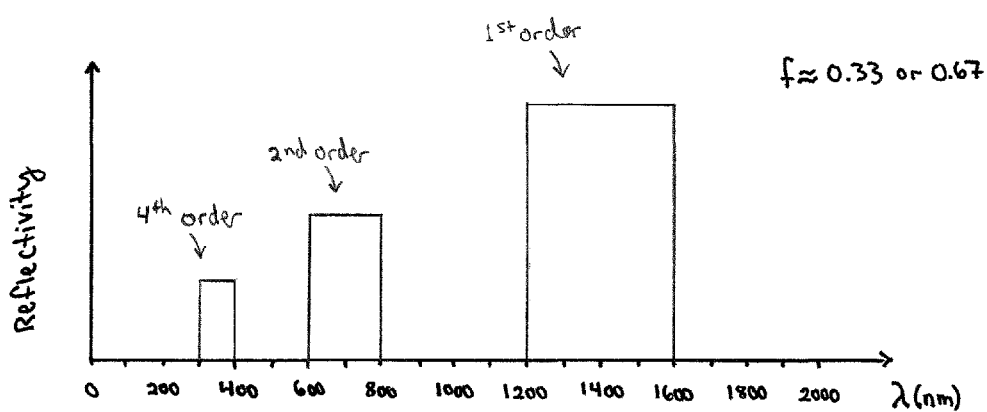
FIG. 10B is an idealized schematic representation similar to FIG. 10A, but where the microlayer stack has an f-ratio of 1/3 or 2/3.

FIGS. 10A and 10B are idealized spectral reflectivity graphs for a single microlayer stack similar to that of FIG. 8, but FIGS. 10A and 10B assume the stack is made with specific f-ratios which have ramifications for which harmonic orders are present in, and which are absent from, the respective reflection spectra. In particular, FIG. 10A assumes the stack is made with an f-ratio of 0.5. In this case, in accordance with FIG. 9, the $1^{st}$ and $3^{rd}$ order reflection bands from FIG. 8 are present, and the $2^{nd}$ and $4^{th}$ order reflection bands from FIG. 8 are absent. FIG. 10B assumes an f-ratio of 1/3 or 2/3, which yields substantial $1^{st}$, $2^{nd}$, and $3^{rd}$ order reflection bands, and no $3^{rd}$ order reflection band.

The interleaving and overlapping technique described herein relies upon suitably tailoring the spectral reflectivity of a first microlayer stack relative to a second microlayer stack, and placing the stacks in optical series such that light transmitted by the first stack impinges on the second stack, and/or light transmitted by the second stack impinges on the first stack. Exemplary arrangements of such a series combination of optical stacks are shown in FIGS. 11A and 11B.

Figure 11A:
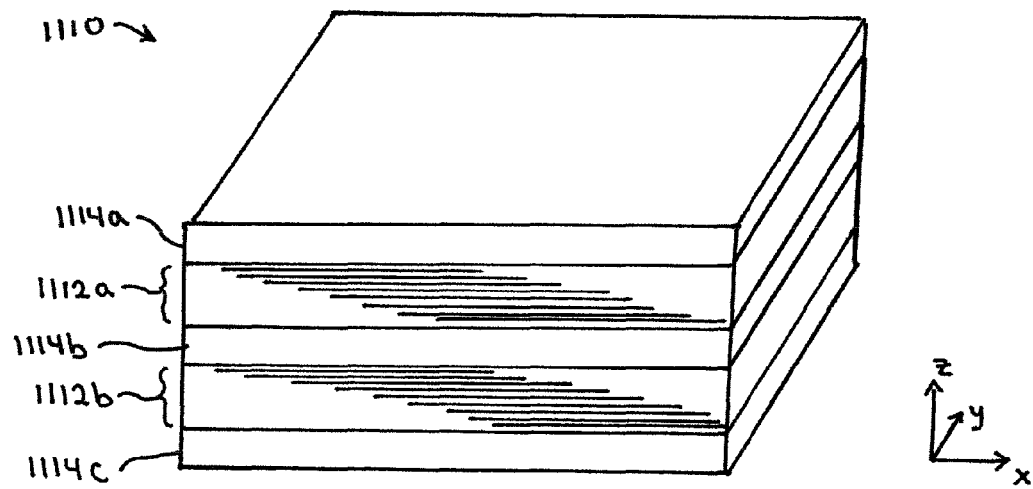
FIG. 11A is a schematic perspective view of a multilayer optical film having two distinct stacks of microlayers.

In FIG. 11A, an article 1110 may be an optical film made by coextrusion and optional orientation or stretching in one or two directions. The article 1110 has a first microlayer stack 1112a, a second microlayer stack 1112b, and an optically thick layer 1114b separating the two stacks. Additional optically thick layers 1114a, 1114c may also be provided. The optically thick layer 1114b may be a protective boundary layer (PBL). The optically thick layers 1114a, 1114c may also be PBLs, or they may be skin layers. Any light that travels in the negative z-direction (see Cartesian x-y-z coordinate system), and that is transmitted by the first stack 1112a, impinges on the second stack 1112b. Any light that travels in the positive z-direction, and that is transmitted by the second stack 1112b, impinges on the first stack 1112a. The reflective properties of the first and second stacks can thus be combined in the article 1110.

Figure 11B:
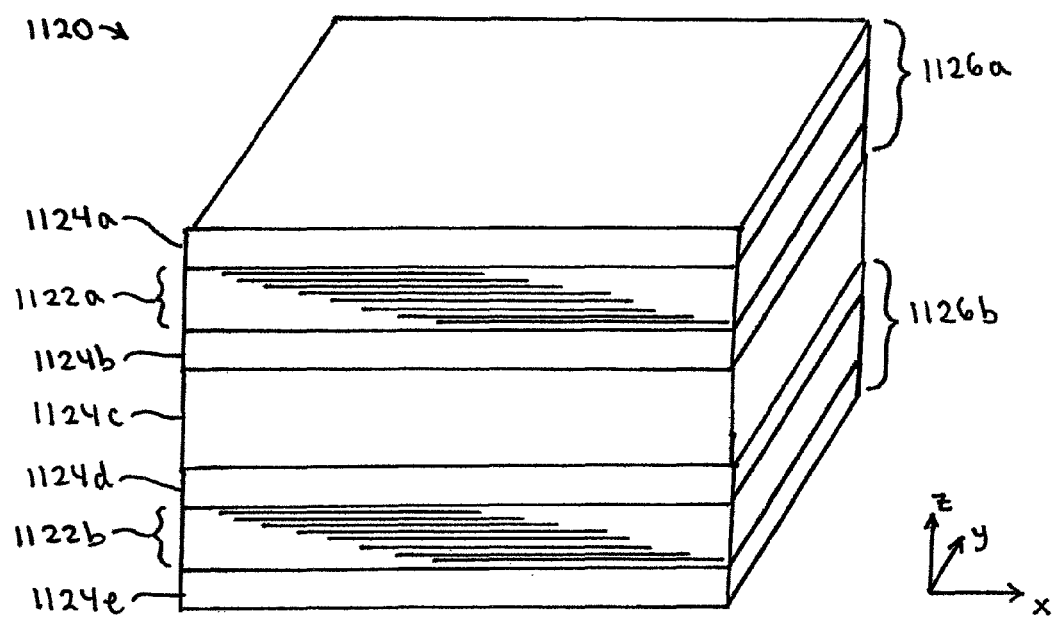
FIG. 11B is a schematic perspective view of an article in which two multilayer optical films are laminated together to provide distinct microlayer stacks.

In FIG. 11B, an article 1120 may be made from two optical films 1126a, 1126b that are separately coextruded and manufactured, and then laminated or otherwise bonded together with an optically thick layer 1124c, which may e.g. be or comprise an optically clear adhesive. The film 1126a includes a first microlayer stack 1122a and optional optically thick layers 1124a, 1124b such as PBLs. The film 1126b includes a second microlayer stack 1122b and optional optically thick layers 1124d, 1124e such as PBLs. Any light that travels in the negative z-direction, and that is transmitted by the first stack 1122a, impinges on the second stack 1122b. Any light that travels in the positive z-direction, and that is transmitted by the second stack 1122b, impinges on the first stack 1122a. The reflective properties of the first and second stacks can thus be combined in the article 1120.

Figure 12A:
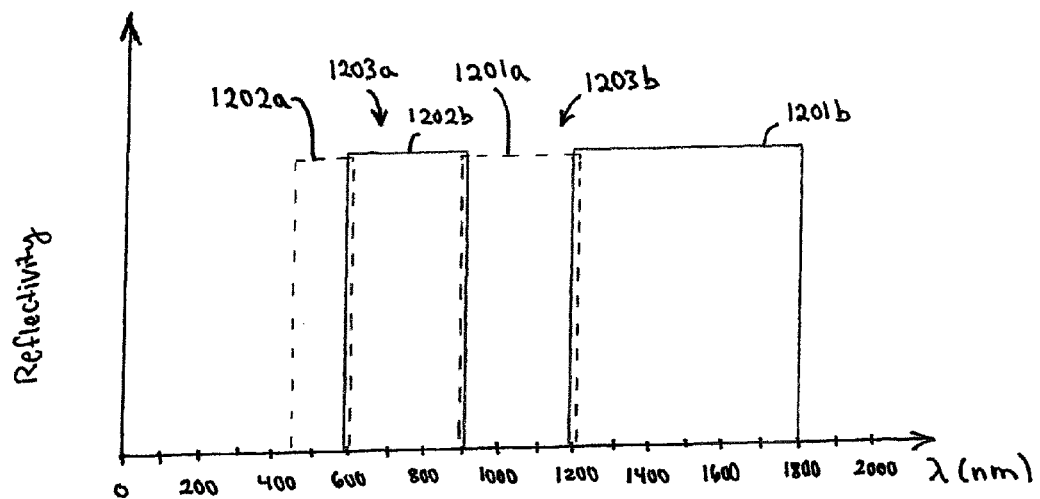
FIG. 12A is an idealized graph of reflectivity versus wavelength, demonstrating how distinct harmonic reflection bands from different microlayer stacks can be made to interleave and overlap.

FIG. 12A illustrates an exemplary manner in which the interleaving and overlapping of distinct harmonic reflection bands from different microlayer stacks can be achieved to provide a single wide reflection band. In brief, a first microlayer stack is tailored to have a suitable refractive index difference between microlayers, and a suitable number of ORUs, and a suitable ORU thickness gradient, and a suitable f-ratio, so that the first stack provides a first $1^{st}$ order reflection band 1201a at a design angle of incidence, such as normal incidence. A second microlayer stack is tailored in similar fashion, except to provide the second microlayer stack with a second $1^{st}$ order reflection band 1201b and a second $2^{nd}$ order reflection band 1202b at the same design angle of incidence. Note that all reflection bands in the figure are depicted in simplified or idealized form, i.e. with rectangular shapes, for ease of explanation. The second $2^{nd}$ order reflection band 1202b is spectrally separated from the second $1^{st}$ order reflection band 1201b to define a second spectral pass band 1203b. In the figure, the pass band 1203b extends from about 900 to about 1200 nm. Furthermore, as shown, the first $1^{st}$ order reflection band 1201a (spectrally) overlaps both the second $1^{st}$ order reflection band 1201b and the second $2^{nd}$ order reflection band 1202b, thus also (spectrally) filling the second spectral pass band 1203b. Overlap of the band 1201a with the band 1201b is established when the right band edge of the band 1201a (which occurs near 1200 nm in the figure) coincides with the left band edge of the band 1201b (which also occurs near 1200 nm in the figure), or when the right band edge of band 1201a falls within the band 1201b, i.e., when the right band edge of band 1201a is between the left and right band edges of the band 1201b. Similarly, overlap of the band 1201a with the band 1202b is established when the left band edge of the band 1201a (which occurs near 900 nm in the figure) coincides with the right band edge of the band 1202b (which also occurs near 900 nm in the figure), or when the left band edge of band 1201a falls within the band 1202b, i.e., when the left band edge of band 1201a is between the left and right band edges of the band 1202b.

Optionally, the first microlayer stack may also provide a first $2^{nd}$ order reflection band 1202a which is spectrally separated from the first $1^{st}$ order reflection band 1201a to define a first spectral pass band 1203a. In the figure, the pass band 1203a extends from about 600 to about 900 nm. The second microlayer stack may then be further tailored such that the second $2^{nd}$ order reflection band 1202b (spectrally) overlaps both the first $1^{st}$ order reflection band 1201a and the first $2^{nd}$ order reflection band 1202a, thus also (spectrally) filling the first spectral pass band 1203a. Overlap of the band 1202b with the band 1201a is established when the right band edge of the band 1202b (which occurs near 900 nm in the figure) coincides with the left band edge of the band 1201a (which also occurs near 900 nm in the figure), or when the right band edge of band 1202b falls within the band 1201a, i.e., when the right band edge of band 1202b is between the left and right band edges of the band 1201a. Similarly, overlap of the band 1202b with the band 1202a is established when the left band edge of the band 1202b (which occurs near 600 nm in the figure) coincides with the right band edge of the band 120ab (which also occurs near 600 nm in the figure), or when the left band edge of band 1202b falls within the band 1202a, i.e., when the left band edge of band 1202b is between the left and right band edges of the band 1202a.

Figure 12B:
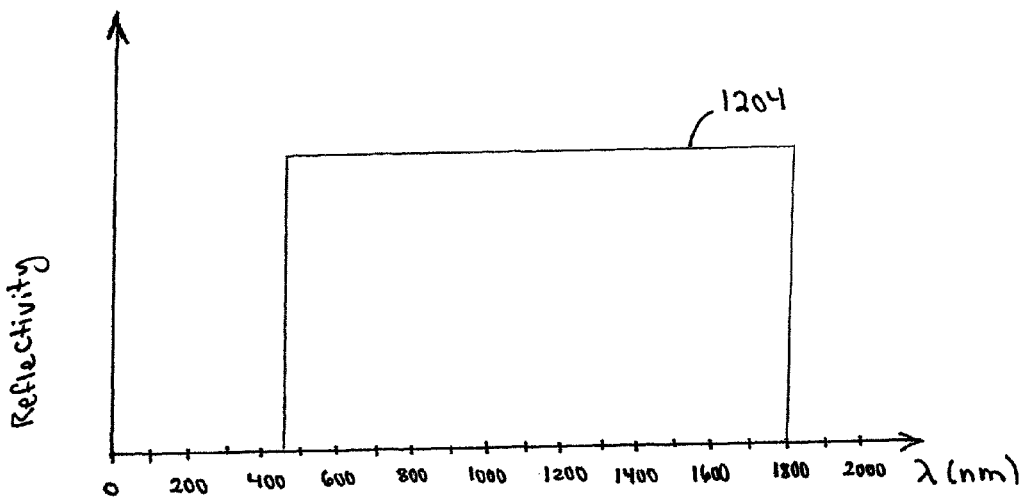
FIG. 12B is an idealized graph similar to FIG. 12A but showing how the overlapping harmonic bands produce a single wide reflection band that covers at least a portion of visible and infrared wavelengths.

As a result of the interleaving and overlapping of at least bands 1201a, 1201b, and 1202b, and by arranging the first and second stacks in optical series so that light that passes through one stack impinges on the other, as discussed above, a single wide reflection band is formed that is a combination of at least those three harmonic reflection bands. Furthermore, if the first stack includes the first $2^{nd}$ order reflection band 1202a and if it is arranged with regard to the other reflection bands as discussed above, then the single wide reflection band also includes the band 1202a. Such a single wide reflection band is shown as band 1204 in FIG. 12B. The band 1204 is shown to extend from a left band edge of about 450 nm (corresponding to the left band edge of band 1202a) to a right band edge of about 1800 nm (corresponding to the right band edge of band 1201b).

The left band edge of a given reflection band may alternatively be referred to as a short wavelength band edge, whose wavelength may be designated $\lambda_S$. Similarly, the right band edge of a given reflection band may alternatively be referred to as a long wavelength band edge, whose wavelength may be designated $\lambda_L$. Additional subscripts are also used herein to designate whether the band edge is for a reflection band produced by the first or second microlayer stack, and whether the band edge is for a reflection band of a given harmonic order, e.g., $1^{st}$ or $2^{nd}$. Thus, for example, $\lambda_{S21st}$ refers to the wavelength of the left band edge of a $1^{st}$ order reflection band of the second stack, and $\lambda_{L12nd}$ refers to the wavelength of the right band edge of a $2^{nd}$ order reflection band of the first stack.

The simplicity of the reflection band shapes in FIG. 12A makes the interleaving and overlapping technique discussed above readily understandable. However, as mentioned above, real reflection bands produced by real stacks of microlayers do not have ideal rectangular shapes; consequently, a determination of whether a given reflection band overlaps another reflection band becomes less straightforward, to the extent a precise wavelength value of the left and right band edges of the reflection bands cannot be readily determined. For this reason, we provide further below a methodology for reliably determining the spectral location of left and right band edges for a reflection band produced by a microlayer stack, which methodology involves both an analysis of the measured or modeled spectral reflectivity, and an analysis of the measured or modeled ORU thickness profile for the stack, and the f-ratio of the stack also being a factor in the analysis.

The fact that real reflection bands produced by real stacks of microlayers do not have ideal rectangular shapes also has ramifications relating to the idea of reflection band overlap. In particular, two reflection bands that do not overlap according to a strict adherence to the methodology herein of determining the location of band edges—e.g., the right band edge as determined herein of the shorter wavelength reflection band may be separated by only a few nanometers from the left band edge as determined herein of the longer wavelength reflection band, so that such bands would not be considered to overlap—may nevertheless be close enough together to produce a spectral feature that may reasonably be characterized as a single wide reflection band. To account for such situations, we use the term "substantial overlap" (and related terms such as "substantially overlapping", etc.) to encompass both (a) actual overlap between two reflection bands, as discussed above, and (b) cases in which there is no actual overlap between two nearby band edges of adjacent reflection bands, but where the wavelength of one of the band edges differs from that of the other band edge by 5% or less of the wavelength of either band edge.

Figure 12C:
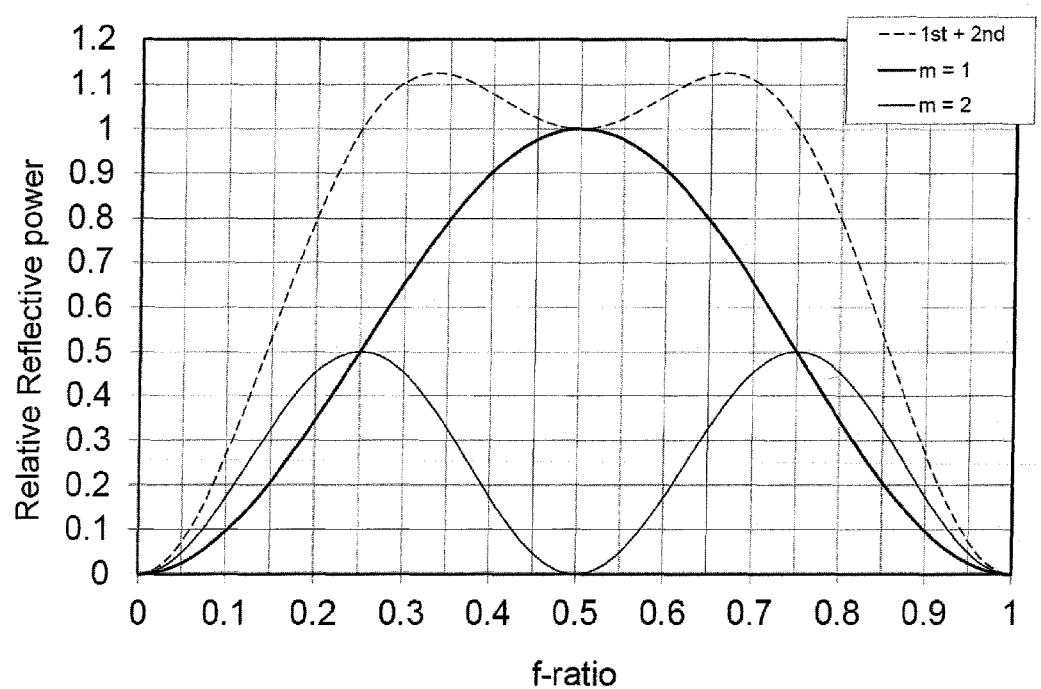
FIG. 12C is a graph similar to that of FIG. 9, but including an additional curve that shows how the relative reflective power can be enhanced by utilizing both a $1^{st}$ and $2^{nd}$ order reflection band.

The reflection band 1204 is produced by the combination of overlapping (or substantially overlapping) distinct harmonic reflection bands shown in FIG. 12A. As such, the efficiency of an article incorporating two such microlayer stacks is actually enhanced relative to an article that provides a reflection band identical to band 1204 but using only $1^{st}$ order reflections. For an explanation of this, we turn to FIG. 12C. That figure plots relative reflective power as a function of f-ratio, just as in FIG. 9, but includes only the $1^{st}$ order (m=1) and $2^{nd}$ order (m=2) curves. FIG. 12 however also includes a dashed-line curve which is the sum of the relative reflective powers of the $1^{st}$ and $2^{nd}$ orders. Interestingly, the dashed-line curve provides greater reflective power than the maximum reflected power provided by the $1^{st}$ order reflection band alone. Thus, over the f-ratio range from 0.25 to 0.75, the dashed-line curve provides reflective power that is equal to (at the f-ratio values of 0.25, 0.5, and 0.75) or greater than (at f-ratio values between 0.25 and 0.5, and between 0.5 and 0.75) the reflective power provided by the $1^{st}$ order curve alone. Stated more generally, the total useful reflective power of a stack of microlayers is the sum of all the harmonic orders that reflect in the desired wavelength range of interest for the stack, and this sum can be greater than the maximum reflective power provided by the 1st order reflection band alone (at f=0.5). By harnessing the reflective power of both $1^{st}$ and $2^{nd}$ order reflections, an article that utilizes the interleaving and overlapping technique can provide enhanced reflective efficiency for a given number of microlayers and a given refractive index difference between microlayers.

We will now discuss the methodology referred to above for reliably determining the spectral location of left and right band edges for a reflection band produced by a microlayer stack.

Optical repeat units (ORUs) have various optical properties that can be derived from the thicknesses of each of its materials, and by refractive index values of each material. Generally, ORUs can consist of more than two material types, each with a differing refractive index value, and the differing material layers can be arranged with various arrangement of thicknesses and sequences of the materials. Here, we will restrict our discussions to ORUs with two material types, and two layers per ORU.

The resonant wavelength of an ORU is the wavelength at which the combination of layer thicknesses and refractive index values, leads to constructive interference of an incident light wave, causing the ORU to be partially reflective to the incident light. The resonant wavelength of an optical repeat unit (ORU), for its $m^{th}$ order reflection harmonic is $$\lambda_{o,m}=(2/m)\cdot(n_A d_A+n_B d_B),$$

where m is the reflection harmonic order, $d_A$ and $d_B$ are the layer thickness of the higher-value refractive index material (material A), and the lower-valued refractive index material (material B) respectively, and $n_A$ and $n_B$ are the refractive index values of material A and material B.

The term $(n_A d_A+n_B d_B)$ is the optical thickness of the ORU, and inspection of the above equation indicates that the $1^{st}$ order reflection harmonic occurs at twice the optical thickness of the ORU, the $2^{nd}$ order reflection harmonic occurs at the optical thickness of the ORU, the $3^{rd}$ order reflection harmonic occurs at ⅔ of the optical thickness of the ORU, and so on.

Another optical property of an ORU, is termed its intrinsic bandwidth. The intrinsic bandwidth (IBW) is a measure of the strength of coherence among adjacent ORUs (within a layer stack) in terms of constructive interference leading to reflectivity. ORUs contribute to reflectivity not only at the resonant wavelength, but also on either side of the resonant wavelength (higher and lower wavelengths) as determined by the ORU's intrinsic bandwidth. Intrinsic bandwidth for the $m^{th}$ order reflection harmonic is given by:

$$IBW_m = \left(\frac{4}{\pi}\right)\cdot\left|\frac{(1-a_m N_r)}{(1+a_m N_r)}\right|$$

where $N_r=n_B/n_A$ and $\alpha_m$ is the relative reflective power coefficient for the mth order harmonic, as shown in FIG. 9. So, for example, a $2^{nd}$ order reflection harmonic, with an f-ratio of 0.25, the relative reflective power coefficient $\alpha_m$ will have a value of 0.5.

When the $IBW_m$ is evaluated for a given reflection harmonic order m, and a given ORU f-ratio, it can be multiplied by the resonant wavelength of the ORU, to give a fractional bandwidth $\Delta\lambda_m$. This fractional bandwidth $\Delta\lambda_m=IBW_m*\lambda_{0,m}$ is a measure of the range of wavelengths over which the ORU and other ORUs of like property, will coherently act to create reflection. Indeed, a microlayer stack consisting of a large number of identical ORUs, such that the reflectivity at the common resonate wavelength is very large (approaching 1 or 100%), will have a reflection band that extends on either side of the resonant wavelength by $\Delta\lambda_m/2$.

When numerous ORUs that are neighbors in a microlayer stack that is graded from thin to thick layers in a substantially monotonic fashion, have fractional bandwidths $\Delta\lambda_m$ that overlap one another, coherent reflection is generated. Indeed, for any given ORU, with its associated resonant wavelength, one can analyze the fractional bandwidths, $\Delta\lambda_m$, of neighboring ORUs and so determine the number of neighboring ORUs whose fractional bandwidths overlap the given ORU's resonant wavelength. Each of those neighboring ORUs with fractional bandwidths that overlay the given ORU's resonant wavelength, are coherently acting with the given ORU, to generate reflectivity at the given ORU's resonant wavelength.

This first principles logic suggests a methodology in which a modeled or a measured microlayer stack of ORUs, with known refractive index values, can be analyzed in terms of each ORUs resonant wavelengths $\lambda_{0,m}$ and fractional bandwidths $\Delta\lambda_m$. For each ORU's resonant wavelength, one can count the number of neighboring ORUs whose fractional bandwidth overlaps the given resonate wavelength. This count, termed the Coherent Neighbors Count (CNC), can then be used to determine a reflectivity level at the given resonant wavelength. To quantitatively determine the reflectivity level, we employ a standard formula that relates reflectivity to the number of ORUs coherently contributing to reflectivity, and the ORU layer material refractive index values:

$$R_m = \left(\frac{(1-a_m N_r^{2\,CNC})}{(1+a_m N_r^{2\,CNC})}\right)^2$$

While this standard reflectivity formula is most accurate for a microlayer stack of identical ORUs, it provides an excellent to reflectivity approximation for microlayer stacks with a graded optical thickness profile. By this method, the reflectivity at each resonant wavelength (associated with each ORU) within a microlayer stack, can be calculated by determining the value of the Coherent Neighbors Count (CNC).

This method allows one skilled in the art, to use a measured microlayer stack thickness distribution, along with known refractive index values of the layer material, to map the wavelength-extent of an arbitrary-order reflection band, and in addition to quantitatively define the short-wavelength start of a given reflection band, and the long-wavelength end for the same reflection band.

In addition, by performing the analysis described above, one skilled in the art can separately determine the wavelength-extent of multiple reflection bands, of various orders, deriving from one or more microlayer stacks, where the measured reflection spectrum shows a single wavelength region of high reflectivity due to significant reflection band overlap, and the individual reflection band harmonic are indecipherable.

For the embodiment and the further examples 1, 2 and 3, we have chosen to define the onset of a reflection band of a chosen microlayer stack, p, of a given harmonic order, m, as the shortest resonant wavelength $\lambda_{S,p,m}$ for which the CNC provides an $R_m$ value that is >25% of the associated reflection band peak reflectivity. Similarly, we define the wavelength representing the end of the reflection band, as the longest resonant wavelength $\lambda_{L,p,m}$ for which the CNC provides an $R_m$ value that is <25% of the associated reflection band peak reflectivity. In this manner, we can determine the wavelength-extent of individual reflection bands.

Figure 13A:
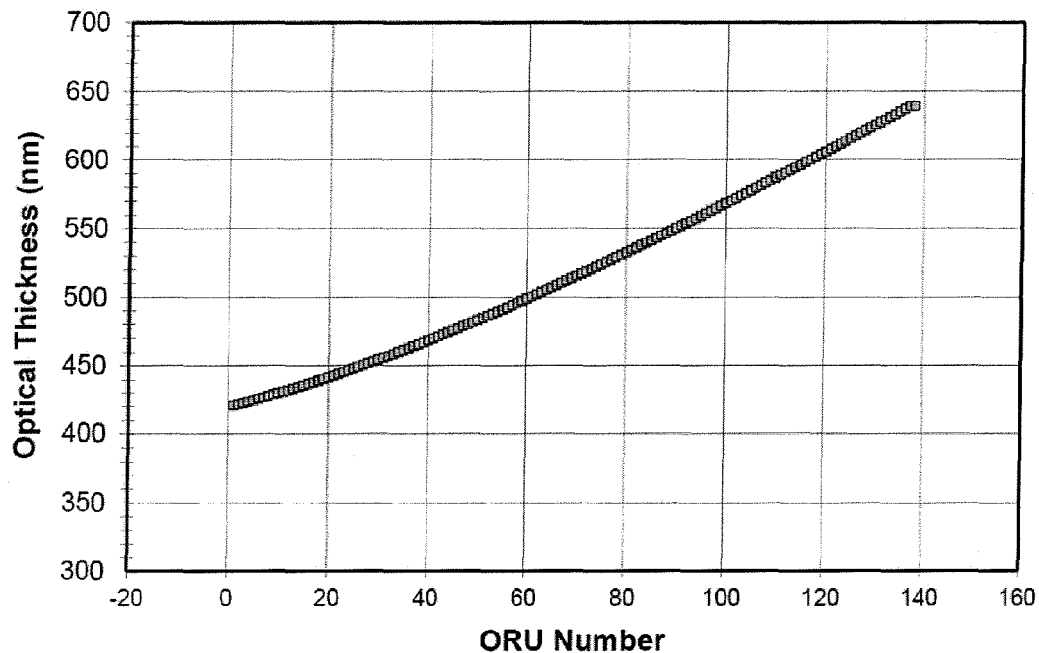
FIG. 13A is a layer thickness profile graph of a first microlayer stack that was modeled.
Figure 13B:
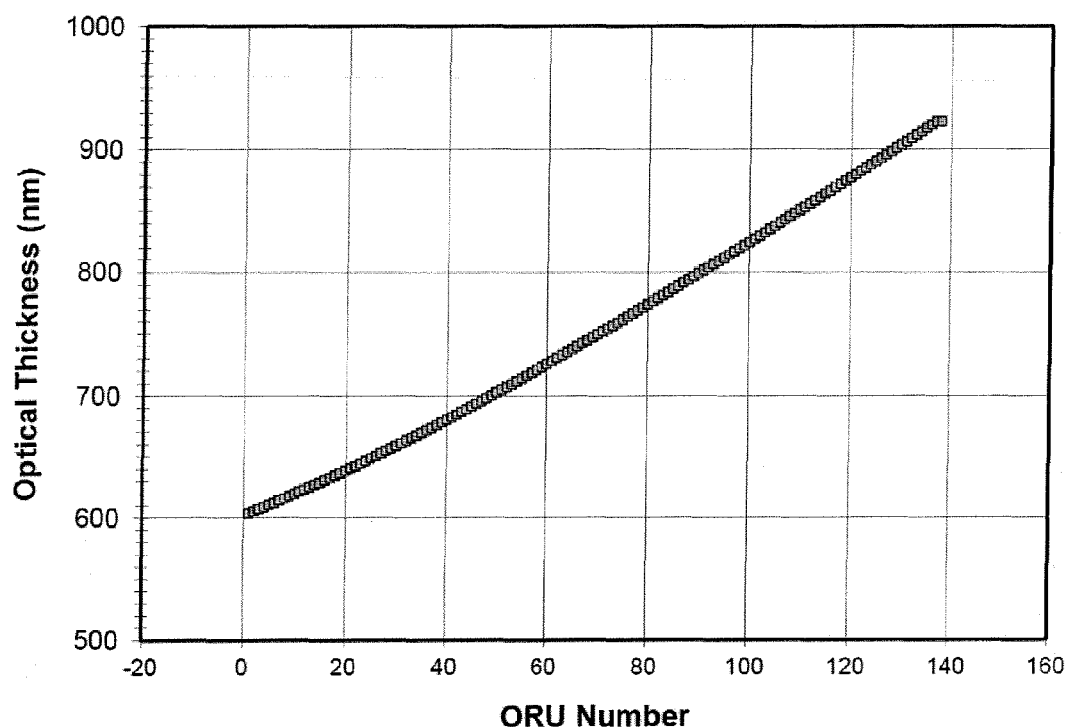
FIG. 13B is a layer thickness profile graph of a second microlayer stack that was modeled.

We now demonstrate how this methodology can be applied to a specific multilayer optical film embodiment with specific microlayer stacks tailored to provide interleaved overlapping harmonics for wide visible-infrared coverage, as discussed herein. The embodiment has a first microlayer stack with about 275 individual microlayers arranged in alternating fashion to provide about 137 ORUs, each ORU having one "A" microlayer and one "B" microlayer. The embodiment also has a second microlayer stack arranged in optical series with the first microlayer stack, the second microlayer stack also having about 275 individual microlayers arranged in alternating fashion to provide about 137 ORUs, each ORU again having one "A" microlayer and one "B" microlayer. The "A" microlayers in the two stacks are assumed to be made from PEN, and the "B" microlayers are made from PMMA. The relevant in-plane refractive index of the "A" microlayers is 1.75, and that of the "B" microlayers is 1.495. The first microlayer stack has an optical thickness gradient of its ORUs as shown in FIG. 13A, and the second stack has an ORU optical thickness gradient as shown in FIG. 13B. Each of the two stacks has an f-ratio of 0.32.

Figure 14A:
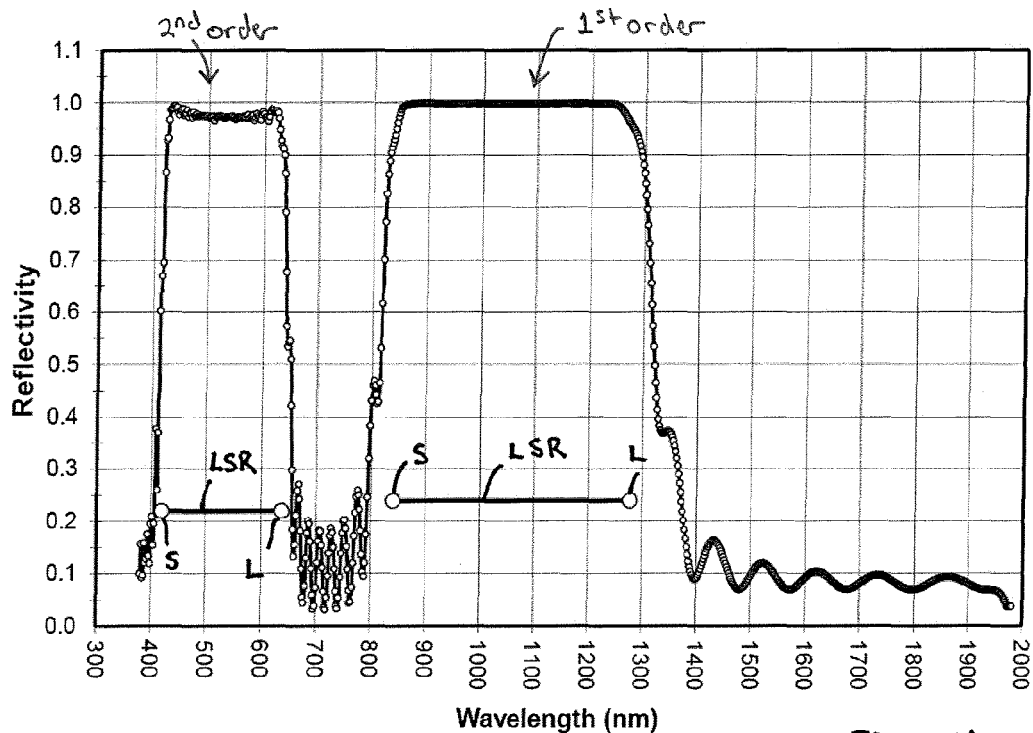
FIGS. 14A and 14B are graphs of the modeled spectral reflectivity resulting from the microlayer stacks of FIGS. 13A and 13B respectively.

Given its ORU thickness distribution and f-ratio, optical modeling software is used to calculate the spectral reflectivity of the first stack at normal incidence, which is shown in FIG. 14A. The reflectivity may be for one polarization state, as with the block axis of a polarizer, or for two orthogonal polarization states, as in the case of a mirror. In the figure, a distinct $1^{st}$ and $2^{nd}$ order reflection band can be discerned, with a spectral pass band formed between them. Line segments are superimposed on the graph, each line segment representing the location of a particular reflection band as determined with the band edge location methodology described herein. Each line segment is a linear representation of its associated reflection band. The line segments are labeled "LSR" for "line segment representation", and are defined by their endpoints as determined by the disclosed methodology. Thus, each line segment LSR has a short wavelength endpoint labeled "S", whose wavelength value is the wavelength of the left band edge of the reflection band, and a long wavelength endpoint labeled "L", whose wavelength value is the wavelength of the right band edge of the reflection band. By superimposing the line segments LSR on the reflection spectrum, one can readily see precisely where the $1^{st}$ order reflection band is located on the wavelength axis, and precisely where the $2^{nd}$ order reflection band is located on the wavelength axis.

Figure 14B:
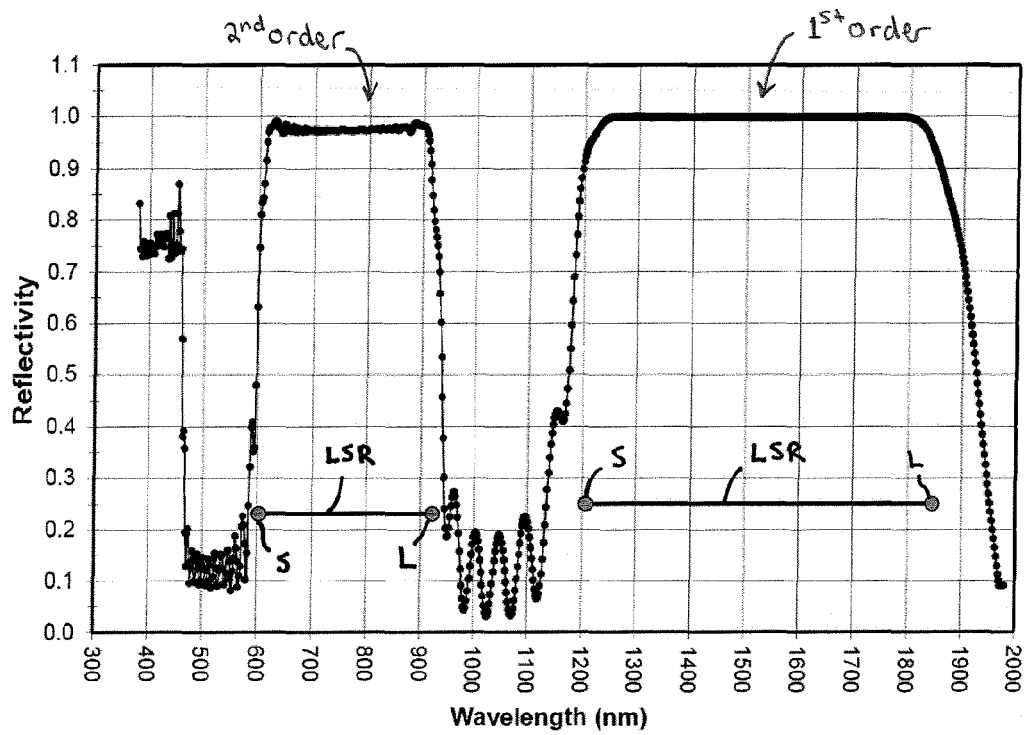
Figure 14C:
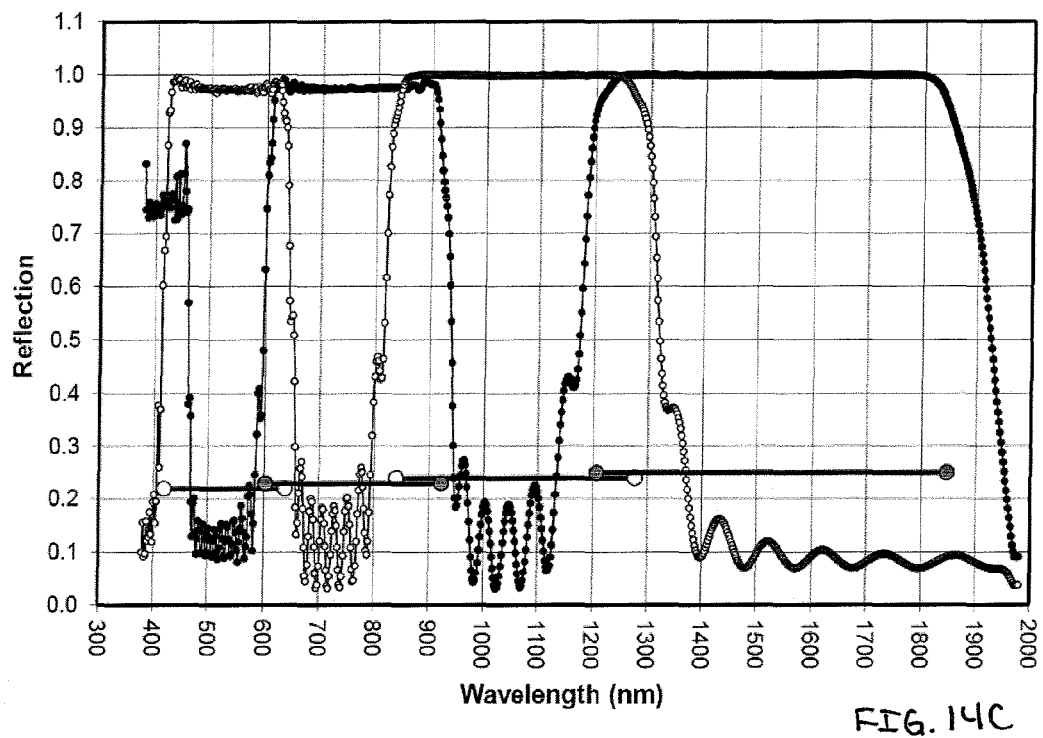
FIG. 14C is a graph of the spectral reflectivities from FIGS. 14A and 14B superimposed on each other.
Figure 15:
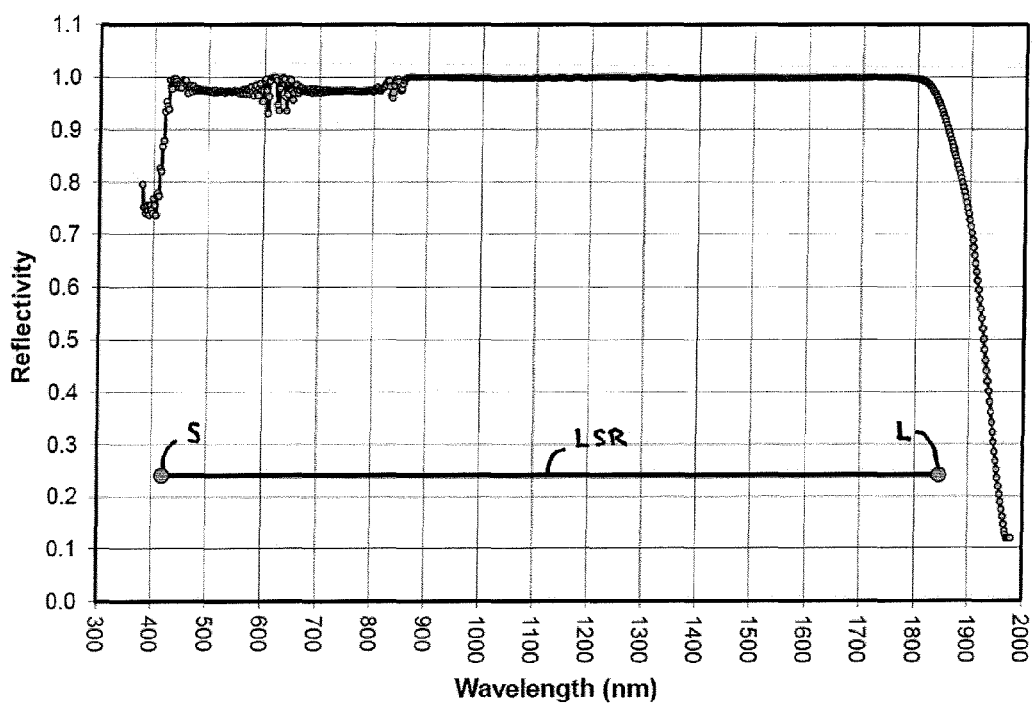
FIG. 15 is a graph of the modeled spectral reflectivity resulting from the combination of reflectivities from FIGS. 14A and 14B.

Similarly, the optical modeling software also calculates the spectral reflectivity of the second stack at normal incidence, which is shown in FIG. 14B. Again, this reflectivity may be for one or two polarization states, as desired. We again see distinct $1^{st}$ and $2^{nd}$ order reflection bands in the figure, with a spectral pass band formed between them. Line segments are again superimposed on the graph, each line segment representing the location of its associated reflection bands. The line segments are again labeled "LSR", and their endpoints define the locations of the band edges using the disclosed methodology, in similar fashion to FIG. 14A. FIG. 14C is a graph of the spectral reflectivities from FIGS. 14A and 14B superimposed on each other, with the representative line segments LSR for each of the four individual harmonic reflection bands also included. In this figure, one can readily see how the distinct harmonic bands from the different stacks are interleaved and overlapping with each other. The overlapping individual reflection bands thus produce a single wide reflection band that covers at least a portion of visible and infrared wavelengths, as shown in FIG. 15. In that figure, a new representative line segment LSR, representing the single wide reflection band, illustrates the spectral extent of the band and the position of its long and short wavelength band edges.

Figure 16A:
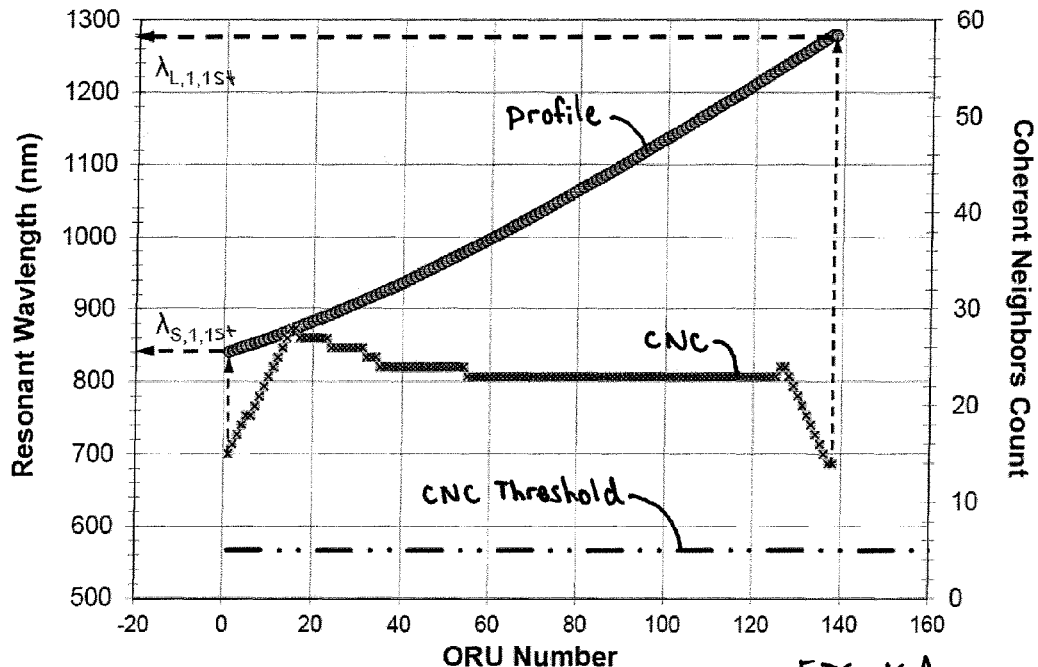
FIG. 16A is a combination graph which illustrates the methodology of how band edges of the $1^{st}$ order reflection band of the first microlayer stack (FIG. 13A) are determined.
Figure 16B:
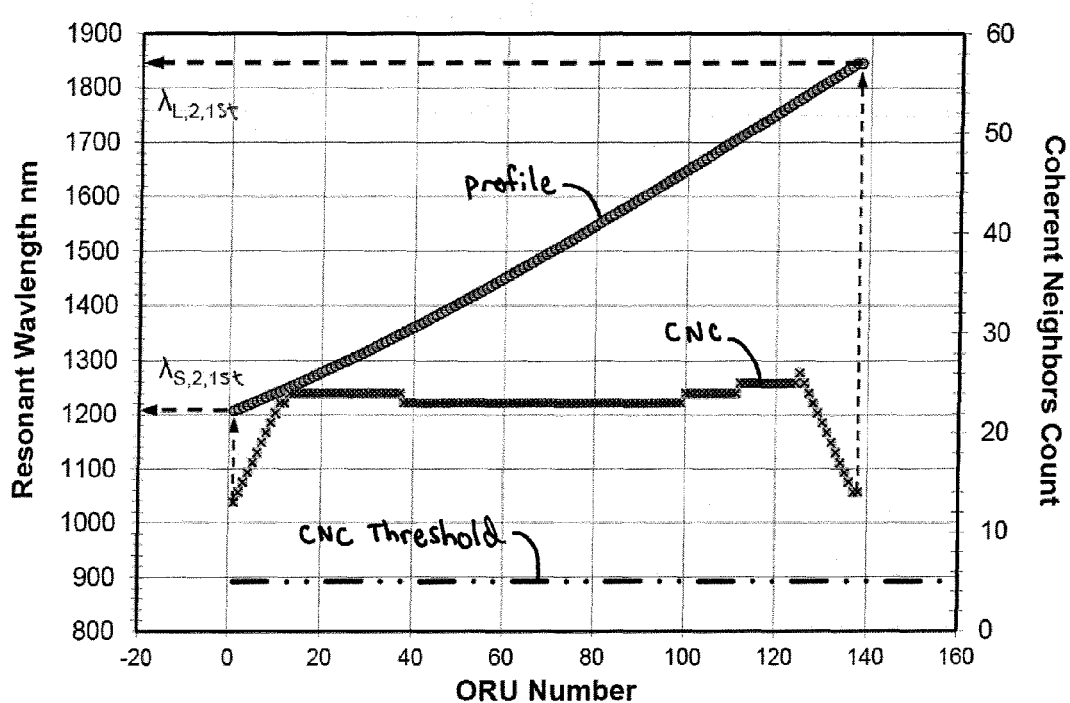
FIG. 16B is similar but for the second microlayer stack (FIG. 13B)
Figure 17A:
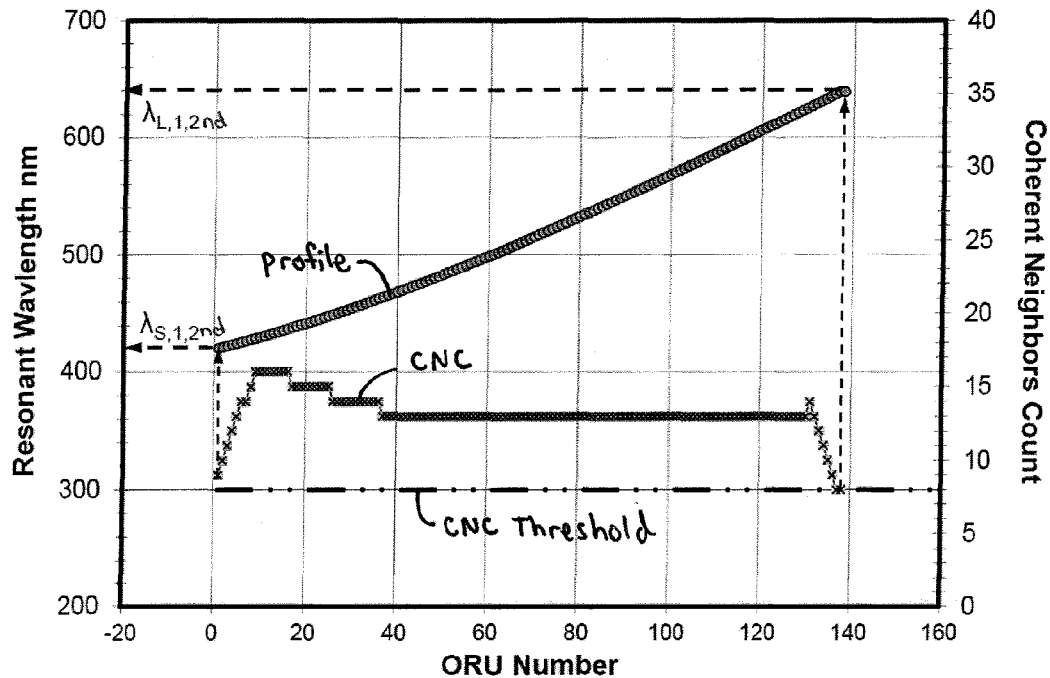
FIG. 17A is a combination graph illustrating the methodology of how band edges of the $2^{nd}$ order reflection band of the first microlayer stack (FIG. 13A) are determined.
Figure 17B:
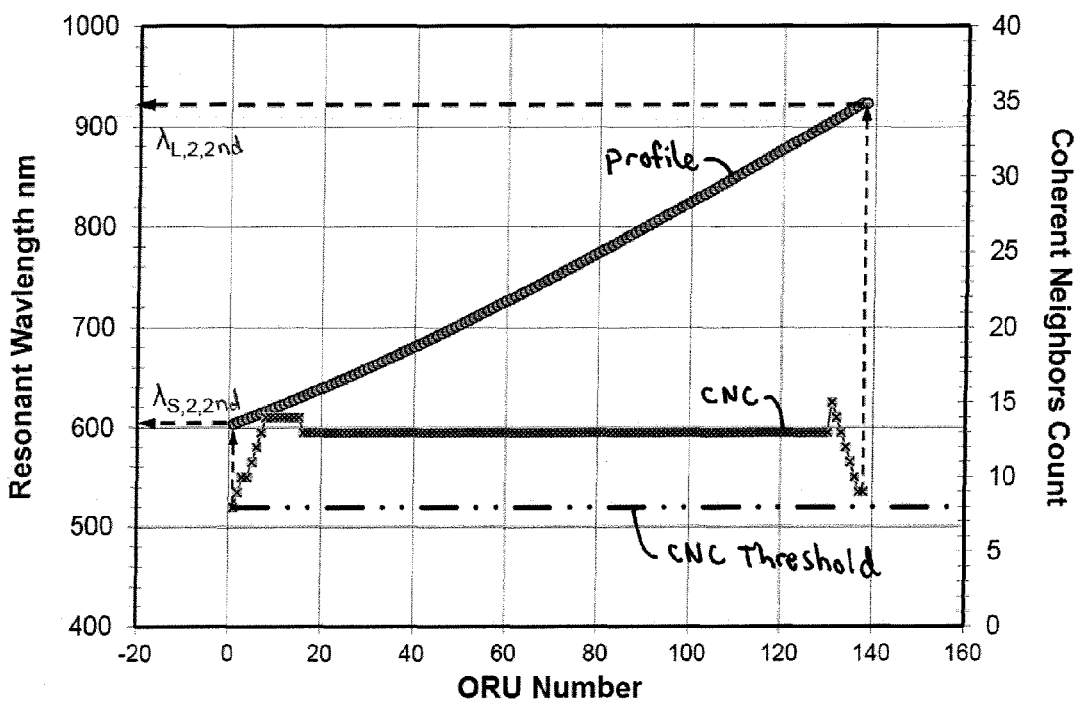
FIG. 17B is similar but for the second microlayer stack (FIG. 13B)

The methodology by which the precise location of each reflection band, as depicted by the line segments LSR in FIGS. 14A and 14B, is explained in connection with FIGS. 16A, 16B, 17A, and 17B. In this regard, FIG. 16A is a combination graph illustrating how the band edges of the $1^{st}$ order reflection band of the first microlayer stack (FIG. 13A) are determined, and FIG. 16B is a similar combination graph but for the second microlayer stack (FIG. 13B). Similarly, FIGS. 17A and 17B are combination graphs illustrating how the band edges of the $2^{nd}$ order reflection band of the first and second microlayer stack, respectively, are determined.

Using the above-described analysis of the $1^{st}$ microlayer stack of this optical film embodiment, the resonant wavelength profile profile for the $1^{st}$ order reflection harmonic and its associated Coherent Neighbors Count CNC was calculated and is shown in FIG. 16A. The CNC Threshold in FIG. 16A indicates the CNC level at which an ORU from the first microlayer stack has sufficient coherent reflectivity to achieve a reflectivity value greater than 25% of the reflection band peak, which in this instance is 0.99 (99%). The vertical/horizontal dashed line extending from the CNC point at ORU=1, to the associated resonate wavelength curve profile at ORU=1, and then over to the resonant wavelength axis at 841 nm, indicating for the purposes of this application, the short wavelength onset of this $1^{st}$ order harmonic reflection band from first microlayer stack of this example, symbolized by $\lambda_{S,1,1st}$. In a similar manner, by scanning the CNC curve CNC one finds that the longest resonant wavelength for which the CNC level is above the CNC Threshold, occurs for ORU=137, for which the associated resonant wavelength is 1278 nm, $\lambda_{L,1,1st}$=1278 nm.

By this described method, the wavelength-extent of the $1^{st}$ order reflection harmonic from the first microlayer stack is found to range from 841 nm to 1278 nm.

FIG. 16B shows a similar analysis for the $1^{st}$ order reflection harmonic for the second microlayer stack. In this instance, the reflection band peak is again 0.99 (99%), and the onset of the calculated 25% peak reflectivity, occurs for ORU=1, with an associated resonant wavelength of 1207 nm; $\lambda_{S,2,1st}$=1207 nm. The ORU number for which the longest resonant wavelength occurs, is ORU=137, corresponding to $\lambda_{L,2,1st}$=1846 nm.

FIG. 17A shows analysis performed by the described method for the $2^{nd}$ order reflection harmonic of the first microlayer stack. In this instance the relative reflective power coefficient $\alpha_m$ for the second order harmonic is slightly smaller than for the $1^{st}$ order harmonic, for f-ratio=0.32. The CNC Threshold for this analysis is again determined by the CNC value that calculates to a reflectivity of 25% of the $2^{nd}$ order harmonic reflection peak of 0.97 (97%). The shortest resonant wavelength ORU that rises to the threshold is for ORU=1 with an associated resonant wavelength of 420 nm and the longest resonant wavelength ORU with a CNC value above the threshold, is at 639 nm, for ORU=137.

FIG. 17B shows the analysis performed by the described method for the $2^{nd}$ order reflection harmonic of the second microlayer stack. The CNC Threshold for this analysis is again determined by the CNC value that calculates to a reflectivity of 25% of the $2^{nd}$ order harmonic reflection peak of 0.97 (97%). The shortest resonant wavelength ORU that rises to the threshold is for ORU=1 with an associated resonant wavelength of 603 nm and the longest resonant wavelength ORU with a CNC value above the threshold, is at 923 nm, for ORU=137.

EXAMPLES

Example 1

Coextruded Polymeric Film Stack

Two packets of 275 layers each of alternating low and high index polymer layers were coextruded as a cast web and then stretched in a tenter on a continuous film making line. The high index material was a 90/10 coPEN (90% naphthalate units to 10% terephthalate units). For the design polarization, the birefringent high index material had a measured refractive index of 1.795. The low index material differed between packet 1 and packet 2 of the microlayers. The low index material for packet 1 was a 55/45 coPEN and having an isotropic index n=1.605. The low index material for packet 2 was NEOSTAR FN007 copolyester from Eastman Chemical and had a measured index of 1.505. All indices were measured at 633 nm.

Figure 18:
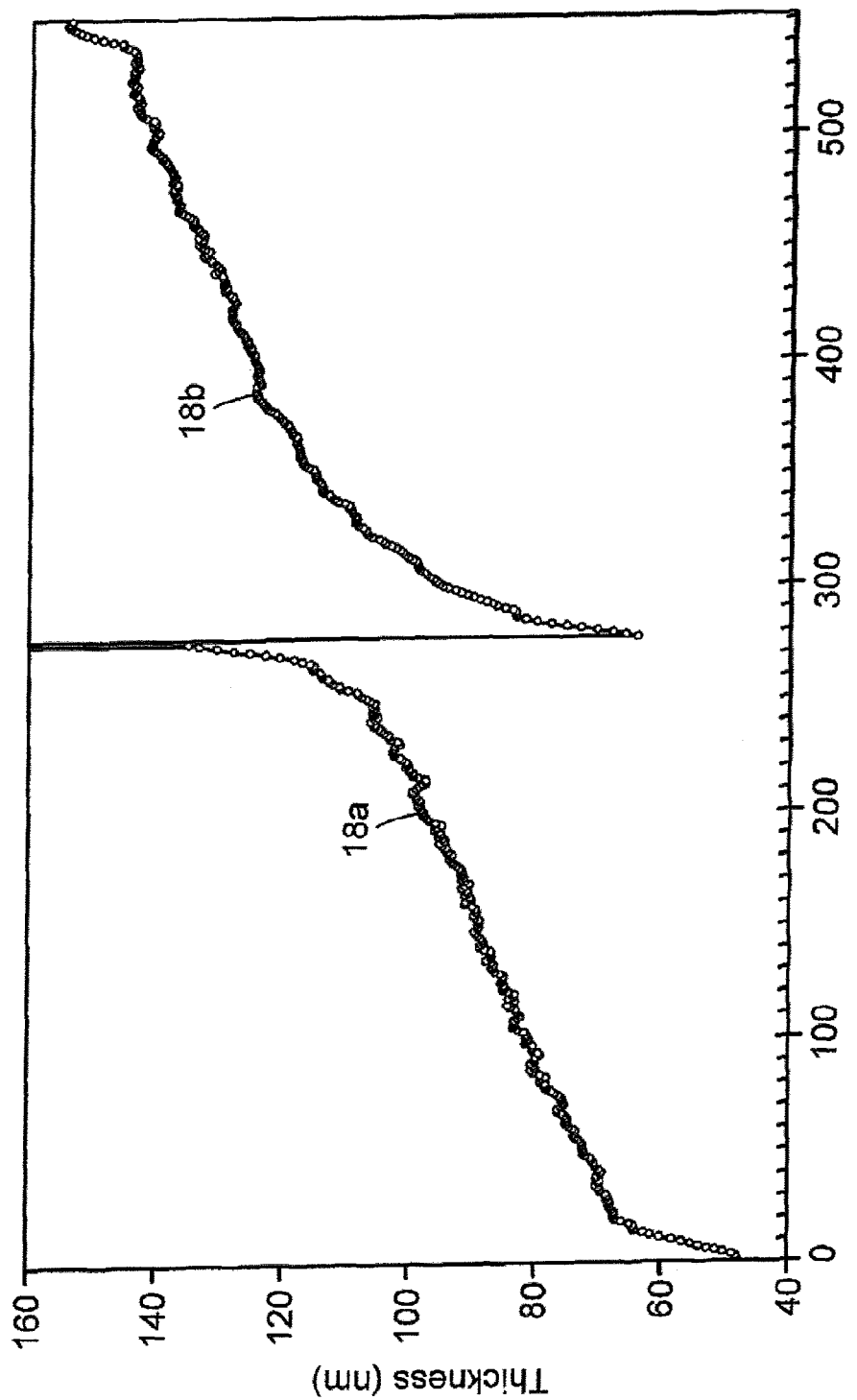
FIG. 18 is a layer profile thickness graph of an optical film having two apodized optical packets of Example 1.

The layer thickness values of the oriented film were measured using Atomic Force Microscopy (AFM), and the layer thickness profiles 18a and 18b for packets 1 and 2 are shown in FIG. 18. When the layer thickness values are measured, the measurement for packet 1 is typically performed on a separate sample than for packet 2. As a result, an optical model, using the AFM-measured layer thicknesses, sometimes must make small adjustments to the overall thickness of each of the packets, relative to one another, for the optical model of the reflection and transmission spectra to match the measured reflection and transmission spectra, made from the same sample.

Figure 19:
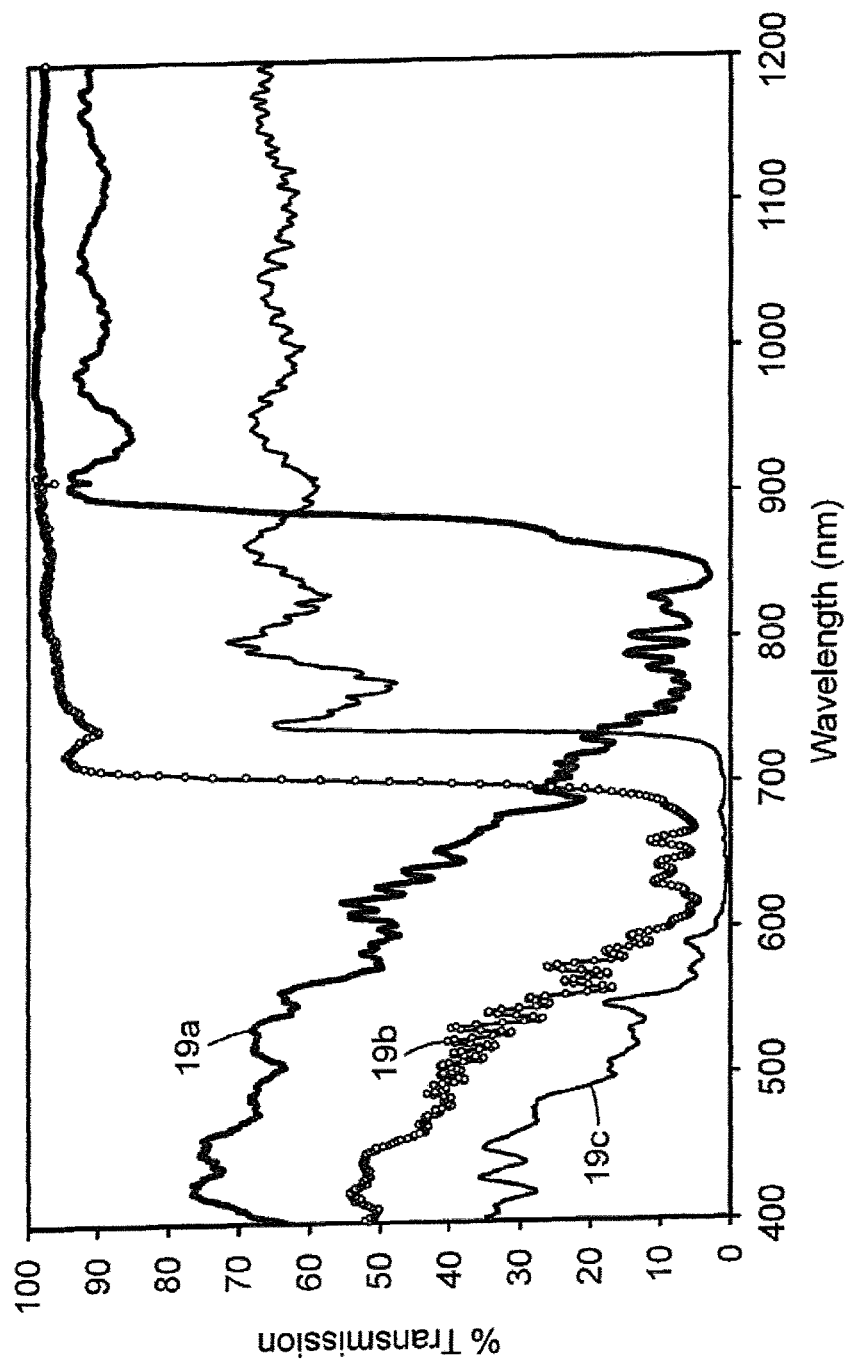
FIG. 19 is a graph of the spectra resulting from the layer thickness profile of FIG. 18.

We note that for the low absorption loss for the polymers used in this example, and for successive examples, the absorption upon transmission and reflection from the microlayer stacks (packets) is very low, and thus the assumption that R=1−T is a valid and accurate approximation. The measured pass axis spectrum 19a for normal incidence light was plotted in FIG. 19. The transmission at 60 degrees for p-pol and s-pol light were plotted as curves 19b and 19c respectively.

The average transmission values listed for each measurement (% T) were estimated by averaging the transmission values of each spectrum between 420 nm and 680 nm. No photopic weighting was used, although this could be applied if desired. The average % T values for this example were: for p-pol: 59% at 0 deg, dropping to 27% at 60 deg, and for s-pol: 59% at 0 deg. dropping to 13% at 60 deg. The ratios of the values of $T_{60}/T_{00}$ for p-pol and s-pol light were 0.46 and 0.22 respectively.

Figure 20:
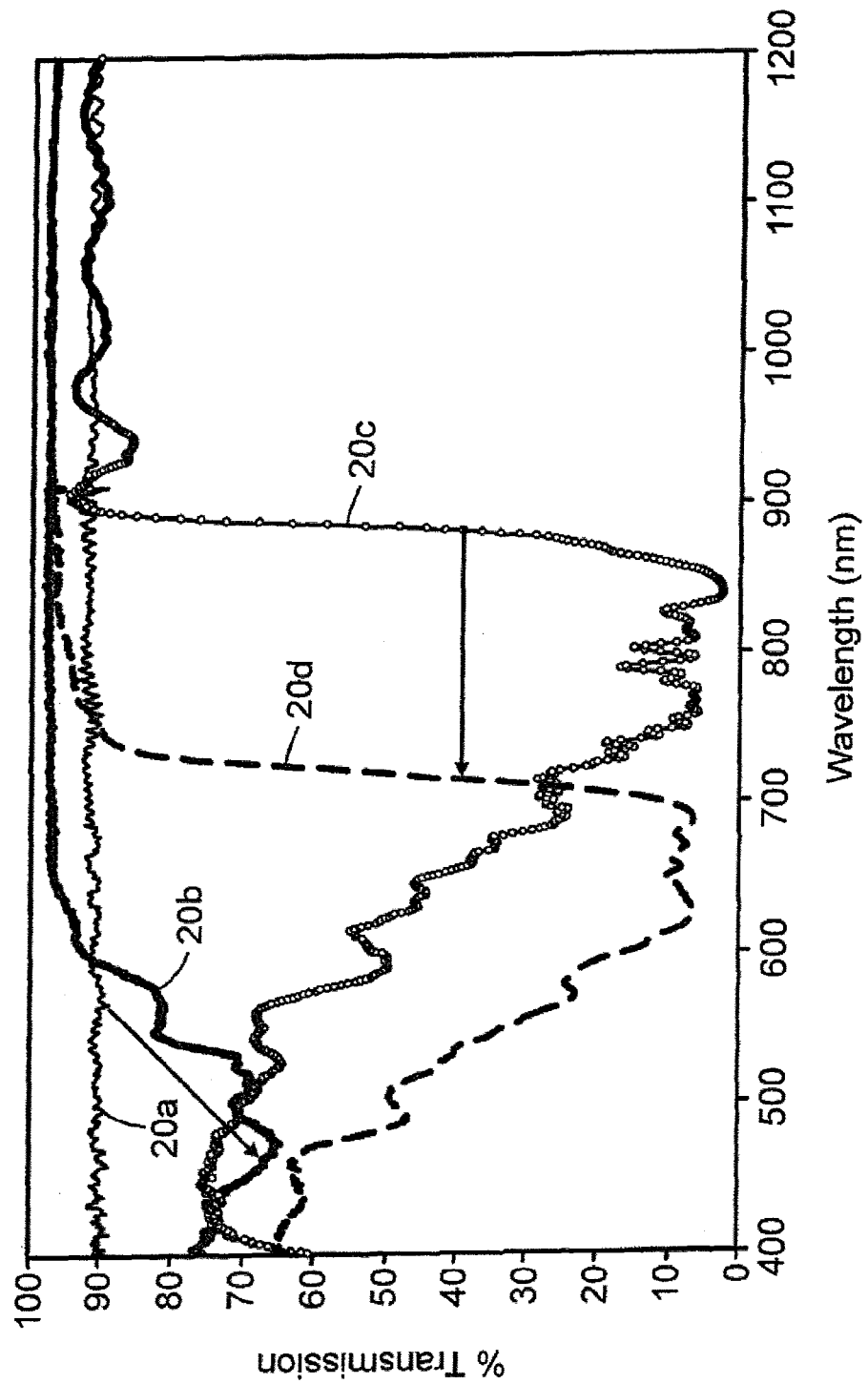
FIG. 20 is another graph of the spectra resulting from the layer thickness profile of FIG. 18.

The spectra 20a and 20b for packet 1, and spectra 20c and 20d for packet 2, measured from the pass axis at 0 and 60 degrees for p-polarized light are shown in FIG. 20. Note that packet 1 had essentially no reflectivity at normal incidence (except for the skin/air interfaces), but R increased substantially with increasing incidence angle. Packet 2 had essentially no increase in reflectivity with angle, and the spectrum only shifts to the left with increasing angle. The reflections from the air interfaces of these film specimens were ignored for this evaluation.

The large slope of the spectrum requires very high transmission of light in the blue and good collimation of recycled blue light also requires that the reflectivity of packet 1 increases more rapidly with angle than does the reflectivity of packet 2 for this film design. From FIG. 20, the approximate increase in reflectivity at 60 degrees compared to normal incidence was about a factor of 12× for packet 1 and about 0× for packet 2. These values were obtained from the following estimated transmission values for the two packets:

Packet 1: $R_0$≈2%, R60≈25%, ΔR≈12×
Packet 2: $R_0$≈R60, ΔR≈0×.

Figure 21:
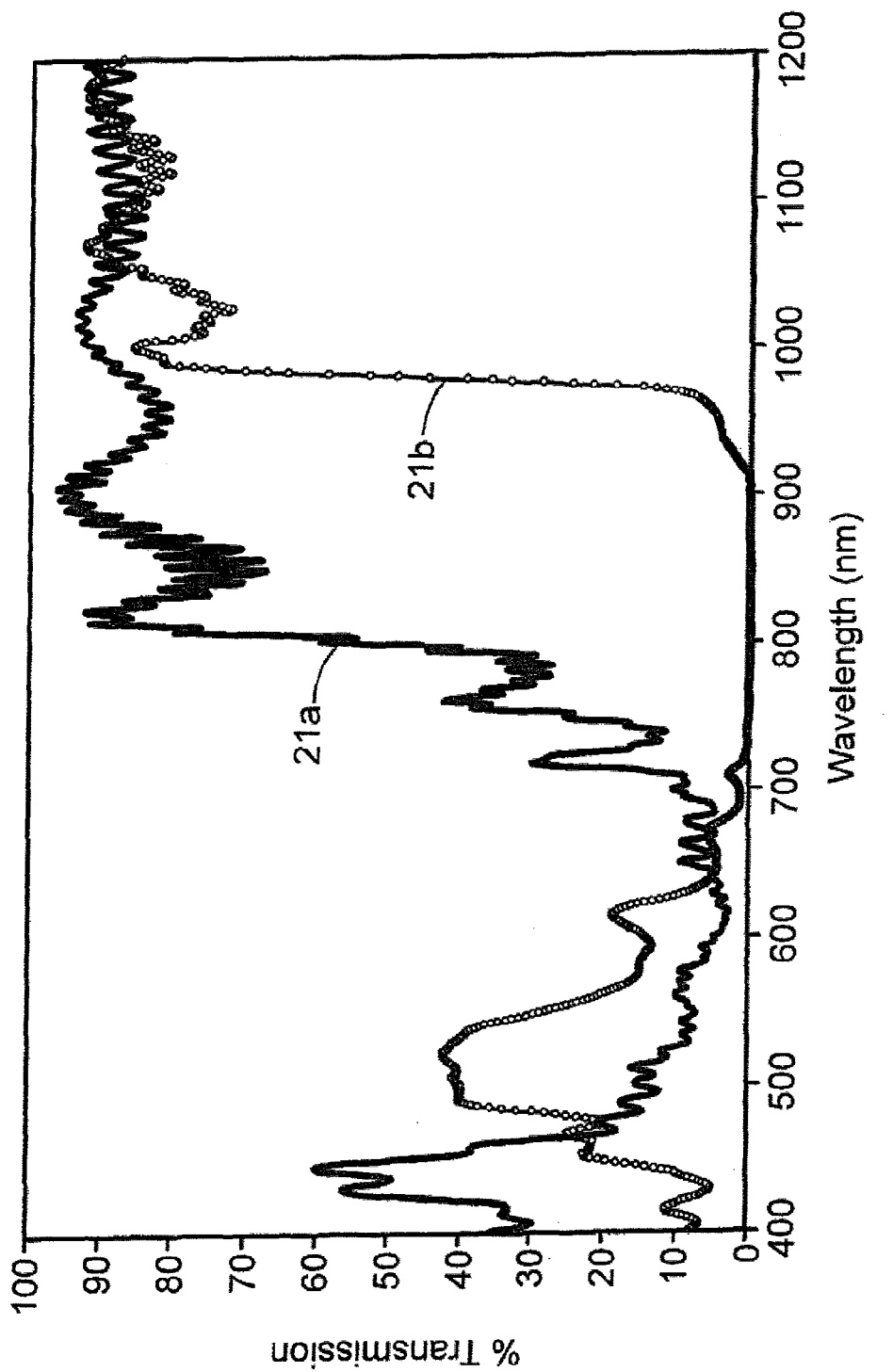
FIG. 21 is another graph of the spectra resulting from the layer thickness profile of FIG. 18.

The block axis spectra 21a and 21b for packets 1 and 2 respectively were plotted in FIG. 21. The spectrum of packet 1 is desirably flatter than what was achieved here and an average % T for packet 1 of substantially less than 10% is possible. Also note that some $2^{nd}$ order harmonic reflectivity from the thick layers of packet 2 assisted in lowering the block axis transmission in the wavelength range of 400 to 480 nm. $2^{nd}$ order harmonic reflectivity arises from stacks having an f-ratio that is above or below 0.5.

By performing an optical model "spectral fitting" exercise, employing the measured refractive index values for the stretched polymers of this example, and the measured layer thicknesses defining the ORUs of the packets, a best fit to the measured spectra is found by varying the f-ratio for ORUs within each packet. In addition, as mentioned as necessary above, a small adjustment to the overall thickness of packet 2 18b was made (5% thinner) to best match the modeled spectra to the measured spectra. In this exercise, it was found that the measured spectra for packet 1 was best matched by assuming an f-ratio of 0.64, and the measured spectra for packet 2 was best match by assuming an f-ratio of 0.62.

Figure 22A:
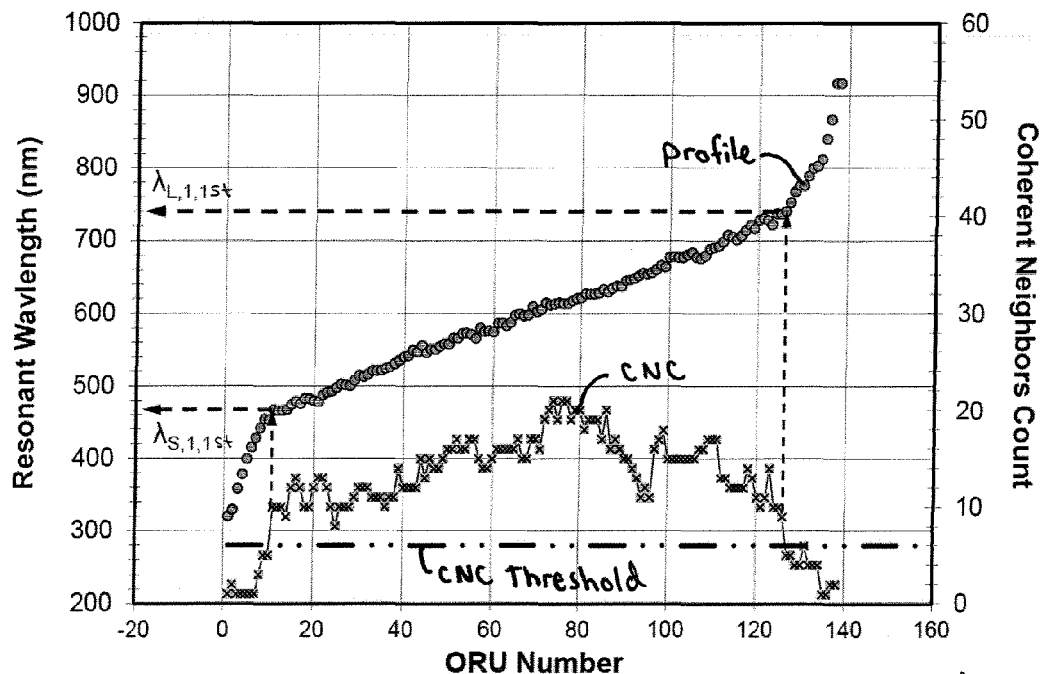
FIG. 22A is a combination graph for Example 1 illustrating the methodology of how band edges of the $1^{st}$ order reflection band of the first microlayer stack (curve 18a in FIG. 18) are determined.

Using the above-described analysis of the microlayer stack of packet 1 for this example, the resonant wavelength profile (labeled profile) for the $1^{st}$ order reflection harmonic and its associated Coherent Neighbors Count CNC was calculated and is shown in FIG. 22A. The CNC Threshold in FIG. 22A indicates the CNC level at which an ORU has sufficient coherent reflectivity to achieve a reflectivity value greater than 25% of the reflection band peak, which in this instance is 0.95 (95%). The vertical/horizontal dashed line extending from the CNC point at ORU=10, to the associated resonant wavelength value at ORU=10, and then over to the resonant wavelength axis at 466 nm, indicates, for the purposes of this application, the short wavelength onset of this $1^{st}$ order harmonic reflection band from packet 1 of this example, symbolized by $\lambda_{S,1,1st}$. In a similar manner, by scanning the CNC curve CNC one finds that the longest resonant wavelength for which the CNC level is above the CNC Threshold, occurs for ORU=126, for which the associated resonant wavelength is 740 nm, $\lambda_{L,1,1st}$=740 nm.

By this described method, the wavelength-extent of the $1^{st}$ order reflection harmonic from packet 1, is found to range from 466 nm to 740 nm.

Figure 22B:
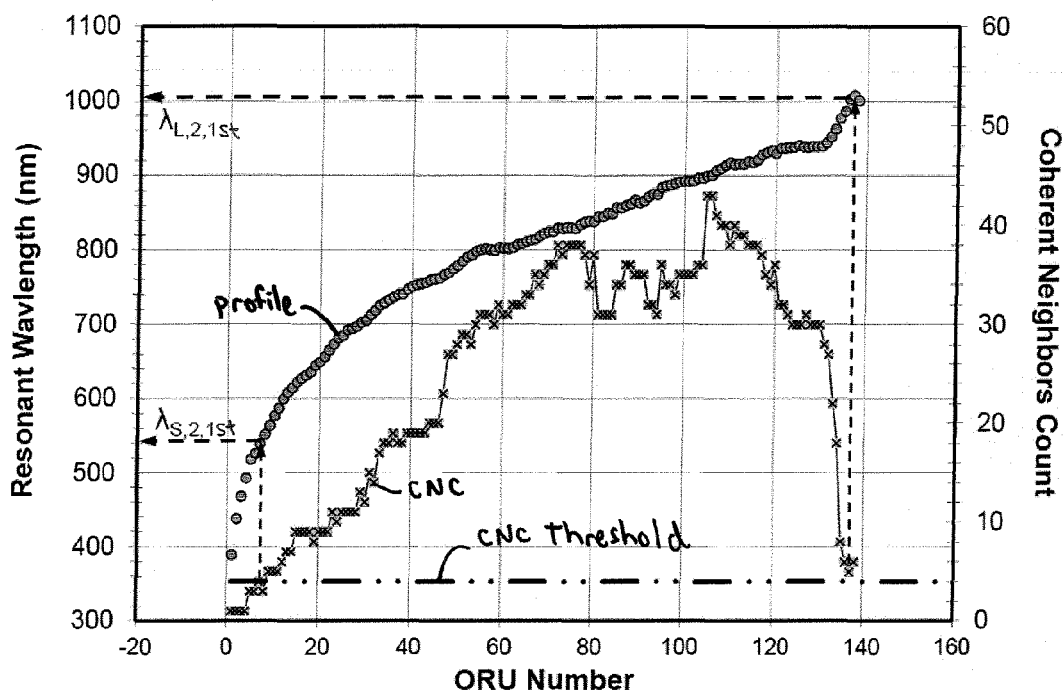
FIG. 22B is similar but for the second microlayer stack (curve 18b in FIG. 18)

FIG. 22B shows a similar analysis for the $1^{st}$ order reflection harmonic for packet 2. In this instance, the reflection band peak is 0.99 (99%), and the onset of the calculated 25% peak reflectivity, occurs for ORU=7, with an associated resonant wavelength of 540 nm, $\lambda_{S,2,1st}$=540 nm. The ORU number for which the longest resonant wavelength occurs is ORU=137, corresponding to $\lambda_{L,2,1st}$=1008 nm.

Figure 23:
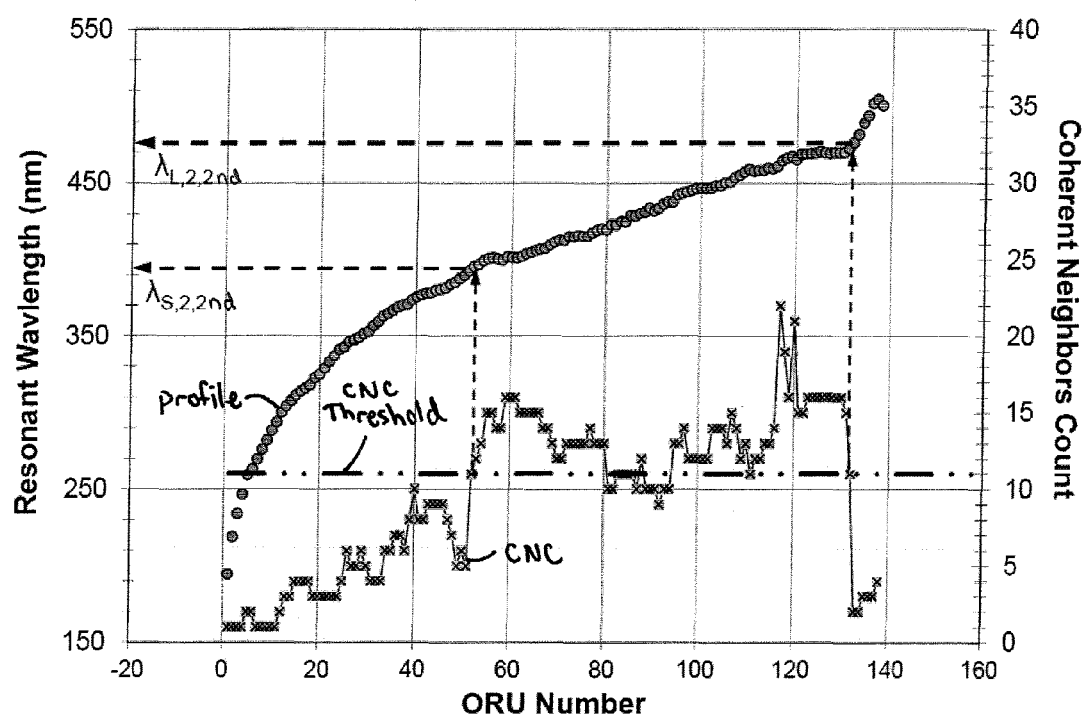
FIG. 23 is a combination graph for Example 1 illustrating the methodology of how band edges of the $2^{nd}$ order reflection band of the second microlayer stack (curve 18b in FIG. 18) are determined.

FIG. 23 shows analysis performed for the $2^{nd}$ order reflection harmonic of packet 2. In this instance the relative reflective power coefficient $\alpha_m$ for the second order harmonic is much smaller than for the $1^{st}$ order harmonic. The CNC Threshold for this analysis is again determined by the CNC value that calculates to a reflectivity of 25% of the $2^{nd}$ order harmonic reflection peak of 0.90 (90%). The shortest resonant wavelength ORU that rises to the threshold is for ORU=52 with an associated resonant wavelength of 396 nm and the longest resonant wavelength ORU with a CNC value above the threshold, is at 476 nm, for ORU=132. It is noted that for some ORUs within wavelength-extent of the $2^{nd}$ order reflection harmonic of packet 2, the CNC value falls below the level CNC Threshold. If the CNC values in this instance remain at least greater than 50% of the CNC Threshold value, then the reflection band is deemed continuous, and singular. If the CNC values in this instance fall below, 50% of the CNC Threshold value, then the reflection band is deemed discontinuous, and broken into separate reflection bands.

Figure 24A:
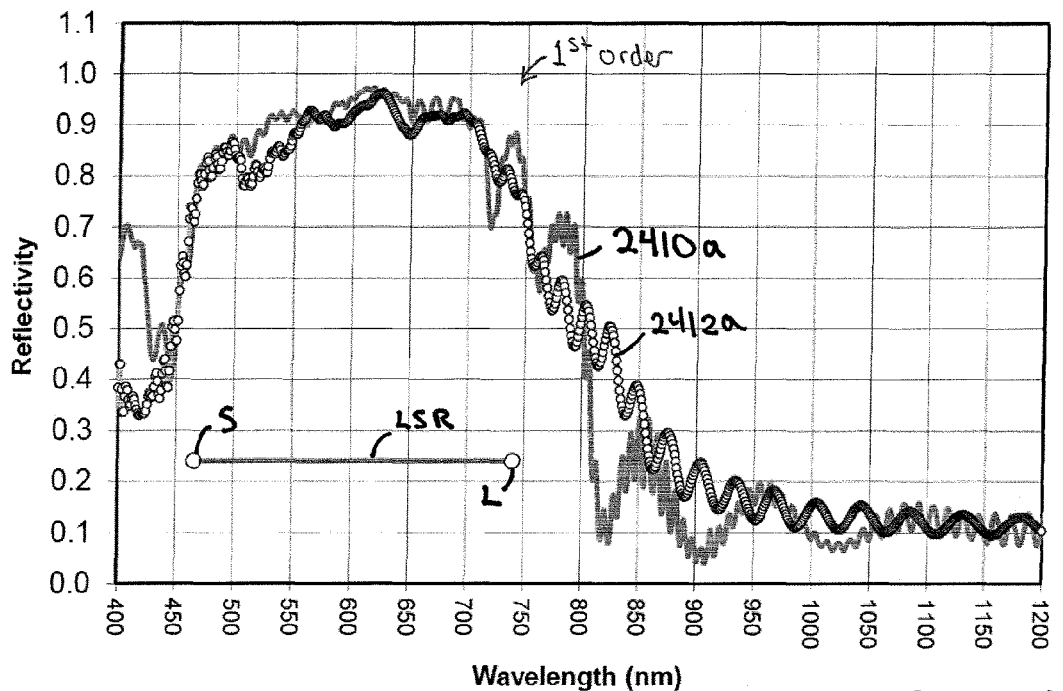
FIG. 24A is a graph for Example 1 that superimposes the measured spectral reflectivity from the first microlayer stack (curve 18a in FIG. 18) and the modeled spectral reflectivity based on the measured thickness profile of the same microlayer stack.

FIG. 24A shows the measured reflectivity spectrum for packet 1 of this example (determined from (R=1−T)), and the reflectivity spectrum calculated with an optical model using the measured refractive index values for the stretched polymer materials, and the measured layer thicknesses of 18a. The measured 2410a and the modeled 2412a reflectivity spectra agree well with one another. Also shown is a line segment representation LSR indicating the wavelength-extent of the $1^{st}$ order reflection harmonic of packet 1, as determined from the analysis of FIG. 22A.

Figure 24B:
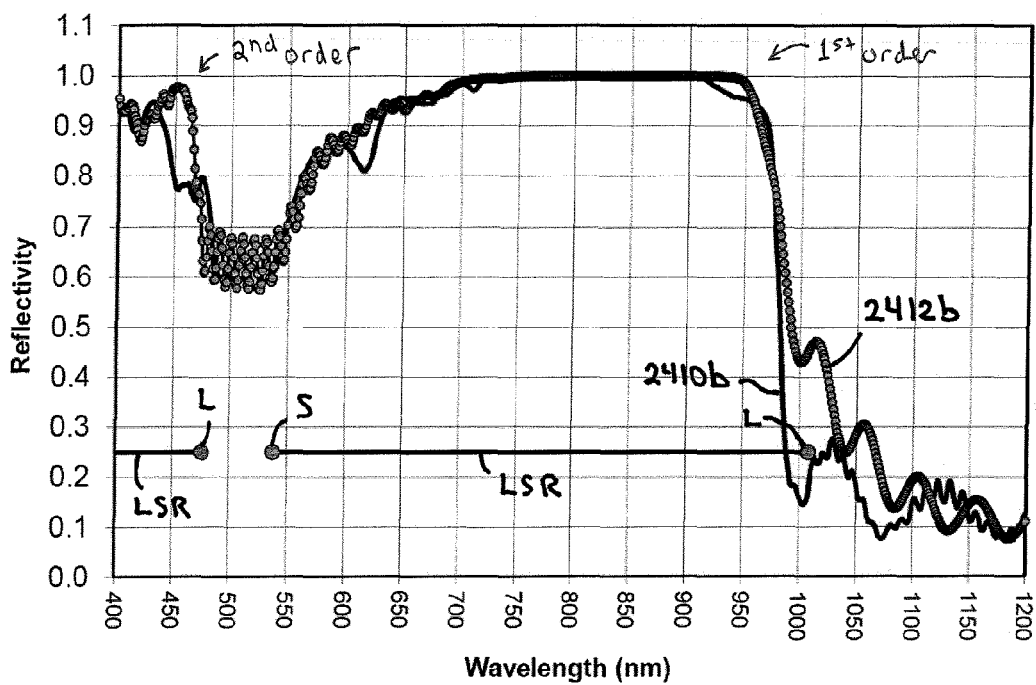
FIG. 24B is a graph similar to FIG. 24A but for the second microlayer stack (curve 18b in FIG. 18)

FIG. 24B shows the measured reflectivity spectrum for packet 2 of this example (determined from (R=1−T), and the reflectivity spectrum calculated with an optical model using the measured refractive index values for the stretched polymer materials, and the measured layer thicknesses of 18b with a 5% thickness reduction in the overall thicknesses. The measured 2410b and the modeled 2412b reflectivity spectra agree well with one another, showing both a $1^{st}$ order and a $2^{nd}$ order reflection harmonic. Also shown are two line segment representations LSR indicating the wavelength-extent of both the $1^{st}$ order reflection harmonic and the $2^{nd}$ order reflection harmonic of packet 2, as determined from the analysis of FIGS. 22B and 23. The LSR representations of the wavelength-extent of the $1^{st}$ and $2^{nd}$ order reflection harmonics show that the harmonics do not overlap, or occupy a common wavelength region.

Figure 24C:
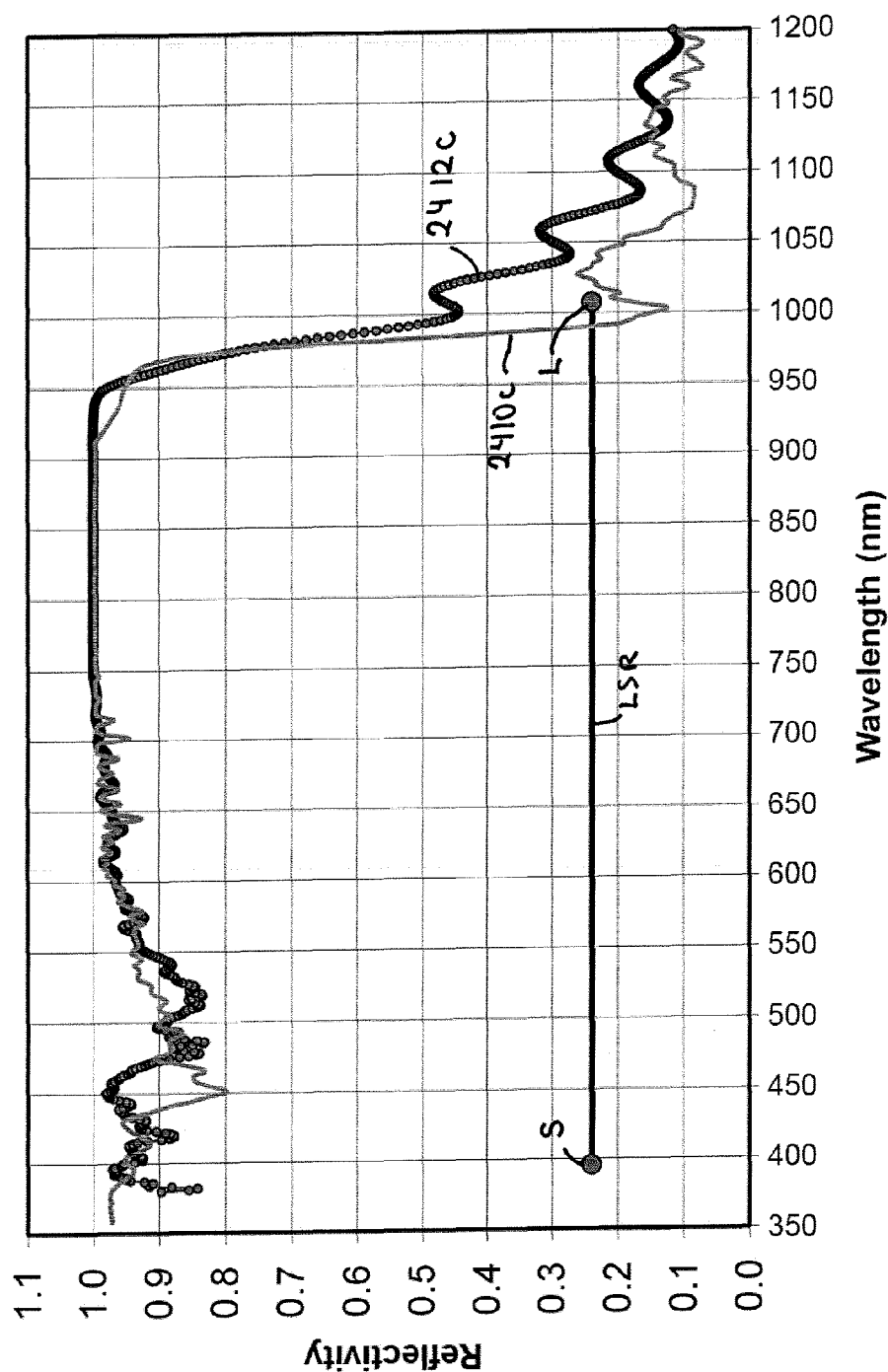
FIG. 24C is a graph of the single wide reflection band that results from combining the reflectivities of FIGS. 24A and 24B.

FIG. 24C shows the overall measured 2410c and modeled 2412c reflectivity spectra for the film of this example, wherein both packet 1, with its $1^{st}$ order reflection harmonic, and packet 2, with both of its $1^{st}$ and $2^{nd}$ order reflection harmonics, contribute to the overall wide reflection band. The line segment representation of the wavelength-extent of the overall reflection band is shown by LSR.

Example 2

Coextruded Polymeric Film

Two packets of 375 layers each of alternating low and high index polymer layers were coextruded as a cast web and then stretched in a tenter on a continuous film making line. The high index material was PEN (poly(ethylene naphthalenedicarboxylate)). For the design polarization, the birefringent high index material had a measured refractive index of 1.845. The low index material was PETg (EASTAR GN071 copolyester from Eastman Chemical, Kingsport, Tenn.) with an index of 1.564. All indices were measured at 633 nm.

The process conditions for the fabrication of the film of Example 2 were chosen so as to generate an f-ratio of 0.64, for all of the ORUs, of both packet 1 and packet 2, and to provide a reflection band for a chosen linear polarization of light, that extends to about 1050 nm at normal incidence angle. The layer thickness values of the oriented film were measured using Atomic Force Microscopy (AFM). Measured reflection spectra for each of packets 1 and 2, were found to compare well with modeled optical spectra using the measured layer thickness values (ORU thicknesses), the measured refractive index values, and assuming an f-ratio of 0.64.

Figure 25A:
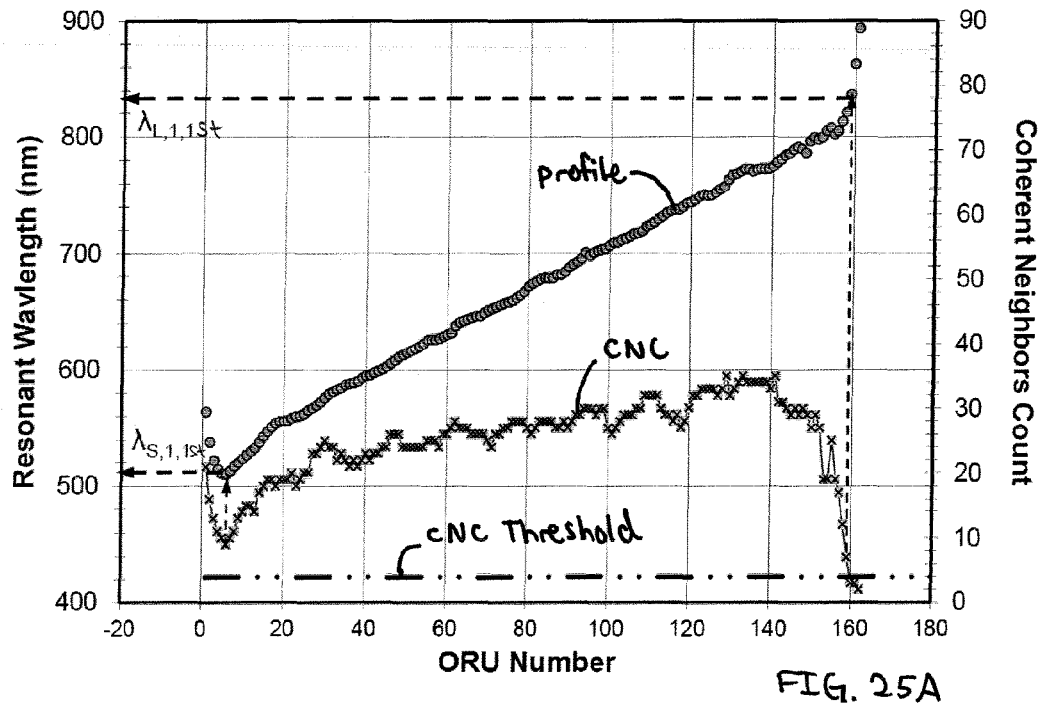
FIG. 25A is a combination graph for Example 2 illustrating the methodology of how band edges of the $1^{st}$ order reflection band of the first microlayer stack are determined.

FIG. 25A shows the above-described method, relating the measured layer thickness profile of the microlayer stack, the refractive index values, and the f-ratio, to the short-wavelength start and long-wavelength end of the reflection band, in this instance the $1^{st}$ order reflection harmonic of packet 1. In this instance, the analysis of FIG. 25A indicates the reflection band extends from 510 nm to 836 nm.

Figure 25B:
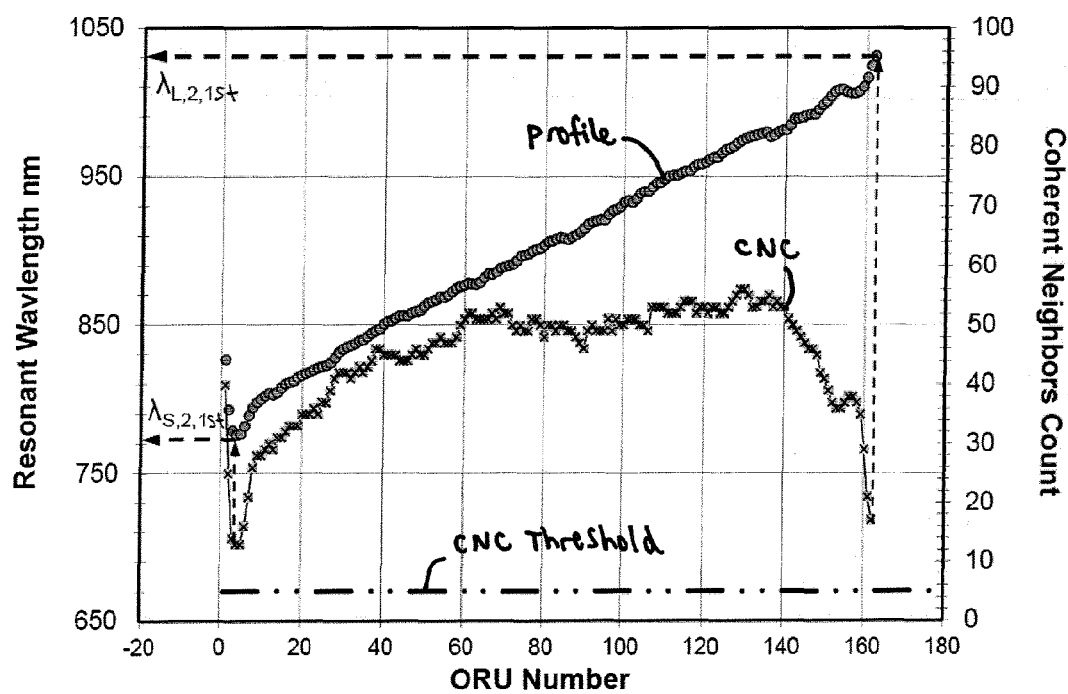
FIG. 25B is similar but for the second microlayer stack of Example 2.

FIG. 25B shows the same method as applied to the $1^{st}$ order reflection harmonic of packet 2, indicating the reflection band extends from 775 nm to 1030 nm.

Figure 26A:
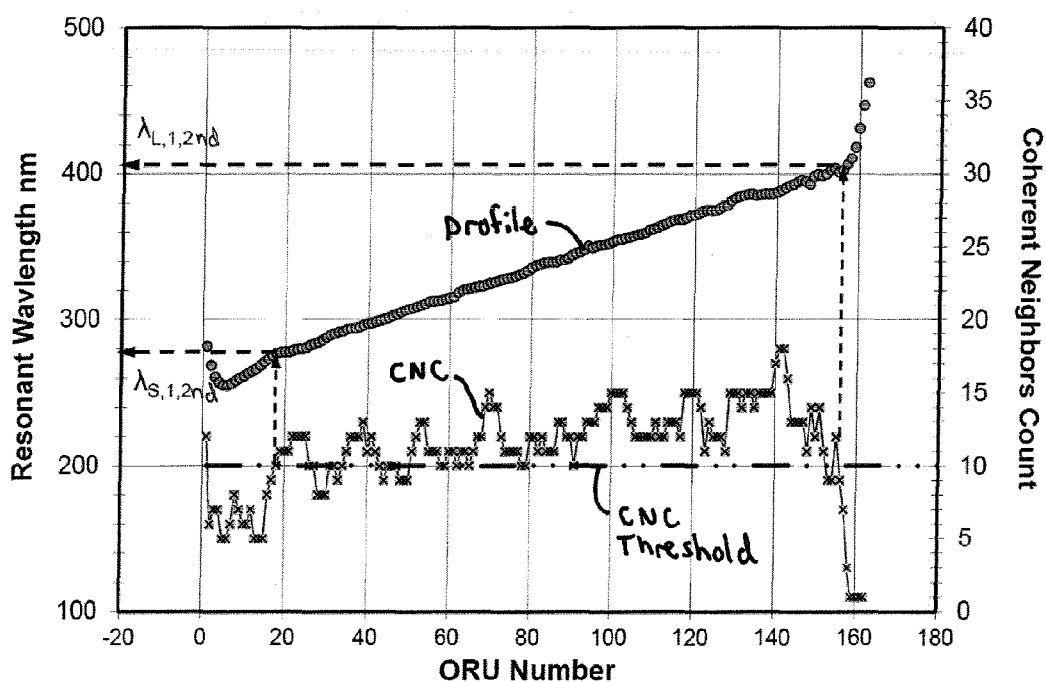
FIG. 26A is a combination graph for Example 2 illustrating the methodology of how band edges of the $2^{nd}$ order reflection band of the first microlayer stack are determined.
Figure 26B:
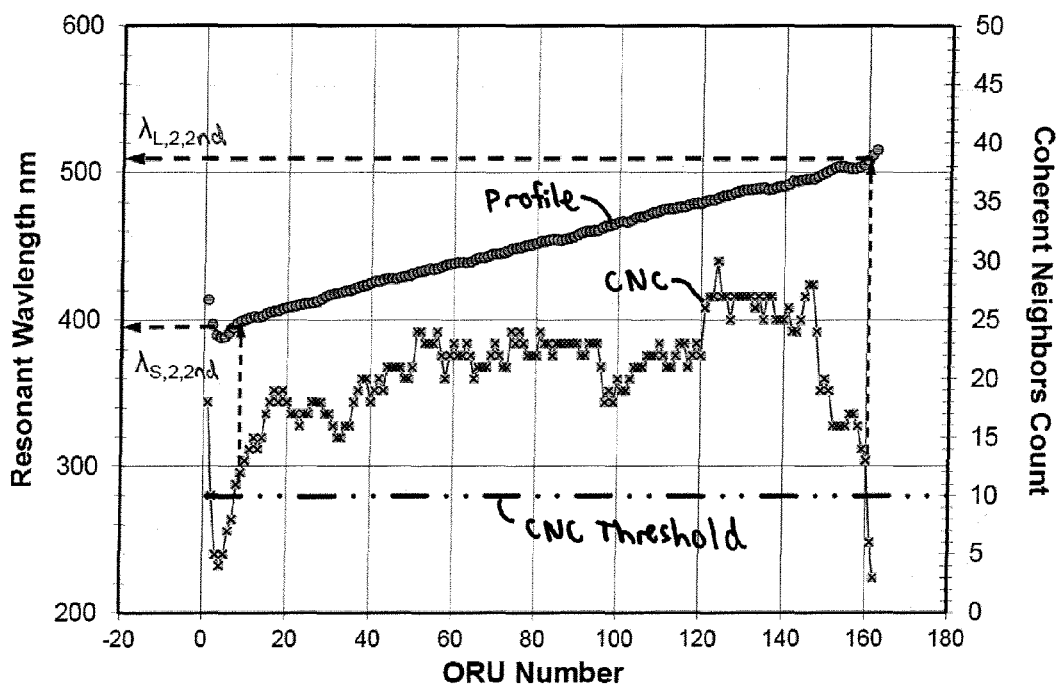
FIG. 26B is similar but for the second microlayer stack of Example 2.

FIGS. 26A and 26B show the results of this method, applied to the $2^{nd}$ order reflection harmonics of packet 1 and packet 2, respectively. This method indicates that the $2^{nd}$ order harmonic reflection band for packet 1 has a wavelength-extent from 276 nm to 410 nm, and the $2^{nd}$ order harmonic reflection band for packet 2 has a wavelength-extent from 396 nm to 508 nm.

Figure 27A:
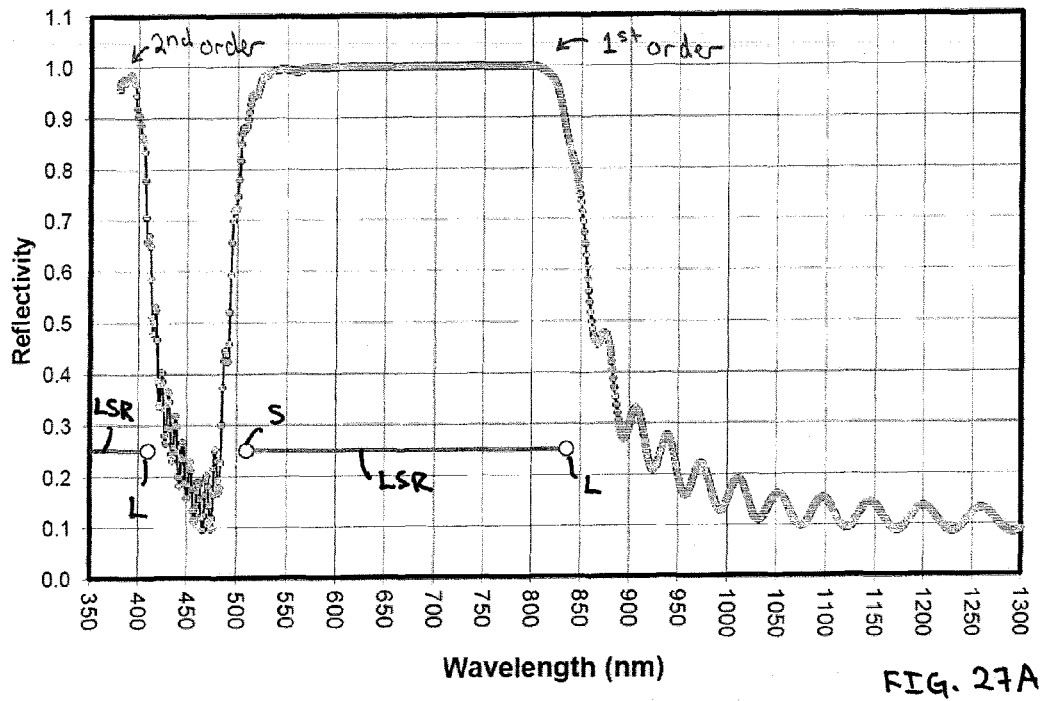
FIG. 27A is a graph for Example 2 of the modeled spectral reflectivity of the first microlayer stack based on its measured thickness profile.

FIG. 27A shows the calculated reflectivity spectrum for packet 1 of this example, with both the $1^{st}$ and 2nd order reflection harmonics being indicated. The line segment representations LSR of the wavelength-extent of the two reflection bands are also shown.

Figure 27B:
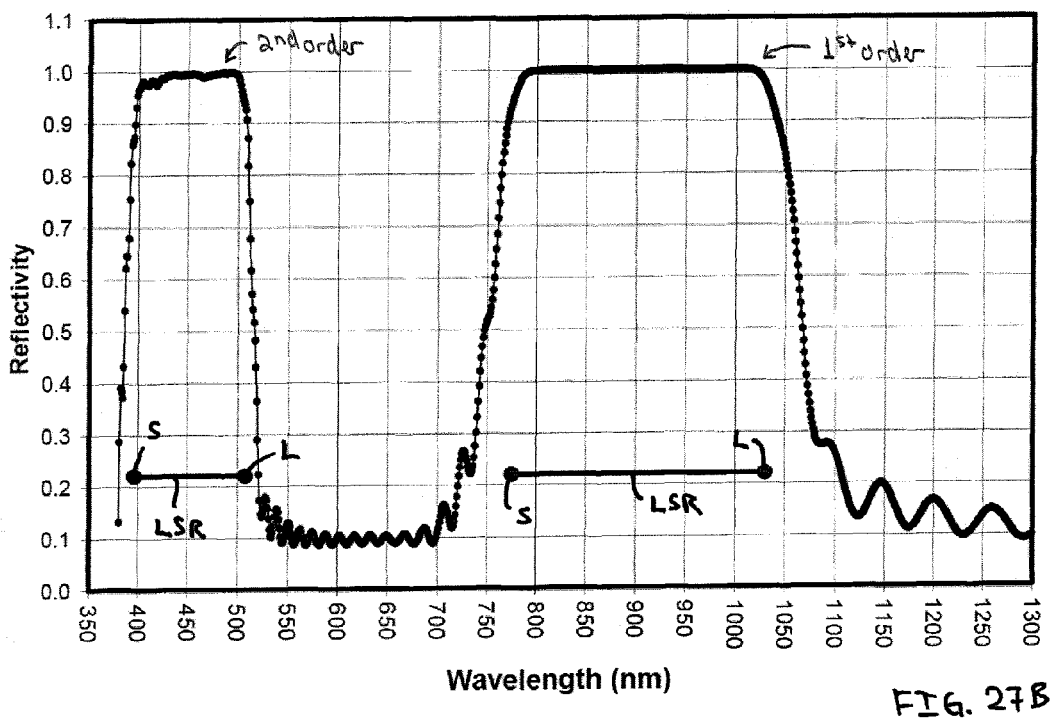
FIG. 27B is similar but for the second microlayer stack of Example 2.

FIG. 27B shows the calculated reflectivity spectrum for packet 2 of this example, with both the $1^{st}$ and 2nd order reflection harmonics being indicated. The line segment representations LSR of the wavelength-extent of the two reflection bands are also shown. In each of FIGS. 27A and 27B, the line segment representations of the $1^{st}$ and $2^{nd}$ order reflection harmonics show that the harmonics do not overlap, or occupy a common wavelength region.

Figure 27C:
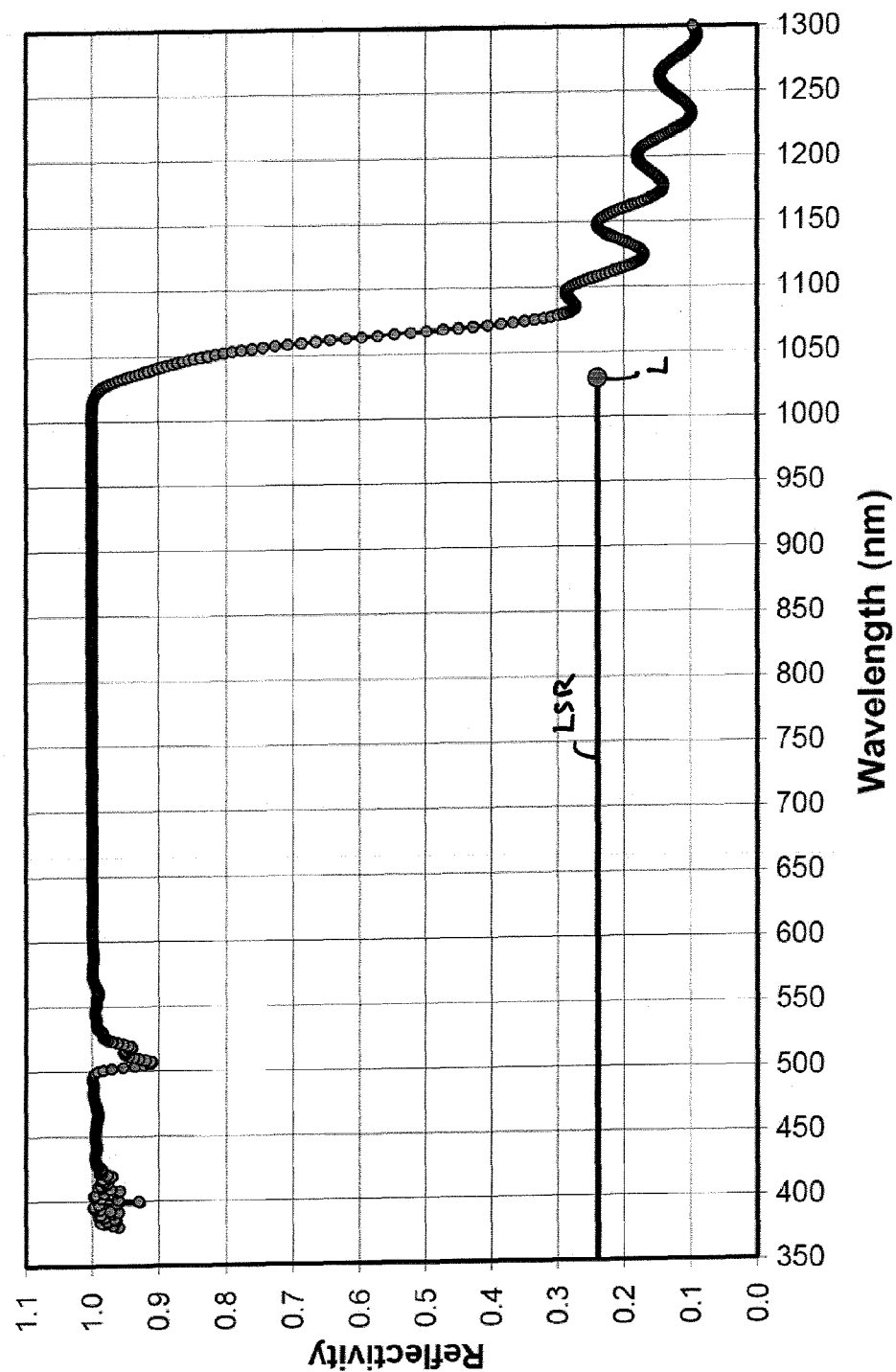
FIG. 27C is a graph of the single wide reflection band that results from combining the reflectivities of FIGS. 27A and 27B.

FIG. 27C shows the overall reflectivity spectra for the film of Example 2, wherein both packet 1, with its $1^{st}$ and $2^{nd}$ order reflection harmonics, and packet 2, with both of its $1^{st}$ and $2^{nd}$ order reflection harmonics, contribute to the overall wide reflection band. The line segment representation of the wavelength-extent of the overall reflection band is shown by LSR.

Example 3

Coextruded Polymeric Film

Two packets of 325 layers each of alternating low and high index polymer layers were coextruded as a cast web and then stretched in a tenter on a continuous film making line. The high index material was PEN (poly(ethylene naphthalenedicarboxylate)). For the design polarization, the birefringent high index material had a measured refractive index of 1.845. The low index material was PETg (EASTAR GN071 copolyester from Eastman Chemical, Kingsport, Tenn.) with an index of 1.564. All indices were measured at 633 nm.

The process conditions for the fabrication of the film of Example 2, were chosen so as to generate an f-ratio of 0.64, for all of the ORUs, of both packet 1 and packet 2, and to provide a reflection band for a chosen linear polarization of light, that extends to about 1250 nm at normal incidence angle. The layer thickness values of the oriented film were measured using Atomic Force Microscopy (AFM). Measured reflection spectra for each of packets 1 and 2, were found to compare well with modeled optical spectra using the measured layer thickness values (ORU thicknesses), the measured refractive index values, and assuming an f-ratio of 0.64.

Figure 28A:
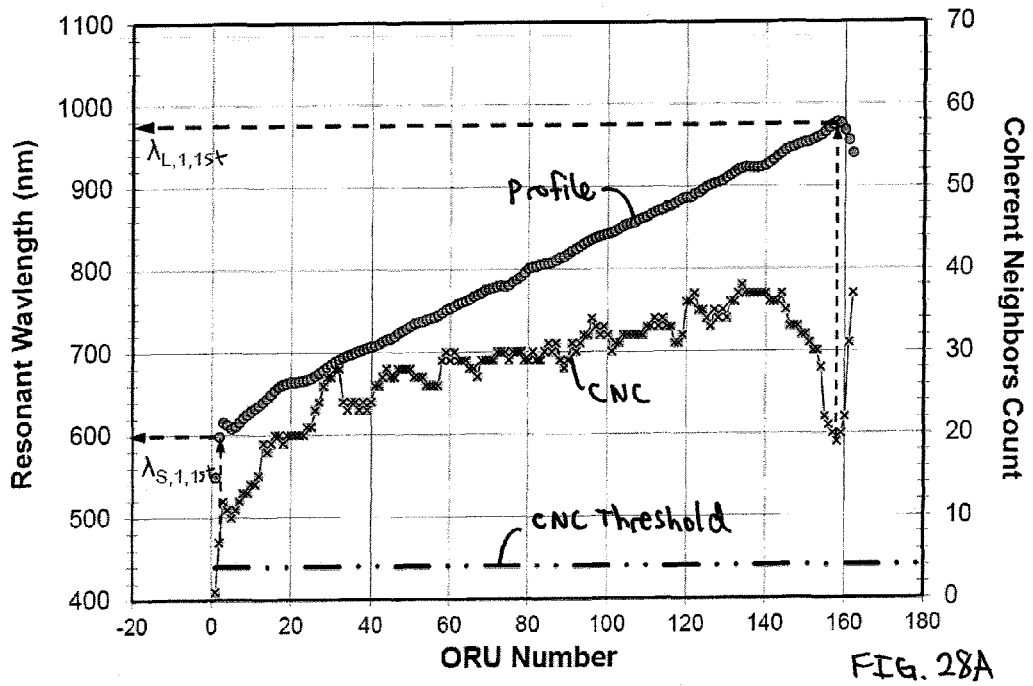
FIG. 28A is a combination graph for Example 3 illustrating the methodology of how band edges of the $1^{st}$ order reflection band of the first microlayer stack are determined.

FIG. 28A shows the above-describe method, relating the measured layer thickness profile of the microlayer stack, the refractive index values, and the f-ratio, to the short-wavelength start and long-wavelength end of the reflection band, in this instance the $1^{st}$ order reflection harmonic of packet 1. In this instance, the analysis of FIG. 28A indicates the reflection band extends from 598 nm to 978 nm.

Figure 28B:
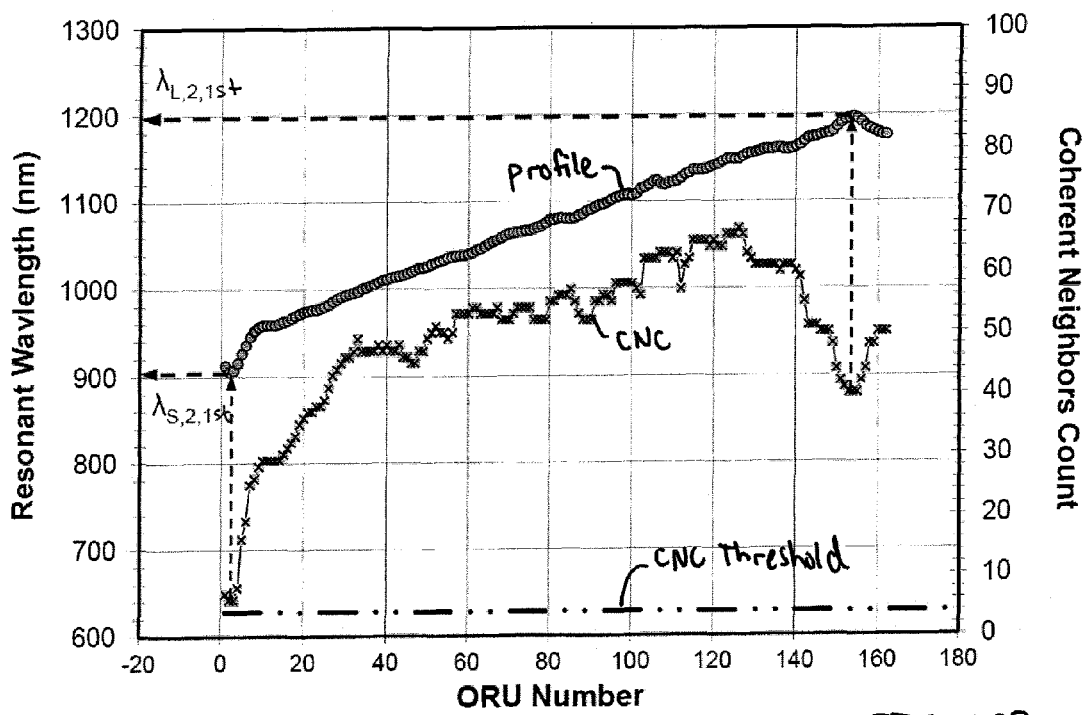
FIG. 28B is similar but for the second microlayer stack of Example 3.

FIG. 28B shows the same method as applied to the $1^{st}$ order reflection harmonic of packet 2, indicating the reflection band to extends from 905 nm to 1196 nm.

Figure 29A:
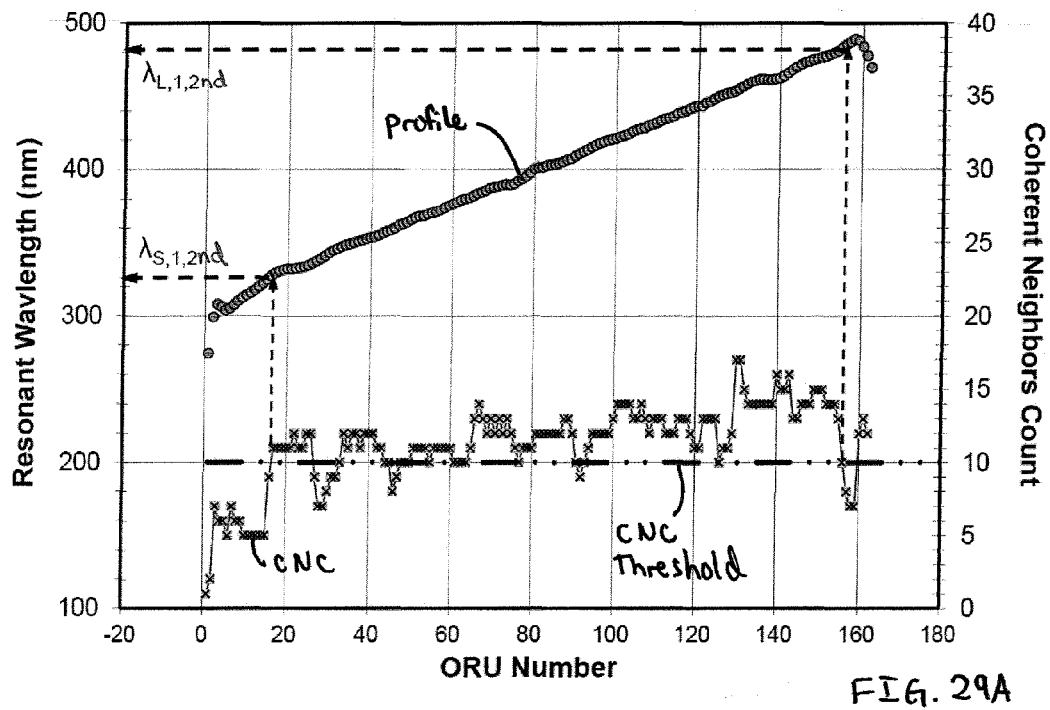
FIG. 29A is a combination graph for Example 3 illustrating the methodology of how band edges of the $2^{nd}$ order reflection band of the first microlayer stack are determined.
Figure 29B:
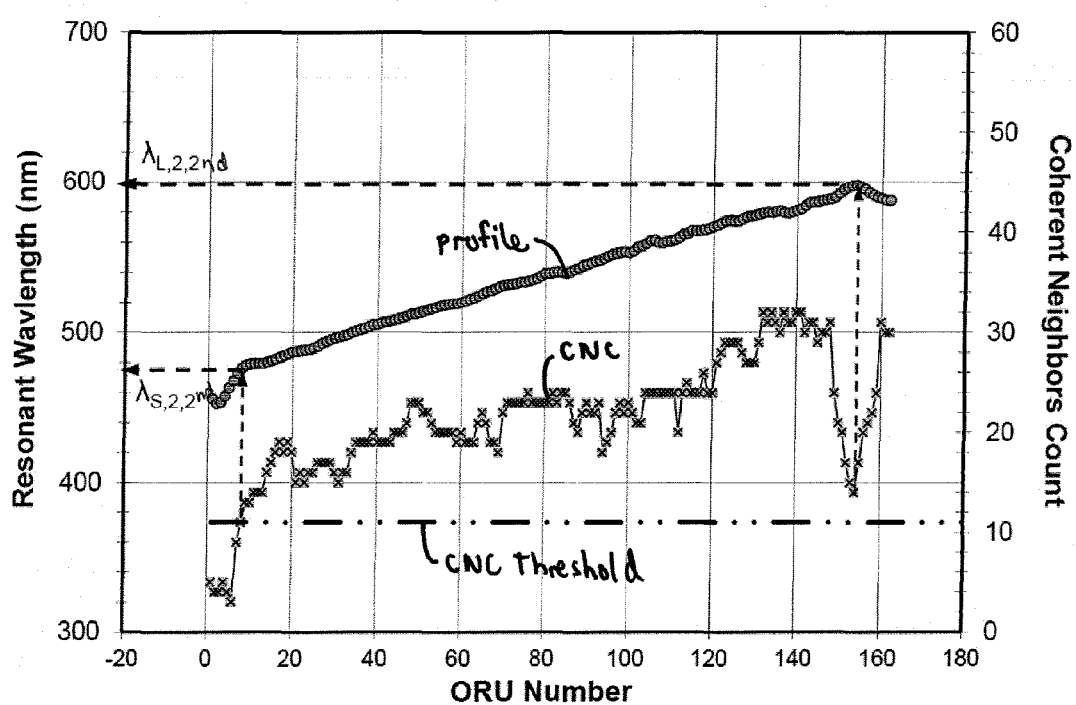
FIG. 29B is similar but for the second microlayer stack of Example 3.

FIGS. 29A and 29B show the results of this method, applied to the $2^{nd}$ order reflection harmonics of packet 1 and packet 2, respectively. This method indicates that the $2^{nd}$ order harmonic reflection band for packet 1 has a wavelength-extent from 329 nm to 485 nm, and the $2^{nd}$ order harmonic reflection band for packet 2 has a wavelength-extent from 476 nm to 598 nm.

Figure 30A:
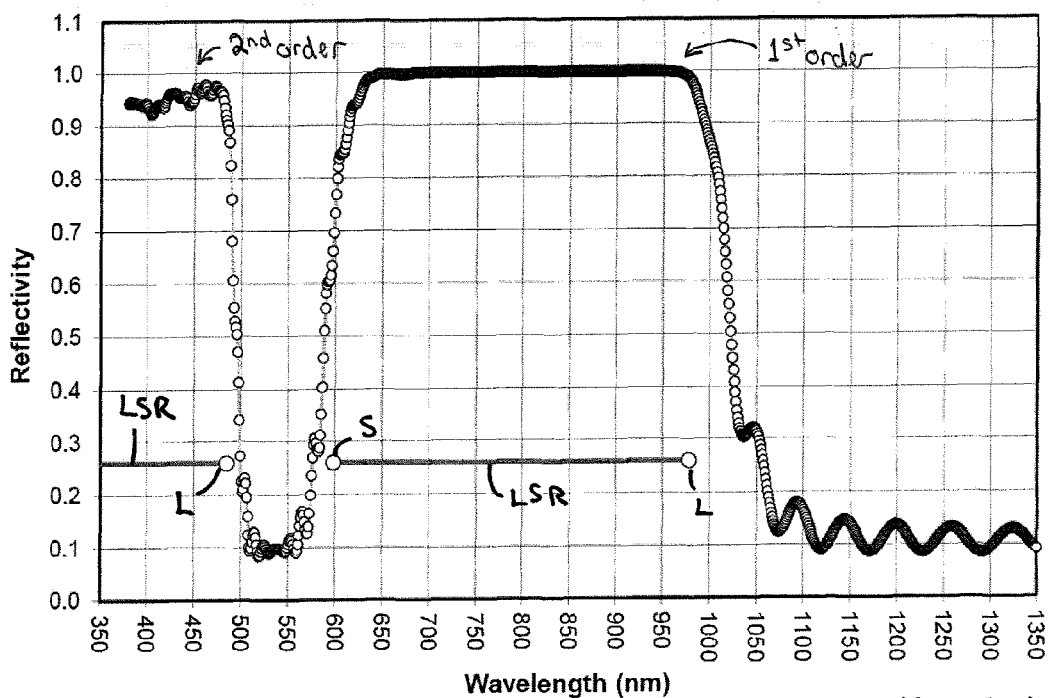
FIG. 30A is a graph for Example 3 of the modeled spectral reflectivity of the first microlayer stack based on its measured thickness profile.

FIG. 30A shows the calculated reflectivity spectrum for packet 1 of this example, with both the $1^{st}$ and 2nd order reflection harmonics being indicated. The line segment representations LSR of the wavelength-extent of the two reflection bands are also shown.

Figure 30B:
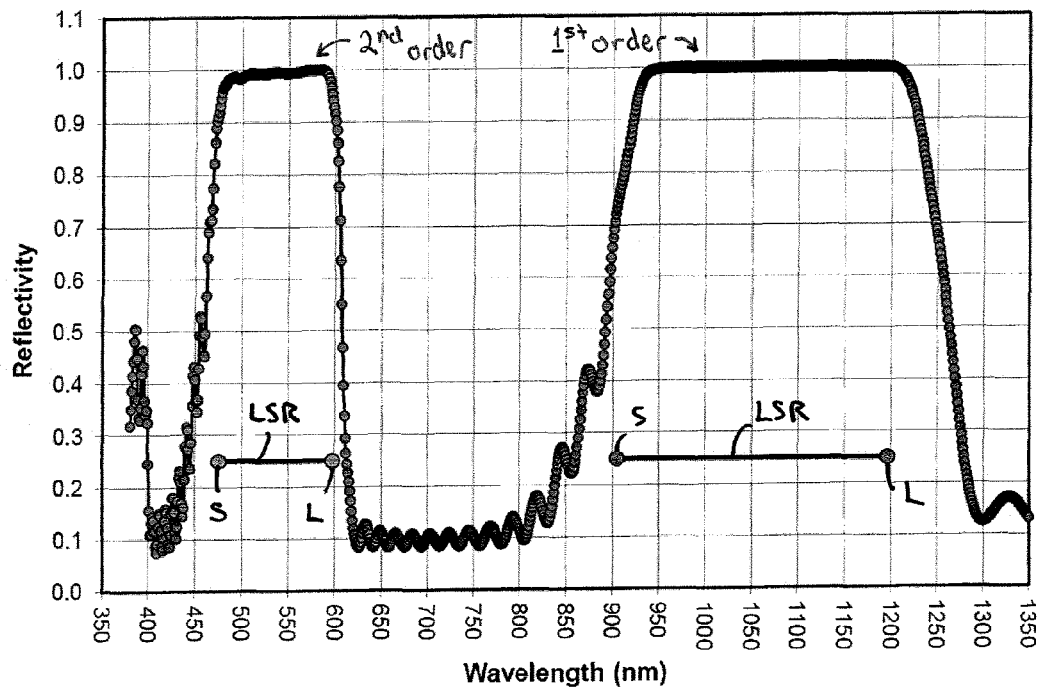
FIG. 30B is similar but for the second microlayer stack of Example 3.

FIG. 30B shows the calculated reflectivity spectrum for packet 2 of this example, with both the $1^{st}$ and 2nd order reflection harmonics being indicated. The line segment representations LSR of the wavelength-extent of the two reflection bands are also shown. In each of FIGS. 30A and 30B, the line segment representations of the $1^{st}$ and $2^{nd}$ order reflection harmonics show that the harmonics do not overlap, or occupy a common wavelength region.

Figure 30C:
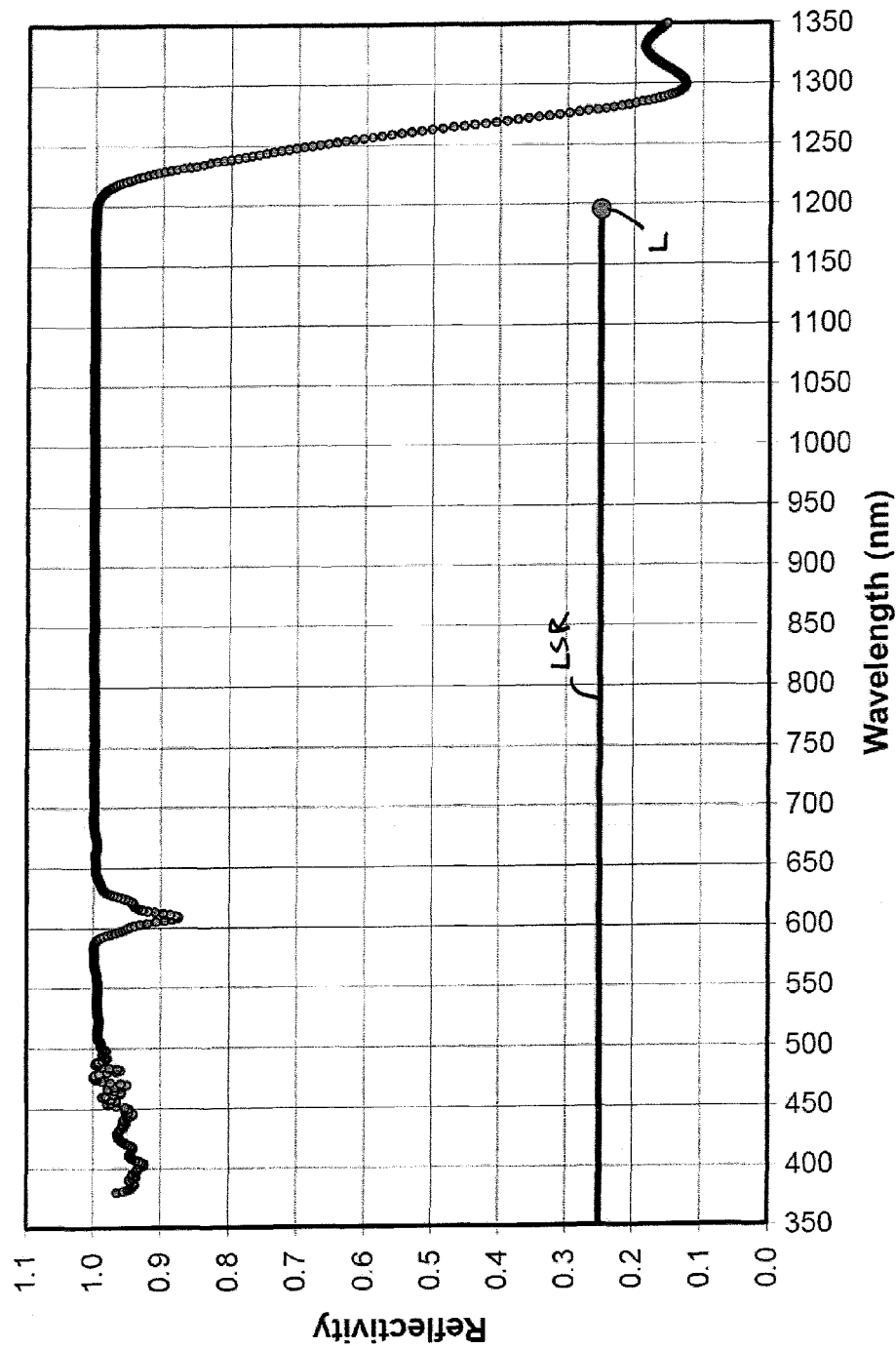
FIG. 30C is a graph of the single wide reflection band that results from combining the reflectivities of FIGS. 30A and 30B.

FIG. 30C shows the overall reflectivity spectra for the film of Example 3, wherein both packet 1, with its $1^{st}$ and $2^{nd}$ order reflection harmonics, and packet 2, with both of its $1^{st}$ and $2^{nd}$ order reflection harmonics, contribute to the overall wide reflection band. The line segment representation of the wavelength-extent of the overall reflection band is shown by LSR.

Thus, embodiments of multilayer stack combinations with interleaved overlapping harmonics for wide visible-infrared coverage, as well as apodized broadband partial reflectors having differing optical packets, are disclosed. One skilled in the art will appreciate that the optical films and film articles described herein can be practiced with embodiments other than those disclosed. The disclosed embodiments are presented for purposes of illustration and not limitation.

What is claimed is:

1. An article comprising separate first and second stacks of microlayers, the first and second stacks being arranged in series such that light transmitted by the first stack impinges on the second stack, and/or light transmitted by the second stack impinges on the first stack, the microlayers in each stack being arranged into optical repeat units;

wherein, at a design angle of incidence, the first stack provides a first $1^{st}$ order reflection band and the second stack provides a second $1^{st}$ order reflection band and a second $2^{nd}$ order reflection band;

wherein the second $2^{nd}$ order reflection band is spectrally separated from the second $1^{st}$ order reflection band to define a second spectral pass band;

wherein the first $1^{st}$ order reflection band substantially overlaps both the second $1^{st}$ order reflection band and the second $2^{nd}$ order reflection band to form a single wide reflection band that includes the first $1^{st}$ order reflection band, the second $1^{st}$ order reflection band, and the second $2^{nd}$ order reflection band;

wherein a substantial overlap is (a) having an actual overlap between a reflection band and another reflection band based on band edge wavelengths or (b) having a band edge wavelength of a reflection band differing by 5% or less than a band edge wavelength of another reflection band; and wherein a band edge wavelength for determining the substantial overlap is defined by a sufficient coherent reflectivity to achieve a reflection band having only reflectivity values greater than 25% of a peak reflectivity of the reflection band.

2. The article of claim 1, wherein the first $1^{st}$ order reflection band overlaps both the second $1^{st}$ order reflection band and the second $2^{nd}$ order reflection band, such that the first $1^{st}$ order reflection band has a long wavelength band edge that falls within the second $1^{st}$ order reflection band, and a short wavelength band edge that falls within the second $2^{nd}$ order reflection band.

3. The article of claim 1, wherein the first $1^{st}$ order reflection band has a long wavelength band edge whose wavelength $\lambda_{L11st}$ differs from a wavelength $\lambda_{S21st}$ of a short wavelength band edge of the second $1^{st}$ order reflection band by no more than 5% of $\lambda_{S21st}$.

4. The article of claim 1, wherein the first $1^{st}$ order reflection band has a short wavelength band edge whose wavelength $\lambda_{S11st}$ differs from a wavelength $\lambda_{L22nd}$ of a long wavelength band edge of the second $2^{nd}$ order reflection band by no more than 5% of $\lambda_{S11st}$.

5. The article of claim 1, wherein the first and second stacks comprise a total number of microlayers, refractive indices defining a refractive index difference between microlayers, and a first optical repeating unit thickness profile defining the single wide reflection band, the first and second stacks providing a total reflective power, the total reflective power defined as a sum of all harmonic orders that reflect in the single wide reflection band, wherein the total reflective power is greater than a reflective power in the single wide reflection band for a stack of microlayers comprising the same total number of microlayers, the same refractive indices, a second optical repeating unit thickness profile defining the same single wide reflection band with only $1^{st}$ order reflections, and an f-ratio of 0.5.

6. The article of claim 5, wherein the second stack of microlayers has an f-ratio that is either (i) greater than 0.25 and less than 0.5 or (ii) greater than 0.5 and less than 0.75.

7. The article of claim 1, wherein the second $2^{nd}$ order reflection band covers at least 100 nm within a range from 380 to 720 nm.

8. The article of claim 1, wherein the second stack of microlayers includes a baseline portion and an apodized portion, the baseline portion having a second baseline optical repeat unit thickness profile and the apodized portion having a second apodized optical repeat unit thickness profile that monotonically deviates from the second baseline optical repeat unit thickness profile.

9. The article of claim 8, wherein the first stack of microlayers also includes a baseline portion and an apodized portion, the baseline portion of the first stack having a first baseline optical repeat unit thickness profile and the apodized portion of the first stack having a first apodized optical repeat unit thickness profile that monotonically deviates from the first baseline optical repeat unit thickness profile, and wherein the apodized portion of the second stack and the apodized portion of the first stack are each disposed between the baseline portion of the second stack and the baseline portion of the first stack.

10. The article of claim 1, wherein the design angle of incidence is normal incidence.

11. The article of claim 1, wherein, at the design angle of incidence, the first stack provides a first $2^{nd}$ order reflection band, the first $2^{nd}$ order reflection band being spectrally separated from the first $1^{st}$ order reflection band to define a first spectral pass band.

12. The article of claim 11, wherein the second $2^{nd}$ order reflection band substantially overlaps the first $1^{st}$ order reflection band and the first $2^{nd}$ order reflection band such that the single wide reflection band also includes the first $2^{nd}$ order reflection band.

13. The article of claim 12, wherein the second $2^{nd}$ order reflection band overlaps both the first $1^{st}$ order reflection band and the first $2^{nd}$ order reflection band, such that the second $2^{nd}$ order reflection band has a long wavelength band edge that falls within the first $1^{st}$ order reflection band, and a short wavelength band edge that falls within the first $2^{nd}$ order reflection band.

14. The article of claim 11, wherein the first $2^{nd}$ order reflection band covers at least 100 nm within a range from 380 to 720 nm.

15. The article of claim 11, wherein the design angle of incidence is normal incidence.

16. The article of claim 1, wherein the first and second stacks of microlayers are part of a single coextruded polymeric film and are separated by at least a protective boundary layer (PBL).

17. The article of claim 1, wherein the first stack is part of a first coextruded polymeric film, and the second stack is part of a different second coextruded polymeric film.

18. The article of claim 17, wherein the first coextruded polymeric film has a major surface bonded to the second coextruded polymeric film.

19. The article of claim 18, wherein the major surface of the first coextruded polymeric film bonds to the second coextruded polymeric film with a layer of adhesive material.

20. The article of claim 1, wherein the article comprises a polarizer, and the first $1^{st}$ order reflection band, the second $1^{st}$ order reflection band, and the second $2^{nd}$ order reflection band are all associated with only one of two orthogonal polarization states.

21. The article of claim 1, wherein the article comprises a mirror, and the first $1^{st}$ order reflection band, the second $1^{st}$ order reflection band, and the second $2^{nd}$ order reflection band are all associated with two orthogonal polarization states.

* * * * *